US007429372B2

(12) United States Patent
Pez et al.

(10) Patent No.: US 7,429,372 B2
(45) Date of Patent: *Sep. 30, 2008

(54) HYDROGEN STORAGE BY REVERSIBLE HYDROGENATION OF PI-CONJUGATED SUBSTRATES

(75) Inventors: Guido Peter Pez, Allentown, PA (US); Aaron Raymond Scott, Allentown, PA (US); Alan Charles Cooper, Macungie, PA (US); Hansong Cheng, Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 428 days.

This patent is subject to a terminal disclaimer.

(21) Appl. No.: 10/833,484

(22) Filed: Apr. 27, 2004

(65) Prior Publication Data

US 2005/0002857 A1  Jan. 6, 2005

Related U.S. Application Data

(63) Continuation-in-part of application No. 10/430,246, filed on May 6, 2003, now Pat. No. 7,101,530.

(51) Int. Cl.
*C01B 3/00* (2006.01)
*F17C 11/00* (2006.01)
(52) U.S. Cl. ............... 423/644; 423/648.1; 206/0.7; 48/61
(58) Field of Classification Search .......... 423/644, 423/648.1; 206/0.7; 48/61
See application file for complete search history.

(56) References Cited

U.S. PATENT DOCUMENTS

| | | | |
|---|---|---|---|
| 4,567,033 | A | 1/1986 | Kesten |
| 5,197,523 | A | 3/1993 | Fink, Jr. et al. |
| 5,435,356 | A | 7/1995 | Rabinovich |
| 6,074,447 | A | 6/2000 | Jensen |
| 6,544,400 | B2 | 4/2003 | Hockaday et al. |
| 6,607,707 | B2 * | 8/2003 | Reichman et al. ........ 423/648.1 |
| 6,680,042 | B1 * | 1/2004 | Schulz et al. ............. 423/644 |
| 2001/0016283 | A1 | 8/2001 | Shirashi et al. |
| 2002/0096048 | A1 | 7/2002 | Cooper et al. |
| 2005/0002857 | A1 * | 1/2005 | Pez et al. ............... 423/648.1 |

FOREIGN PATENT DOCUMENTS

| | | |
|---|---|---|
| JP | 2001110437 A | 4/2001 |
| JP | 2001198469 A | 7/2001 |
| JP | 2002134141 A | 5/2002 |
| JP | 2002184436 A | 6/2002 |
| JP | 2002-194436 | 7/2002 |
| JP | 2002187702 A | 7/2002 |
| JP | 2002274803 A | 9/2002 |
| JP | 2002274804 A | 9/2002 |
| JP | 2003321201 A | 11/2003 |
| JP | 2004026582 A | 1/2004 |
| RU | 2 160 698 C1 | 12/2000 |
| WO | WO 02/38494 A2 | 5/2002 |
| WO | WO 2005/053832 A2 | 6/2005 |

OTHER PUBLICATIONS

Dillon, et al., "Storage of Hydrogen in Single-Walled Carbon Nanotubes", *Letters to Nature*, Mar. 27 2997, vol. 386, pp. 377-379.

Chambers, et al., "Hydrogen Storage in Graphite Nanofibers", *The Journal of Physical Chemistry B*, May 28, 1998, vol. 102, No. 22, pp. 4253-4256.

Cho, et al., "Hydrogen Sorption in HCl-Treated Polyaniline and Polypyrrole"; New Potential Hydrogen Storage Media, *Fuel Chemistry Division Preprints*, 2002, 47(2), pp. 790-791.

Kariya, et al., "Efficient Evolution of Hydrogen from Liquid Cycloalkanes Over Pt-containing Catalysts Supported on Active Carbons Under Wet-Dry Multiphase Conditions", *Applied Catalysis A: General*, 233 (2002), pp. 91-102.

Loutfy, et al., "Investigation of Hydrogen Storage in Liquid Organic Hydrides", Proceedings of the *International Hydrogen Energy Forum 2000*, Munich Germany, 2000; pp. 335-340.

Dillon, et al., "Hydrogen Storage Using Carbon Adsorbents: Past, Present and Future", *Applied Physics A*, 72 (2001), pp. 133-142.

Hodoshima, et al., "Liquid-film-type Catalytic Decalin Dehydrogeno-aromatization for Long-term Storage and Long-distance Transportation of Hydrogen", *International Journal of Hydrogen Energy*, 28 (2003), pp. 197-204.

"Conducting Plastics Pack the Hydrogen", *Science*, vol. 297, Sep. 13, 2002, p. 1796.

(Continued)

*Primary Examiner*—Timothy C. Vanoy
(74) *Attorney, Agent, or Firm*—Michael K. Boyer

(57) ABSTRACT

Processes are provided for the storage and release of hydrogen by means of a substantially reversible catalytic hydrogenation of extended pi-conjugated substrates which include large polycyclic aromatic hydrocarbons, polycyclic aromatic hydrocarbons with nitrogen heteroatoms, polycyclic aromatic hydrocarbons with oxygen heteroatoms, polycyclic aromatic hydrocarbons with alkyl, alkoxy, nitrile, ketone, ether or polyether substituents, pi-conjugated molecules comprising 5 membered rings, pi-conjugated molecules comprising six and five membered rings with nitrogen or oxygen hetero atoms, and extended pi-conjugated organic polymers. The hydrogen, contained in the at least partially hydrogenated form of the extended pi-conjugated system, can be facilely released for use by a catalytic dehydrogenation of the latter in the presence of a dehydrogenation catalyst which can be effected by lowering the hydrogen gas pressure, generally to pressures greater than 0.1 bar or raising the temperature to less than 250° C. or less, or by a combination of these two process parameters.

62 Claims, 19 Drawing Sheets

OTHER PUBLICATIONS

U.S. Appl. No. 10/430,246, filed May 6, 2003, Pez et al.
U.S. Appl. No. 10/833,467, filed Apr. 27, 2004, Bagzis et al.
U.S. Appl. No. 11/266,803, filed Nov. 4, 2005, Pez et al.
"Liquid Organic Hydrides: A Better Way to Store and Transport Hydrogen?", *Chem. Eng.*, 21 (Mar. 2003).
G. Pez, "Toward New Solid and Liquid Phase Systems for the Containment, Transport and Deliver of Hydrogen," May 2003 (see http://www.eere.energy.gov/hydrogenandfuelcells/pdfs/solid_liquid_carriers_pres_air_prod.pdf).
Hodoshima, et al., "Catalytic Decalin Dehydrogenation/Naphthalene Hydrogenation Pari as a Hydrogen Source for Fuel-Cell Vehicle", *International Journal of Hydrogen Energy*, 28, 1255-1265 (2003).
Newson, et al., "Seasonal Storage of Hydrogen in Stationary Systems with Liquid Organic Hydrides", *Int. J. Hydrogen Energy*, vol. 23; No. 10, pp. 905-909 (1998).
A. Cooper et al, "Hydrogen Storage and Delivery B Reversible Hydrogenation of Liquid-Phase Hydrogen Carriers," Prepr. Pap Am. Chem. Soc., Div. Fuel Chem. 2005, 50 (1), 271.
Lamartine, R et al.; "Organic Solid Hydrogenaton—Hydrogen Spill-Over;" Elsevier Science Publishers V.B. Amsterdam (1983); pp. 251-259.
Lai, Wei-Chuan, et al; "Conformational Isomerization of cis-decahydronaphthalene over zeolite catalyst,." Catalysis Today 30, 1996, pp. 171-181.

* cited by examiner

HYDROGEN STORAGE BY REVERSIBLE HYDROGENATION OF PI-CONJUGATED SUBSTRATES

This application is a continuation-in-part of U.S. patent application Ser. No. 10/430,246, filed May, 6, 2003, now U.S. Pat. No. 7,101,530 the entire disclosure of which is incorporated herein by reference.

STATEMENT REGARDING FEDERALLY SPONSORED RESEARCH FOR DEVELOPMENT

This invention was made with Government support under Contract Number DE-FC36-04GO14006 awarded by DOE. The Government has certain rights in this invention.

1. FIELD OF THE INVENTION

This invention relates to processes for the reversible hydrogenation of pi-conjugated substrates to provide for the storage and release of hydrogen at practical operating temperatures and pressures, particularly for supplying hydrogen to fuel cells. Hydrogen is a widely used chemical commodity in the chemical and petroleum processing industries, but with the relatively recent development of fuel cells it is increasingly also being considered as a viable "clean" energy source. Stationary fuel cells can be supplied with hydrogen from on-site natural gas reformers or via existing hydrogen pipeline sources. However, for mobile vehicular systems, a practical and effective method for storing hydrogen to power an on-board fuel cell or a hydrogen fuelled internal combustion engine is required. The transport of hydrogen as a cryogenic liquid, although technologically well established, is an energy-intensive process which results in a significantly higher cost of the delivered gas. Hydrogen is also conventionally transported as a compressed gas in steel cylinders, but the storage capacity is relatively low. Higher gravimetric storage amounts, but at relatively low volumetric densities, can now be achieved with hydrogen gas at very high pressures up to 10,000 psi (690 bar) in light-weight containers made of very high strength composite materials. There are significant energy costs in thus compressing the gas as well as potential issues regarding consumers' acceptance of systems that contain hydrogen at such elevated pressures.

It is thus necessary and highly desirable to devise a means of storing and delivering hydrogen safely, at an adequate gravimetric and volumetric storage density and with a minimal consumption of energy. This may be accomplished by "containing" the hydrogen in a suitable solid, or potentially even in liquid sorbent media, compositions which have a substantial but reversible affinity for the gas. The gas is contacted with the sorbent at modest temperatures and hydrogen pressures and is released for use as required, by lowering the system's hydrogen partial pressure at the same or a higher temperature. Hydrogen uptake by the sorbent is usually an exothermic process, while the release of hydrogen for use requires at least the corresponding input of thermal energy which can be met from the fuel cell's or internal combustion engine's waste heat. Thus, in contrast to compressed hydrogen-based storage systems, the necessary energy needed for containing the hydrogen (i.e. its heat of adsorption) can thus largely be met without significant consumption of higher grade electrical energy for compression. Also, there is a considerably increased safety factor in a sorbed hydrogen. Since any desorption process is endothermic, it will be naturally self-retarding and the hydrogen will not spontaneously totally desorb without an external input of heat.

2. BACKGROUND OF THE INVENTION

The challenge in this sorbent approach to hydrogen storage is in devising the appropriate functioning sorbent media. Much of the research on containing hydrogen in this way has focused on the property of various metals and metal alloys to reversibly chemically combine with hydrogen to form metal hydrides. Representative examples are FeTi; TiV alloys; $LaNi_5$; various magnesium-nickel combinations; and sodium alanate, $NaAlH_4$, which can reversibly dissociate in the presence of some catalysts into Al, NaH and $H_2$. There is a substantial literature on metal hydrides and while research is still being actively pursued in this field for instance on tri- and multi-metal hydrides, demonstrated gravimetric hydrogen capacities are still well short of the 6+wt % hydrogen that are required for vehicular hydrogen storage.

There have recently been a number of claims of hydrogen storage by various forms of carbon: as single wall nanotubes by A. C. Dillon et al. in Nature 386, 377-379 (1997); and as graphitic nanofibers by Chambers et al. in J. Phys. Chem. B 102, 4253-4256 (1998). However, these and other literature claims of a substantial hydrogen containment by carbons [see A. C. Dillon and M. J. Heben in Appl. Phys. A 72, 133-142 (2001)] have not been specifically confirmed by other investigators; the field of hydrogen sorption by carbons has remained an open area of research. In this context, Cooper and Pez in U.S. Patent Application Publication No. 20020096048 have reported that intimate combinations of hydrogen reactive metals or metal alloys, or metal hydrides with various forms of substantially graphitic carbon, i.e. carbon-metal hybrids, display a reversible uptake of hydrogen at near ambient conditions and are useful as pressure-swing and temperature-swing sorbents for the storage of hydrogen. The observed reversible facile hydrogen reactivity is theorized to occur either by a "hydrogen-spillover" mechanism or by a partial reversible metal-catalyzed hydrogenation of the unsaturated graphitic carbon structures.

A recent report by S. J. Cho et al. in ACS Fuel Chemistry Division Preprints 47(2), 790-791 (2002) claims the adsorption of hydrogen by the hydrochloric acid-doped conducting polymers polyaniline and polypyrrole. These polymers are exposed to high pressure (1350 psia, 93 bar) hydrogen at 25° C. resulting in an apparent slow uptake of hydrogen gas. The hydrogen gas is desorbed by heating the sample to 200° C. at an unspecified gas pressure. The authors speculate that the hydrogen is physically adsorbed (i.e., the H—H bond remains intact) in the porous conducting polymers. Samples that were not treated with hydrochloric acid, which apparently induces porosity in the polymer samples, did not show any uptake of hydrogen. No metal catalysts are reported to be present in the material and no indication for chemical adsorption of hydrogen or catalytic hydrogenation of the polymer is given in this publication.

The possibility of storing hydrogen via the catalytic hydrogenation and then dehydrogenation of common aromatic molecules such as benzene or toluene has long been disclosed as a means of storing the hydrogen. With a theoretical hydrogen storage capacity of about 7 weight percent, the systems seem attractive. But while this chemistry is carried out routinely in chemical plants there are numerous difficulties in utilizing it in a practical hydrogen storage device.

The principal obstacles are as follows:

With the appropriate metal catalysts, the hydrogenation of benzene, toluene, naphthalene and related one or two six-membered ring aromatics to the corresponding saturated cyclic hydrocarbons, cyclohexane, methylcyclohexane and decalin, respectively, can be conducted at relatively mild conditions, e.g. ~100° C. and ~100 psi (6.9 bar) of hydrogen pressure, where it is thermodynamically very favorable. However, dehydrogenation of the above cited corresponding alkanes to produce hydrogen gas at the about 20 psia (1.5 bar) and higher delivery pressures that are required for use in fuel cells is, as currently carried out, is a highly endothermic process and thus requires the use of higher reaction temperatures than are not easily obtainable from fuel cells, especially those presently used in vehicles, as well as a significant input of energy. Thus, U.S. Pat. No. 4,567,033 to Kesten et al. describes a method of "freeing" molecular hydrogen from methylcyclohexane by its dehydrogenation to toluene at 316° C., the required thermal input being supplied by a combustion of a considerable portion of the by-product hydrogen.

Additionally, the common one or two six-membered ring aromatic molecules are quite volatile as are their hydrogenated products. While the hydrogenation can be conducted in a closed system, the production of product hydrogen from the reverse reaction fundamentally requires that there be some means of totally separating the gas from the reaction's organic volatile components. While technically possible, this requires a further unit operation which increases the complexity and hence the cost of the hydrogen storage process.

There have been several attempts to provide practical processes for storing hydrogen via a reversible hydrogenation of aromatics. U.S. Pat. No. 6,074,447 to Jensen et al. describes a means of dehydrogenating a hydrocarbon to an aromatic and hydrogen in the presence of a particular iridium-based molecular complex catalyst at preferably 190° C. or higher. Specifically described hydrocarbons are methylcyclohexane, decalin, dicyclohexyl, and cyclohexane (for which the corresponding aromatic products are toluene, naphthalene, biphenyl and benzene); there is no mention of any larger hydrogenated hydrocarbons or the polycyclic aromatic hydrocarbons or other pi-conjugated molecules of this invention. Additionally, the envisaged substrates of this prior art are clearly volatile at reaction temperatures and the reaction chamber is thus necessarily provided with a membrane that is highly selective for the passage of hydrogen as compared to the other volatile reaction components which are retained in the reaction chamber.

N. Kariya et al. have recently reported in Applied Catalysis A, 233, 91-102 (2002) what is described to be an efficient generation of hydrogen from liquid cycloalkanes such as cyclohexane, methylcyclohexane and decalin over platinum and other platinum-containing catalysts supported on carbon. The process is carried out at from about 200° C. to 400° C. under "wet-dry multiphase conditions", which involves intermittently contacting the saturated liquid hydrocarbon with the heated solid catalyst in a way such that the catalyst is alternately wet and dry. Because of local superheating and other cited factors the dehydrogenation reaction is rendered more efficient in terms of improved reaction kinetics but because of the reaction thermodynamics (vide infra) it still requires the use of relatively high temperatures for a high conversion of the cyclohexane to the corresponding aromatic molecule. This basic process is elaborated on in several Japanese patent applications (e.g. JP20001110437 and JP2002134141) where it is applied citing benzene, toluene, xylene, mesitylene, naphthalene, anthracene, biphenyl, phenanthrene and their alkyl derivatives as possible aromatic substrates as a means of producing hydrogen for fuel cells. It is evident however, that for this and other implementations of the process, active means for totally separating the product hydrogen from the volatile components of the process need to be employed.

R. O. Loufty and E. M. Vekster, in "Investigation of Hydrogen Storage in Liquid Organic Hydrides", Proceedings of the International Hydrogen Energy Forum 2000, Munich Germany, 2000; pp. 335-340, have reported the dehydrogenation of decalin in a membrane reactor where the very low conversion (~15%) of decalin, even at 300° C., is greatly enhanced by the selective separation of hydrogen by the membrane and its removal from the reactor.

JP2002134141 A describes "liquid hydrides" based on phenyl-substituted silanes; aryl-substituted oligomers and low molecular weight polymers of ethylene; low molecular weight polymers of phenylene; and oligomers of aryl- and vinyl-substituted siloxanes where the aryl groups are phenyl, tolyl, naphthyl and anthracyl group.

In spite of the work described above, there remains a need for processes for the reversible hydrogenation of pi-conjugated substrates to provide for the storage and release of hydrogen at practical operating temperatures and pressures, particularly for supplying hydrogen to fuel cells.

Citation of any reference in Section 2 is not an admission that the reference is prior art to the present application.

3. BRIEF SUMMARY OF THE INVENTION

The present invention provides a means of capturing and thereby storing hydrogen by its chemical reaction, conducted at moderate temperatures, in the presence of a catalyst, with a substrate having an extended pi-conjugated molecular structure as defined herein to yield the corresponding substantially hydrogenated form of the pi-conjugated system. As used herein, "hydrogenate", including in its various forms, means to add hydrogen to saturate unsaturated bonds, and does not include hydrogen cleavage of molecules or hydrogenolysis (i.e., breaking of carbon-carbon or carbon-heteroatom linkages). A delivery of the stored hydrogen is accomplished simply by reducing the pressure of hydrogen, and/or raising the temperature, both of which promote the corresponding dehydrogenation reaction.

In one embodiment, the pi-conjugated substrates of our invention can be reversibly catalytically hydrogenated at milder reaction conditions and with a lesser expenditure of energy than those of the prior art, i.e. principally benzene, toluene and naphthalene. The extended pi-conjugated substrate and its hydrogenated derivative are for the most part relatively large molecules, and are therefore relatively involatile, thus being easily separable from the product hydrogen stream. While a high degree of hydrogenation and dehydrogenation is advantageous to be an effective and practical hydrogen storage system, at least partial hydrogenation and dehydrogenation, preferably wherein the reversible hydrogen uptake of the extended pi-conjugated substrate is at least 1.0% of by weight of the at least partially hydrogenated substrate, yields an effective and practical hydrogen storage economy.

As demonstrated herein by quantum mechanics based thermodynamics calculations and supporting experimental data, a reversible hydrogenation of extended pi-conjugated aromatic molecules is generally thermodynamically more favorable; it can be carried out at a lower temperature than is possible with the commonly used as cited in Section 2, one, two, or three six-membered ring aromatic substrates of the prior art. Essentially, the modulus of the heat or enthalpy of the (exothermic) hydrogenation reaction and of the (endothermic) dehydrogenation step is reduced, thus resulting in a hydrogenation/dehydrogenation system which is more easily reversible at modest and practical temperatures. An added advantage of using the extended pi-conjugated substrates is that they and their hydrogenated derivatives are far less volatile, thus precluding the need for a separate unit operation for totally separating these from the product hydrogen thus greatly simplifying the overall hydrogen storage equipment and its process of operation.

4. BRIEF DESCRIPTION OF SEVERAL VIEWS OF THE DRAWINGS

Figure 3:
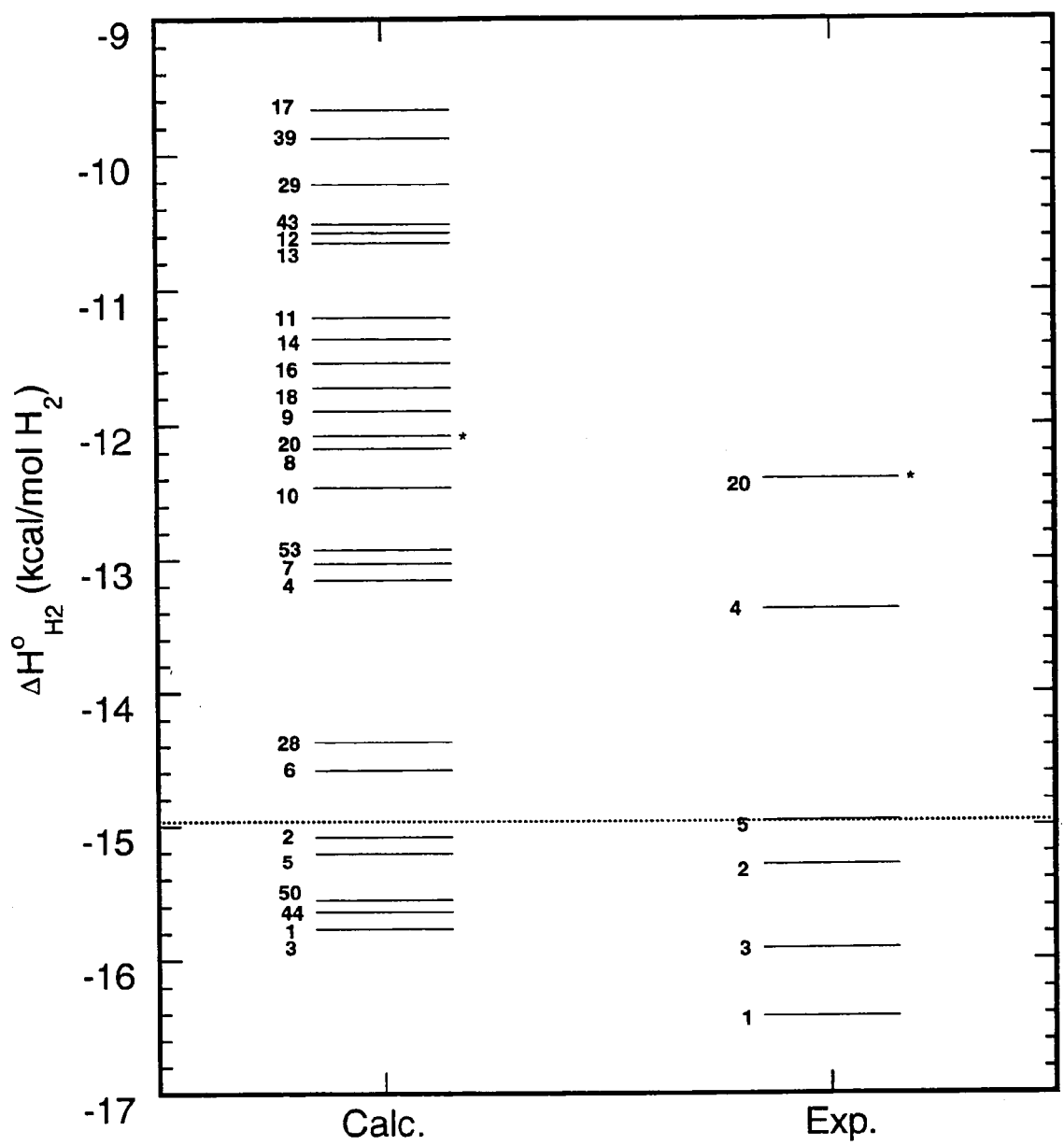

FIG. 3 shows the hydrogenation reaction enthalpies, $\Delta H°_{H2}$ at standard conditions (25° C., 1 atm.) for the numbered hydrogenation/dehydrogenation reaction systems, as identified in Table 1. Calc.=calculated using the ab initio DFT density functional theory method; Exp.=published experimental data. *Calculated and experimental data at 150° C.

Figure 4:
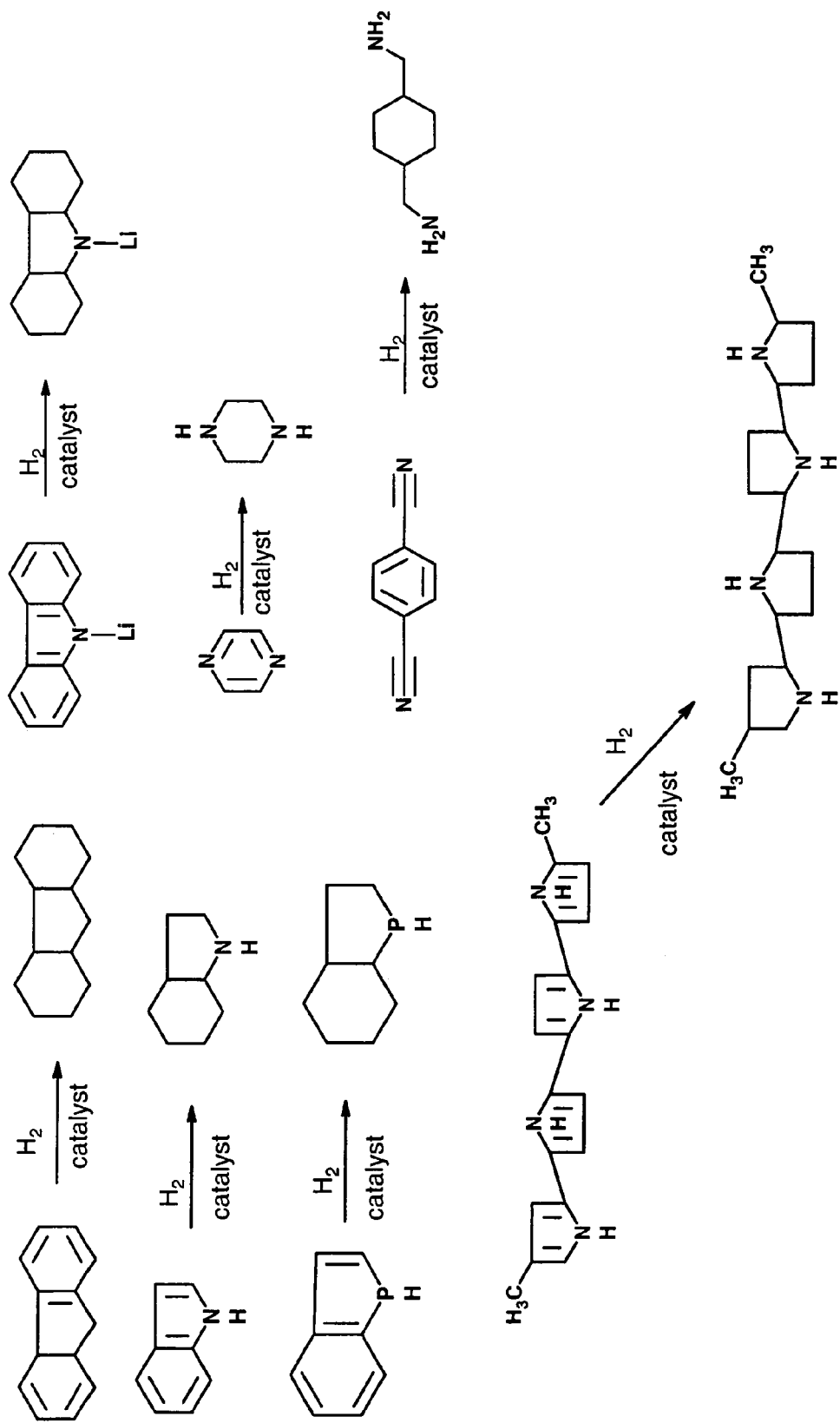

FIG. 4 shows the hydrogenation of certain extended pi-conjugated substrates where all of the unsaturated linkages of the pi-unsaturated substrate have been hydrogenated.

Figure 5:
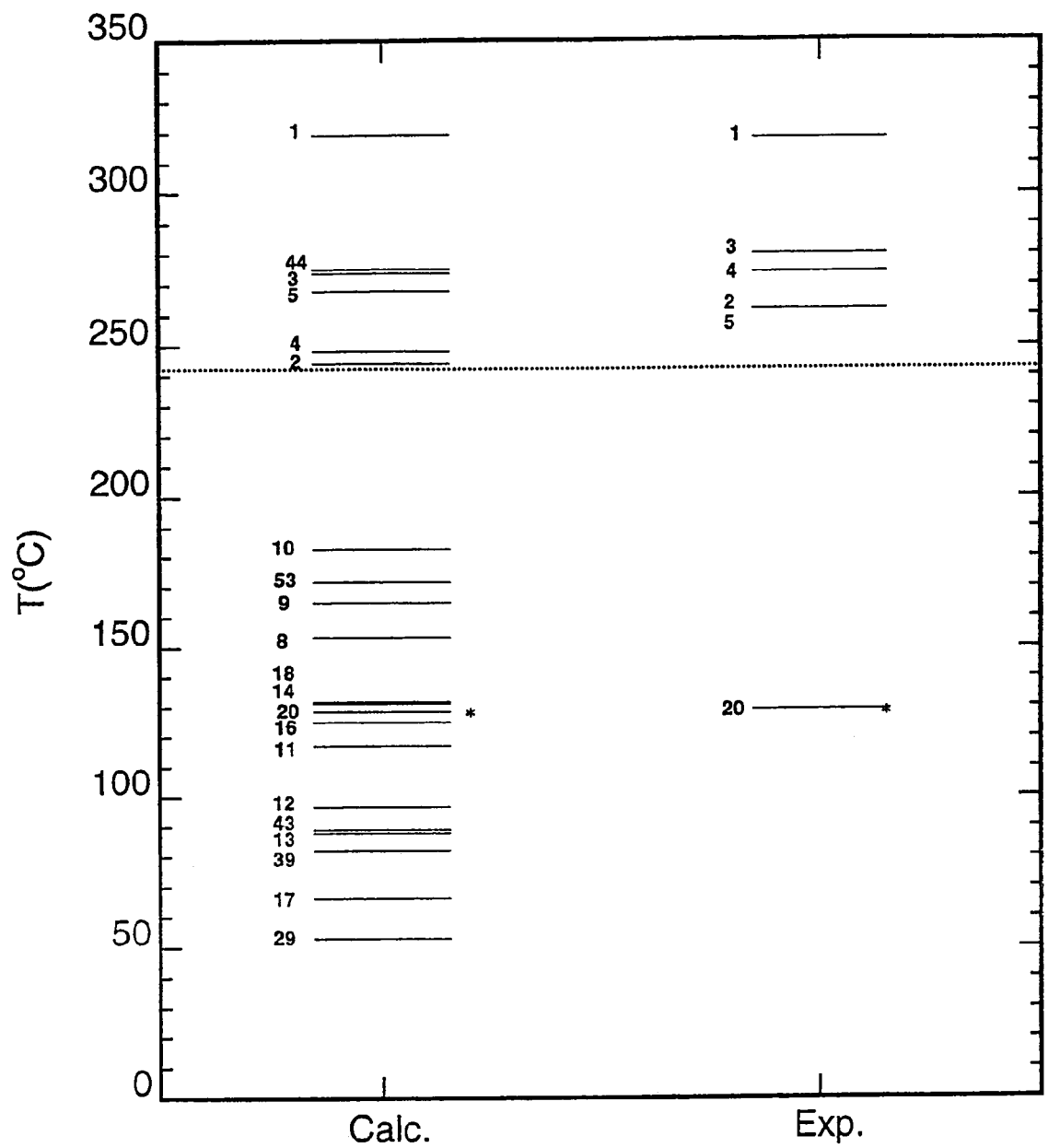

FIG. 5 shows the calculated dehydrogenation temperature for a 95.24% equilibrium conversion of the saturated, fully hydrogenated carrier molecule, $A-H_{2n}$, back to the pi-conjugated substrate, A, at 1 atm. $H_2$ pressure, i.e., where K of Equation 3 is 0.05 atm$^{-n}$. Calc.=calculated using the ab initio DFT density functional theory method; Exp.=calculated from experimental data. The numbers refer to the hydrogenation substrate shown in Tables 1a-1d. *Calculated using our experimental enthalpy data (Example 13) and computationally derived entropy values.

Figure 6:
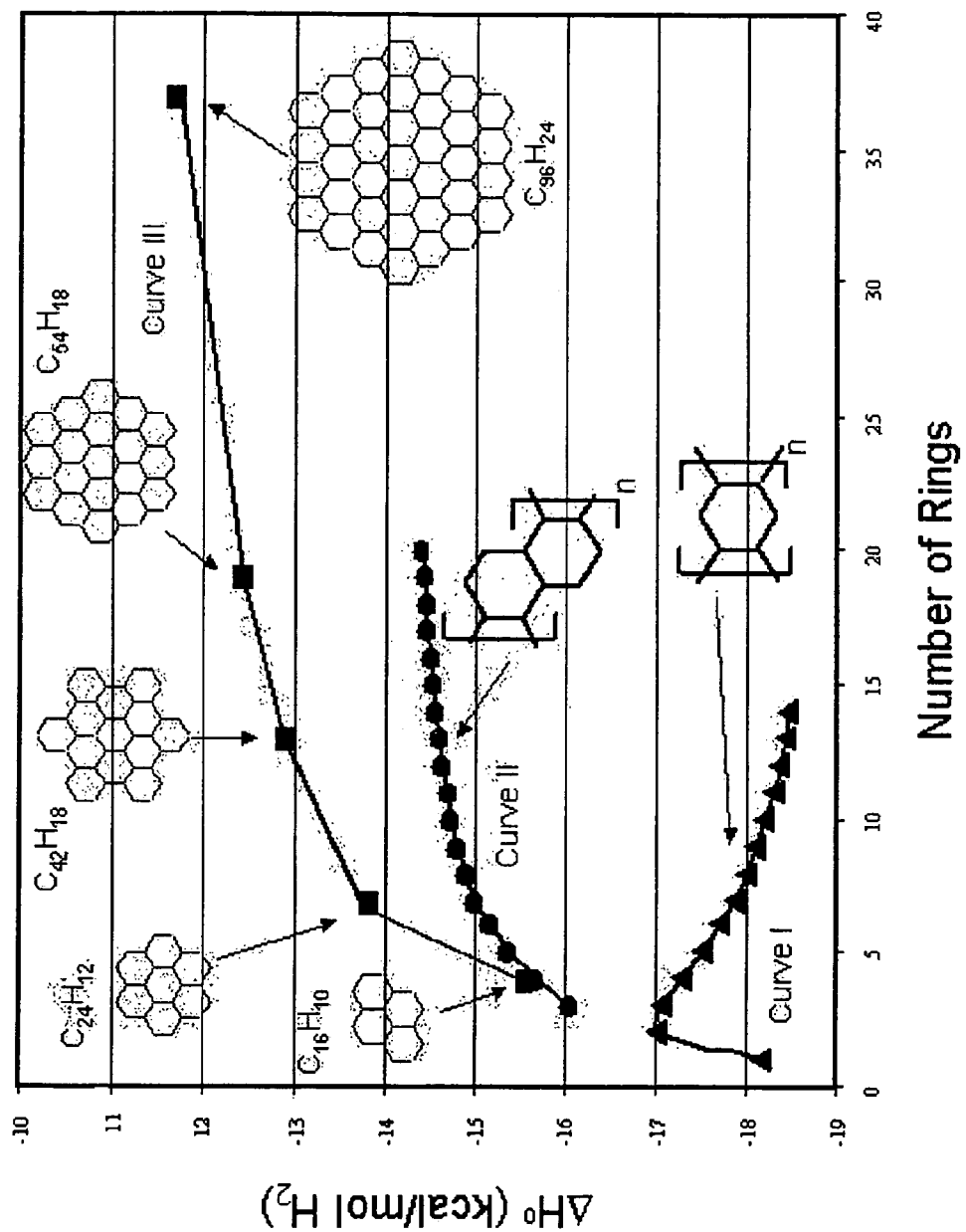

FIG. 6 is a plot of the calculated standard enthalpies of hydrogenation ($\Delta H°_{H2}$) for three structural classes of polyaromatic hydrocarbons as a function of the number of fused aromatic rings (the representations of double bonds, or aromatic sextets, have been omitted for simplicity). The PM3 method was used for the calculations.

Figure 7:
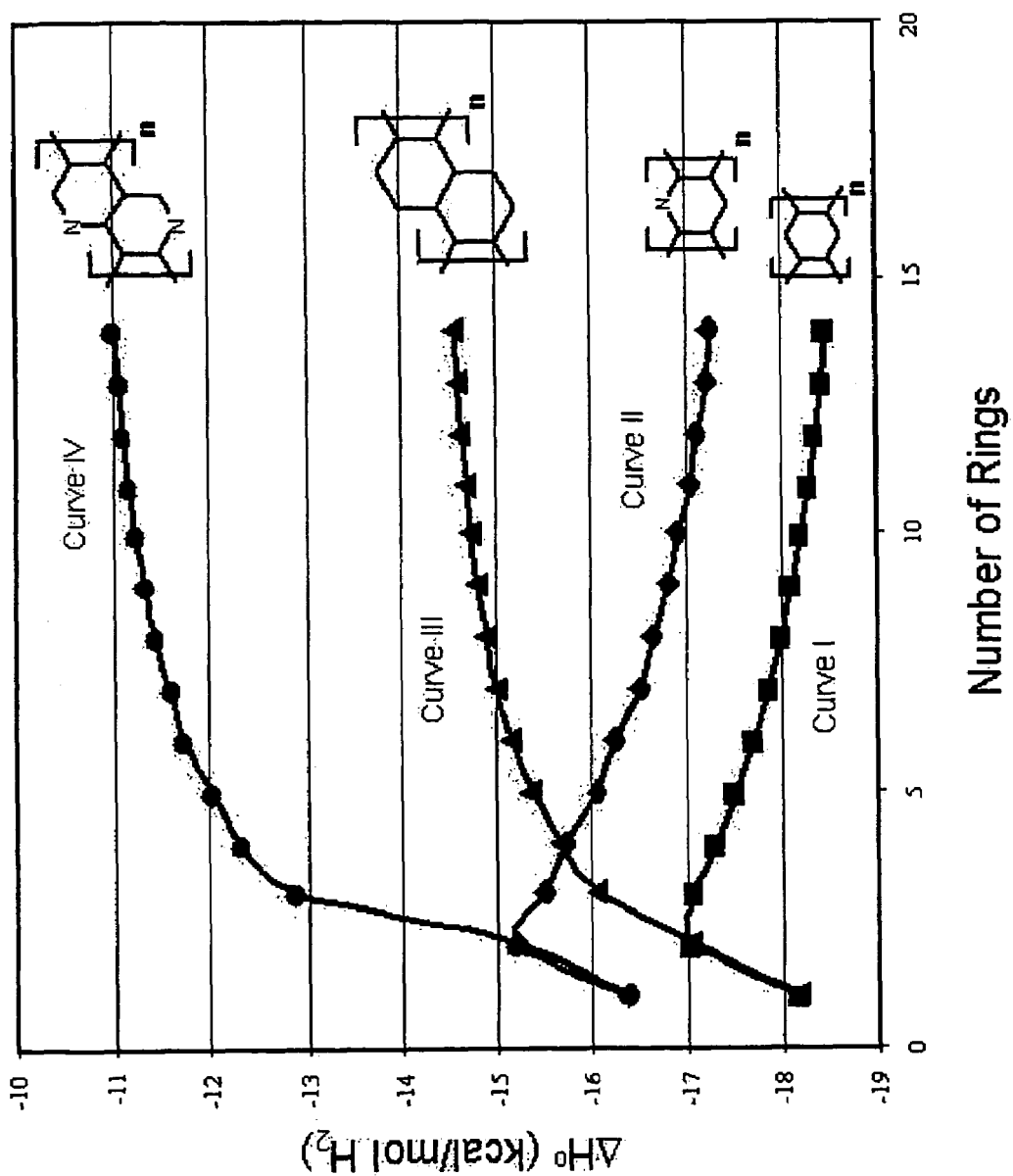

FIG. 7 is a plot of the calculated standard enthalpies of hydrogenation ($\Delta H°_{H2}$) for two isostructural series of polyaromatic hydrocarbons, with and without nitrogen substitution, as a function of the number of fused aromatic rings (the representations of double bonds, or aromatic sextets, have been omitted for simplicity). The PM 3 method was used for the calculation.

Figure 8:
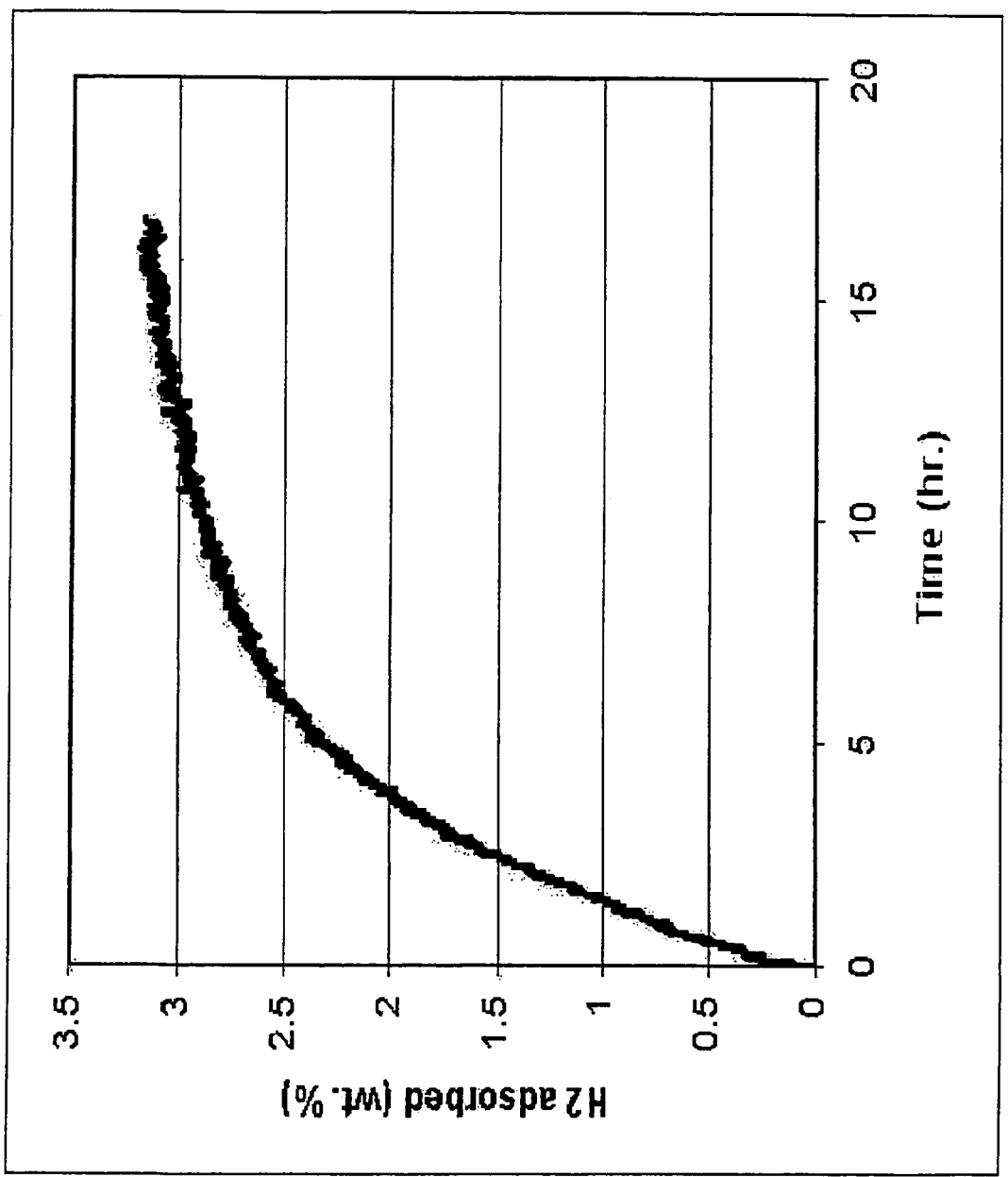

FIG. 8 is a plot of the hydrogen adsorption vs. time of a sample (Example 3) of coronene with 5% Rh on carbon catalyst.

Figure 9:
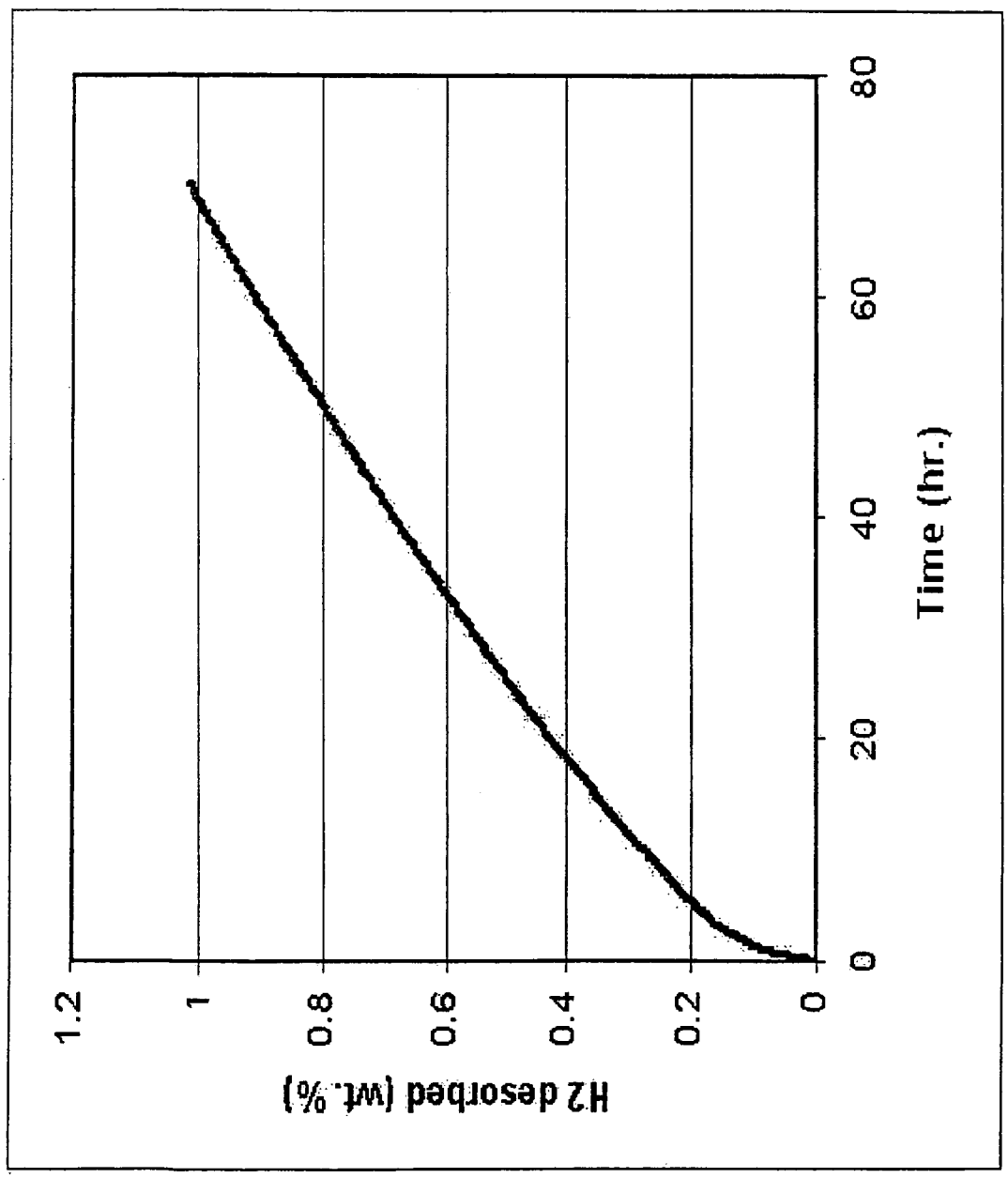

FIG. 9 is a plot of the hydrogen desorption vs. time of a sample (Example 3) of coronene with 5% Rh on carbon catalyst.

Figure 10:
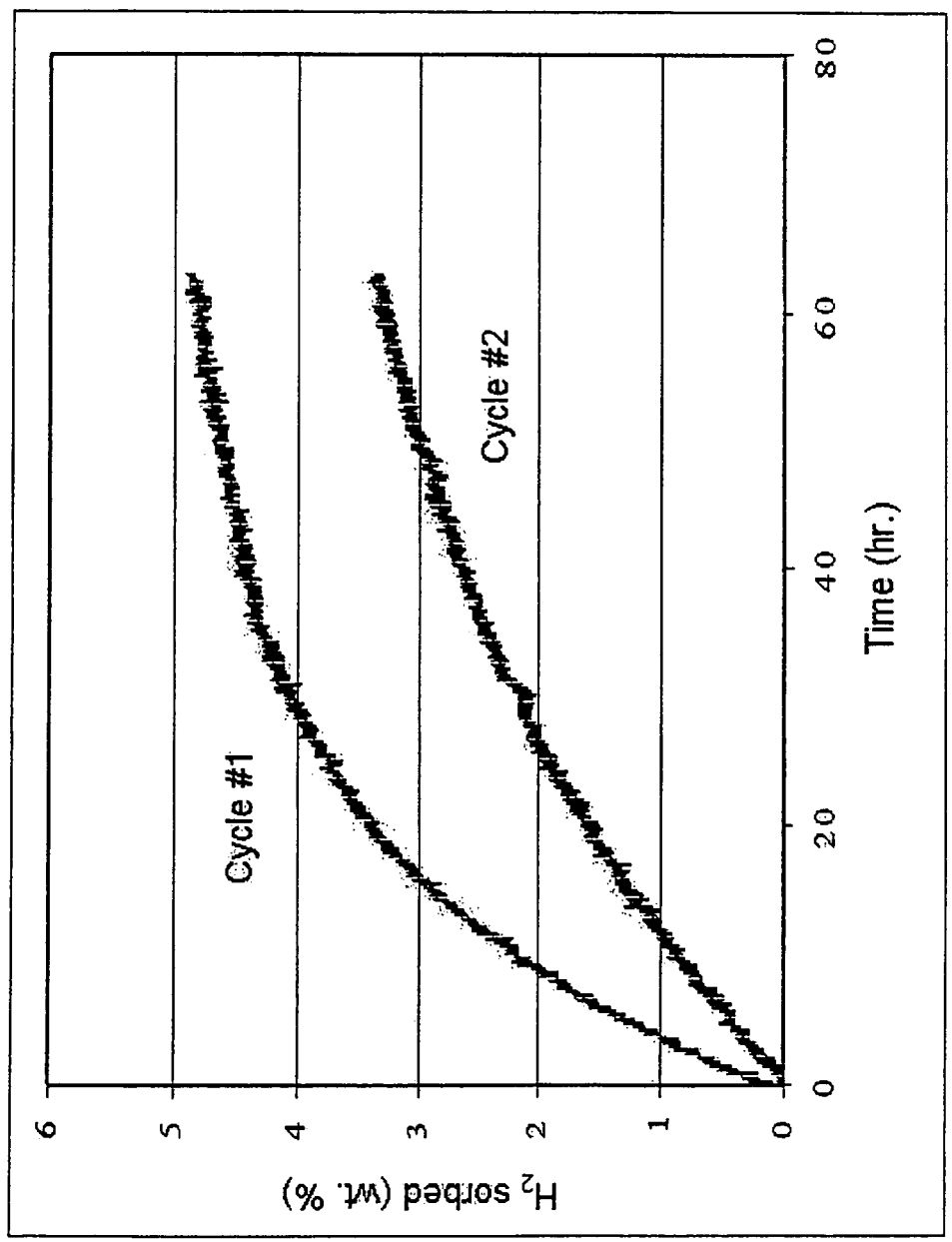

FIG. 10 is a plot of the hydrogen adsorption vs. time, for two consecutive cycles, of a sample (Example 4) of coronene with palladium metal catalyst.

Figure 11:
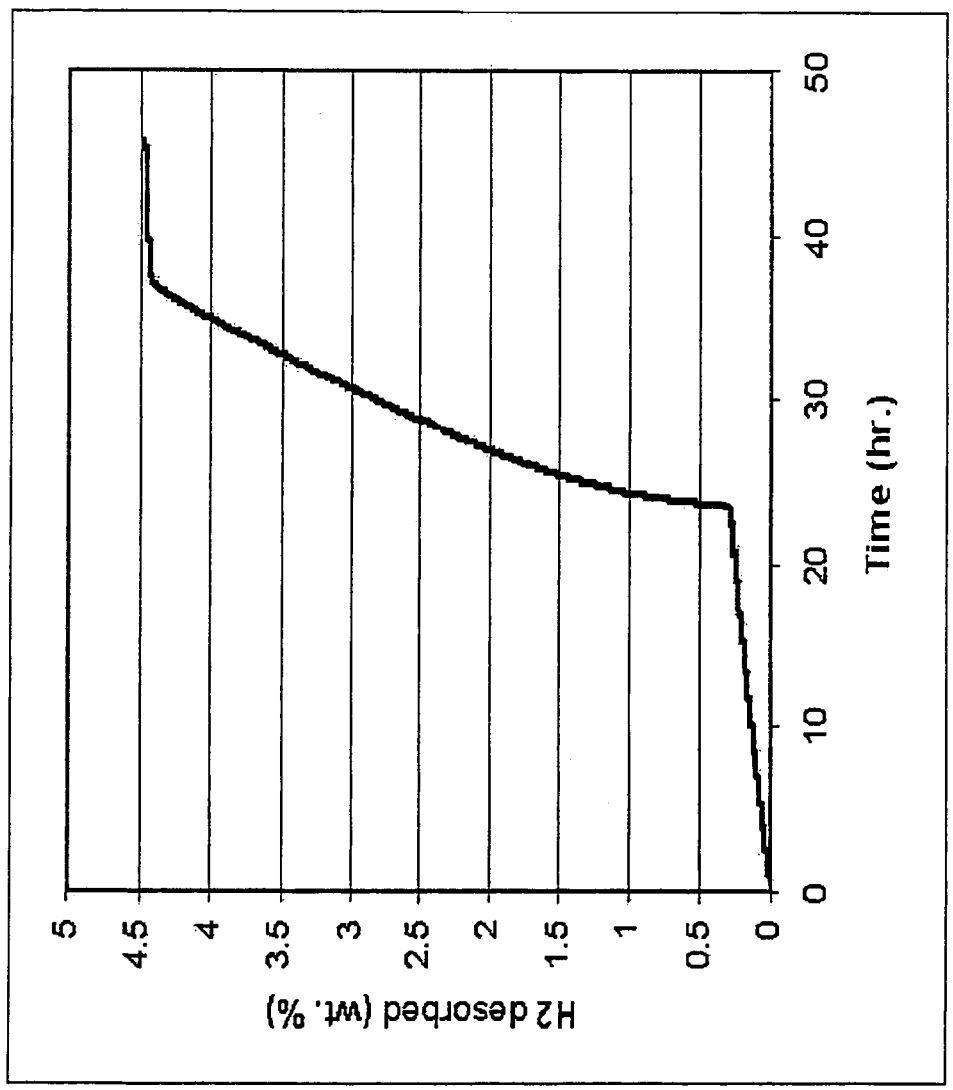

FIG. 11 is a plot of the hydrogen desorption vs. time, cycle #1, of a sample (Example 4) of coronene with palladium metal catalyst.

Figure 12:
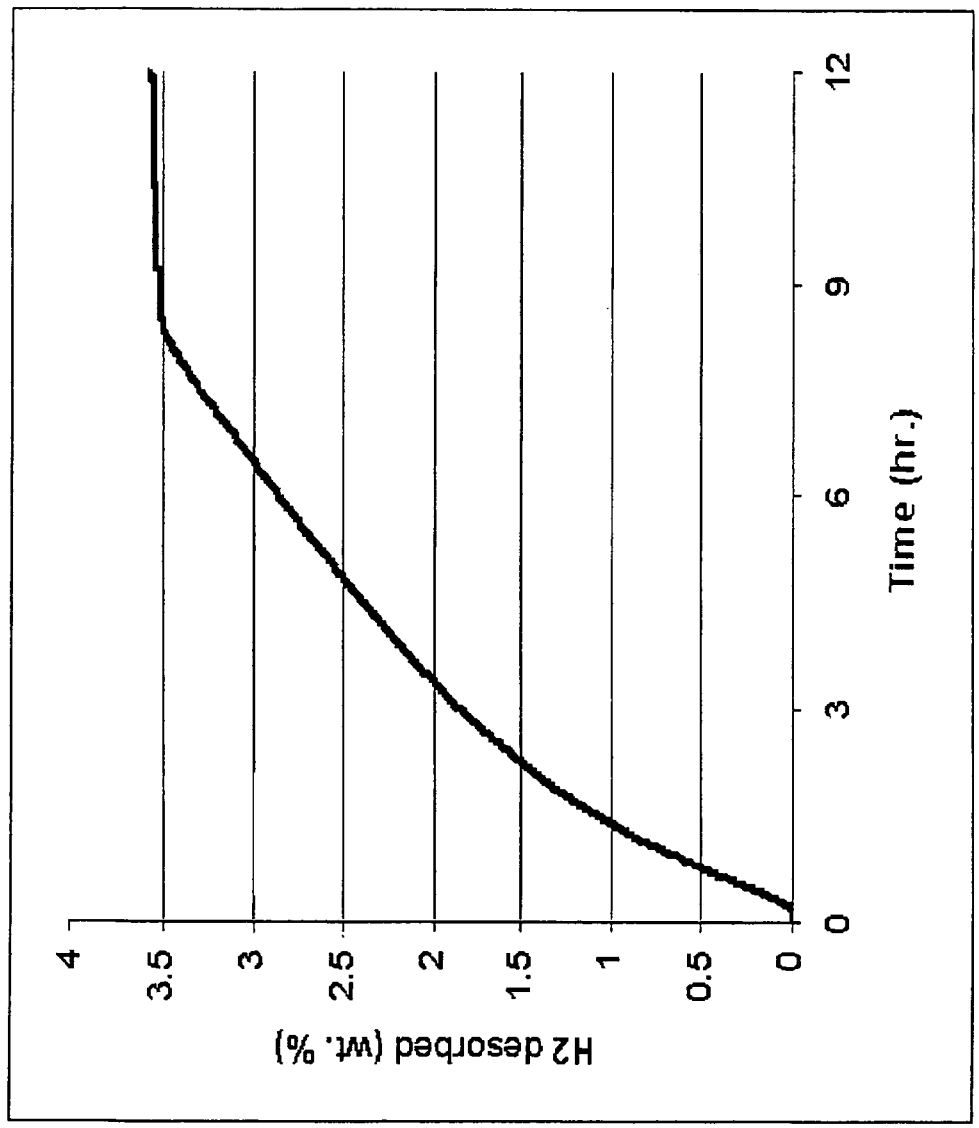

FIG. 12 is a plot of the hydrogen desorption vs. time, cycle #2, of a sample (Example 4) of coronene with palladium metal catalyst.

Figure 13:
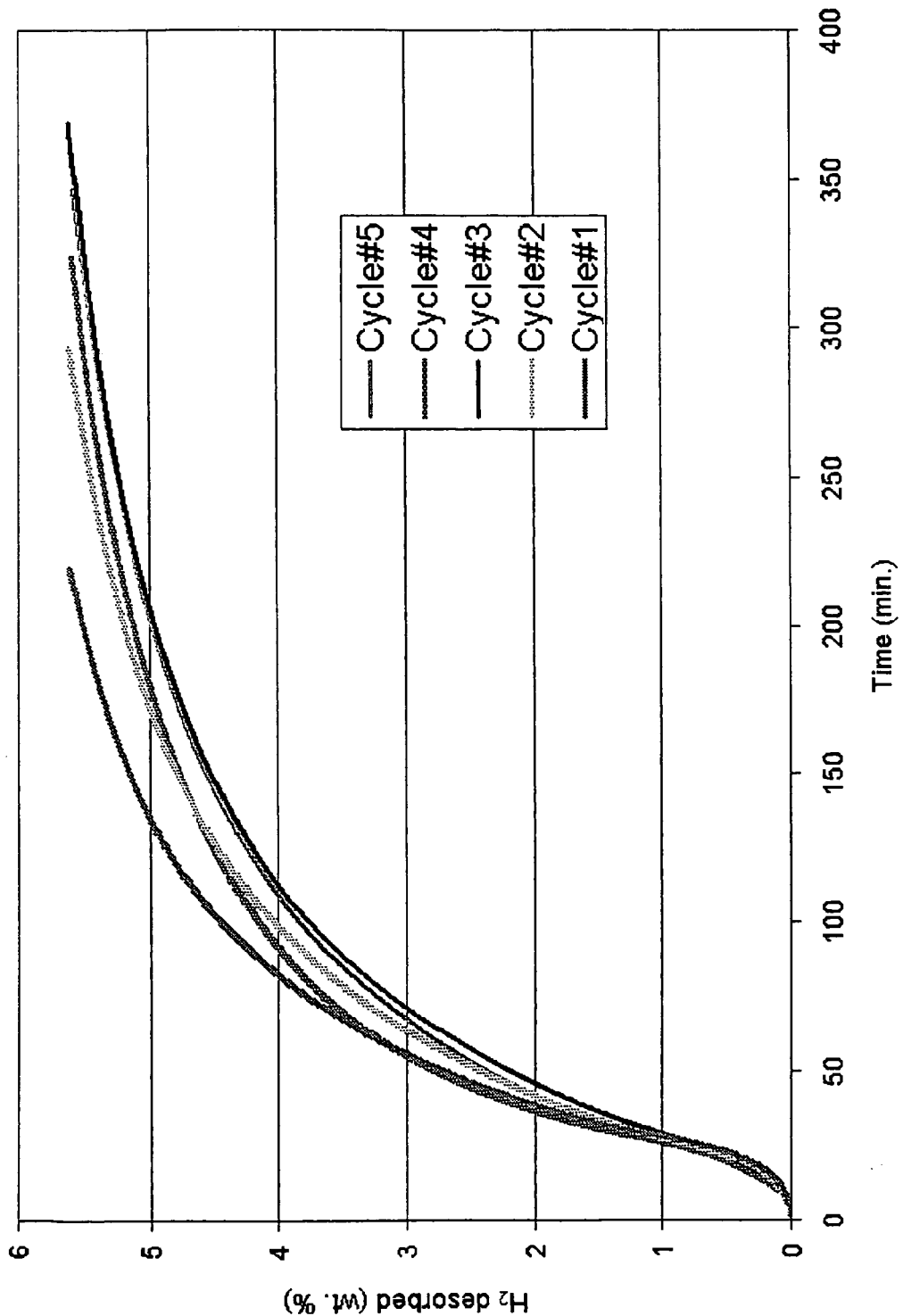

FIG. 13 is a plot for 5 consecutive cycles of the hydrogen desorption vs. time of a sample (Example 10) of N-ethylcarbazole with ruthenium on lithium aluminate and palladium on lithium aluminate catalysts.

Figure 14:
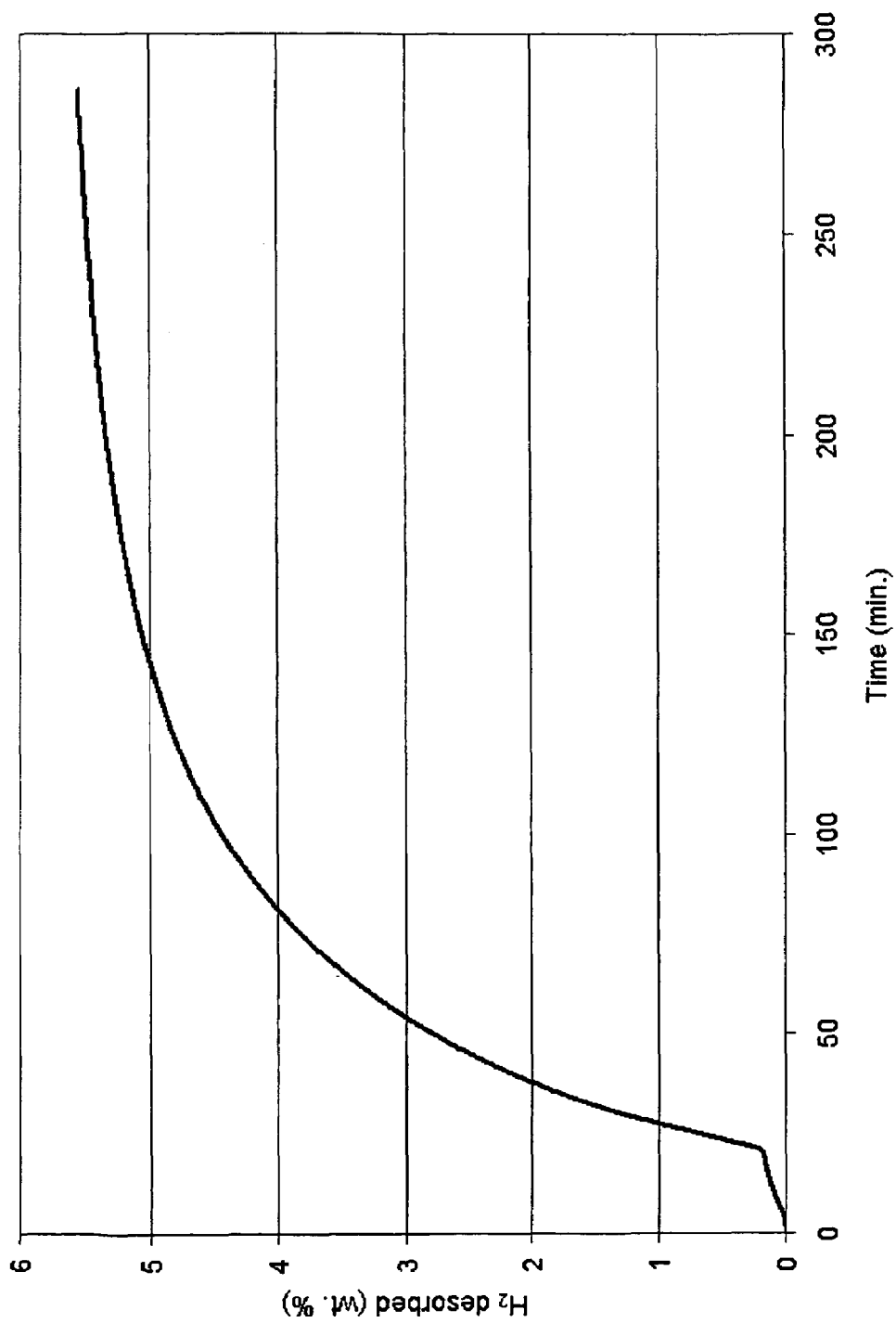

FIG. 14 is a plot of the hydrogen desorption vs. time of a sample (Example 11) of N-ethylcarbazole with palladium on lithium aluminate catalyst.

Figure 15:
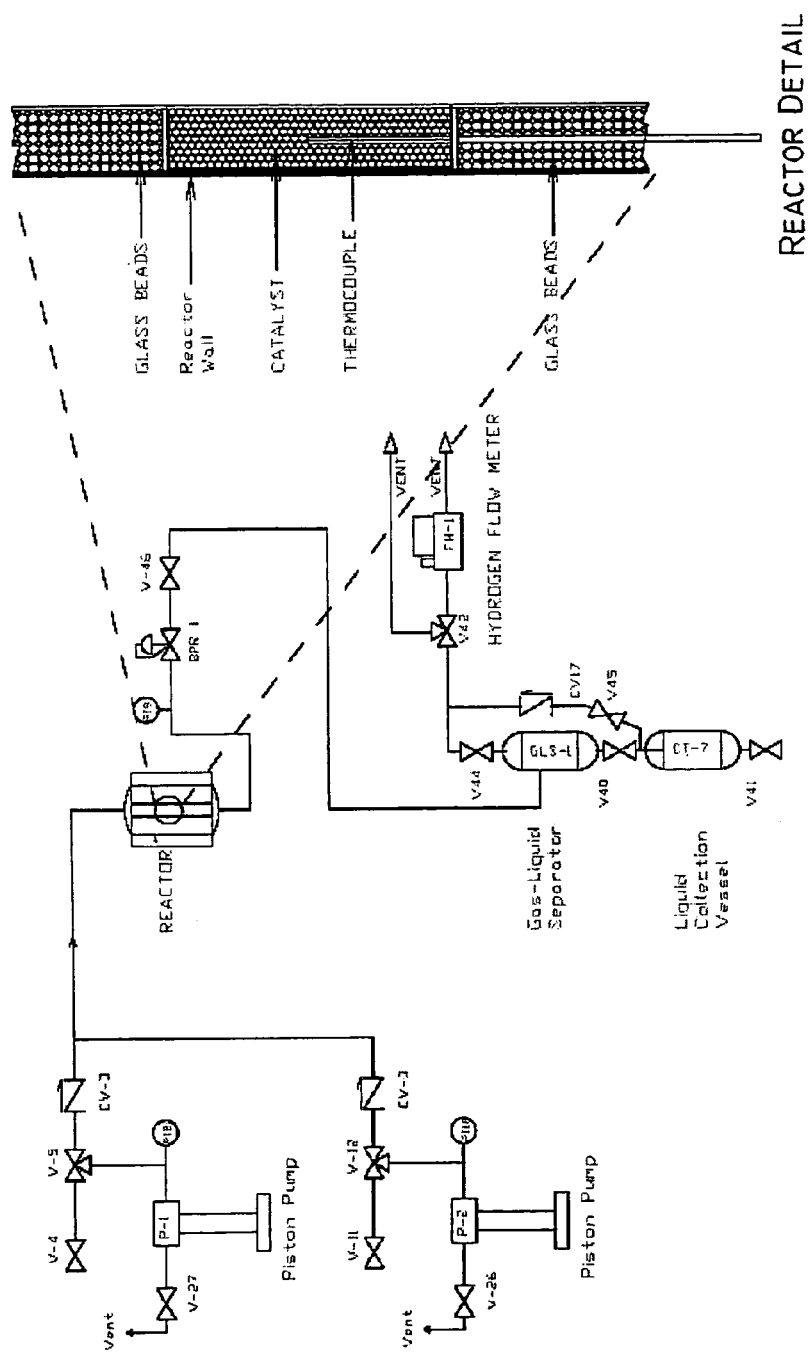

FIG. 15 is a schematic of a continuous flow dehydrogenation reactor (Example 12).

Figure 16:
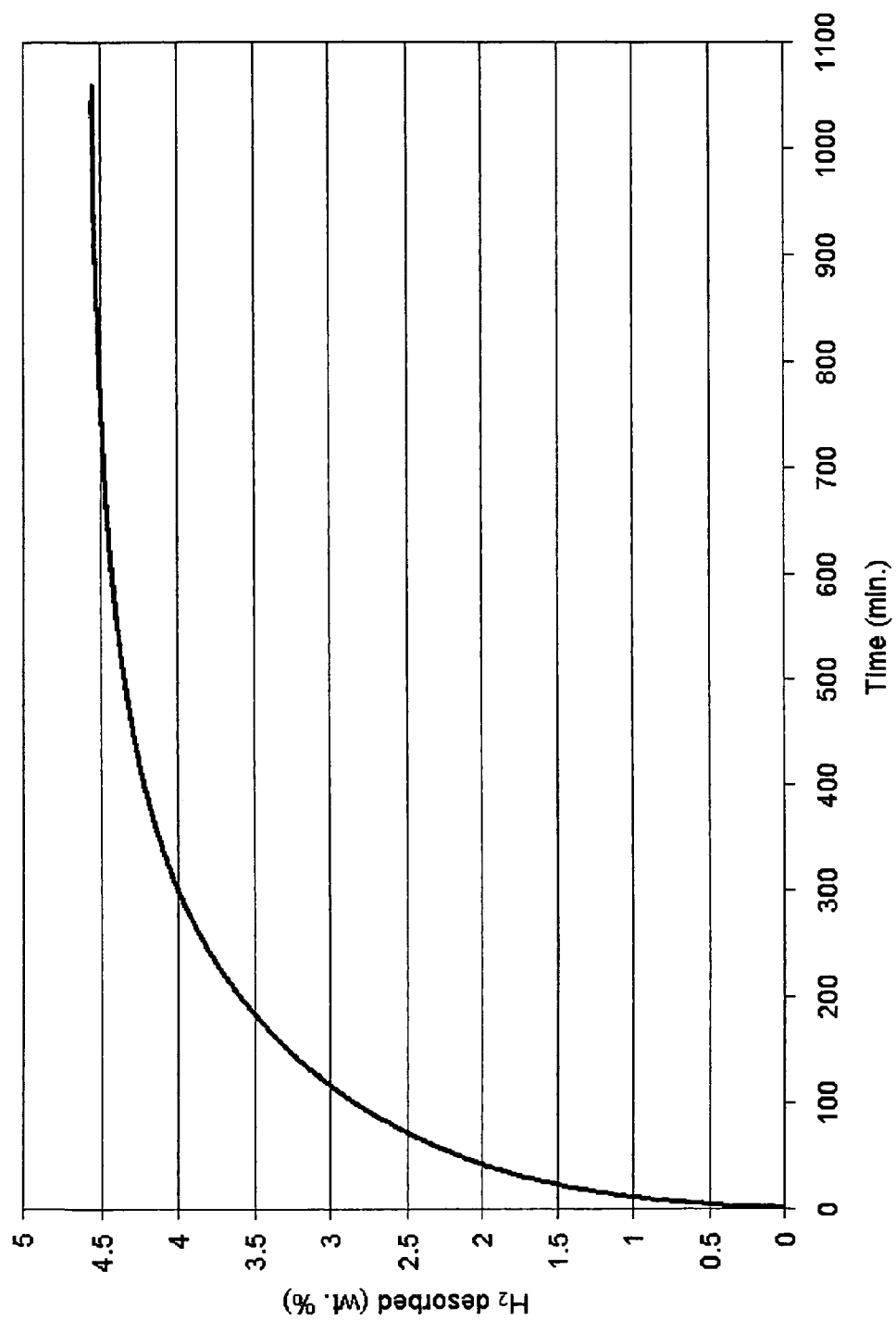

FIG. 16 is a plot of the hydrogen desorption at 180° C. vs. time of a sample (Example 15) of 1-ethyl-2-methylindole with palladium on alumina catalyst.

Figure 17:
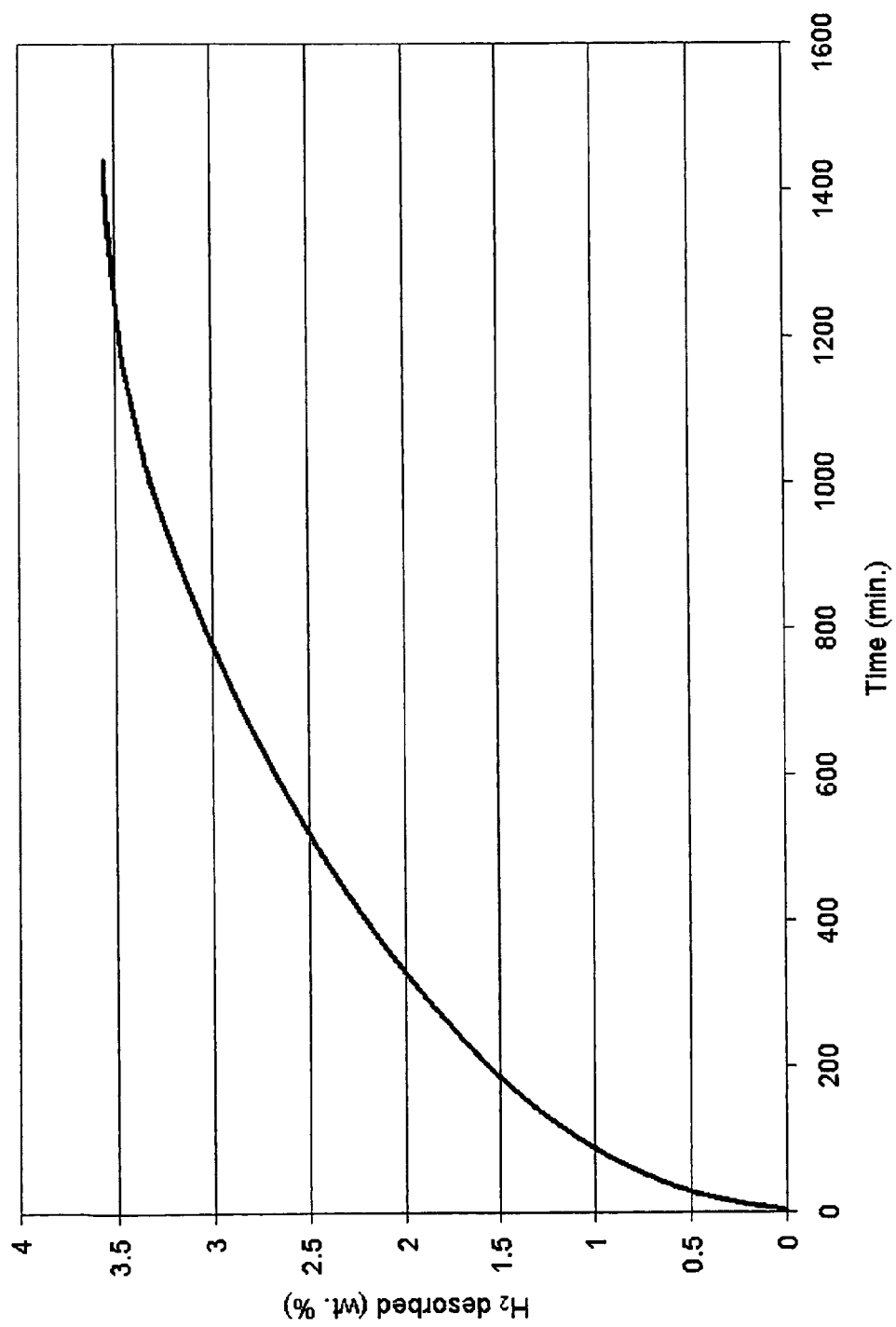

FIG. 17 is a plot of the hydrogen desorption at 160° C. vs. time of a sample (Example 15) of 1-ethyl-2-methylindole with palladium on alumina catalyst.

Figure 18:
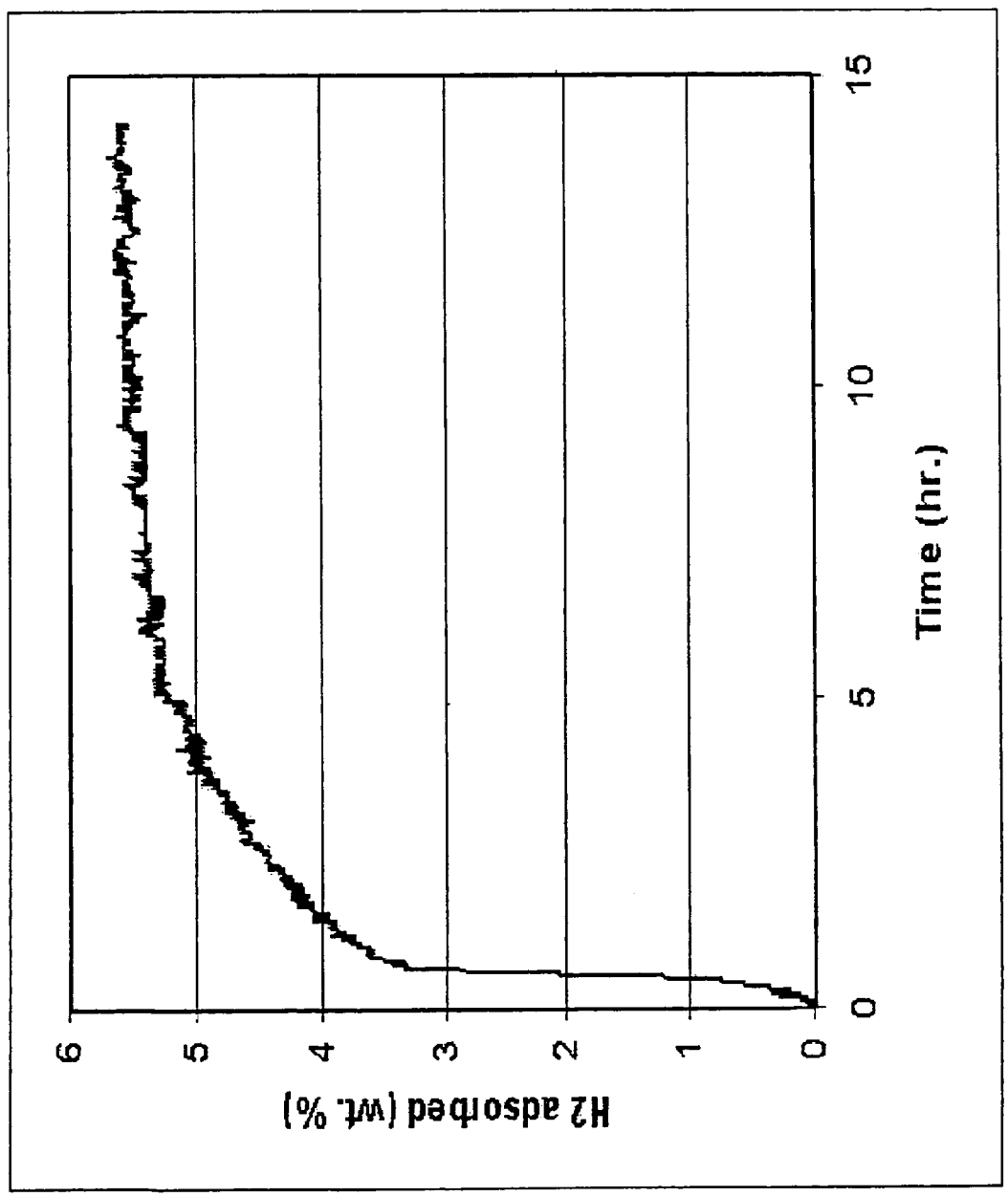

FIG. 18 is a plot of the hydrogen adsorption vs. time of a sample (Comparative Example 1) of pentacene with 5% Rh on carbon catalyst.

Figure 19:
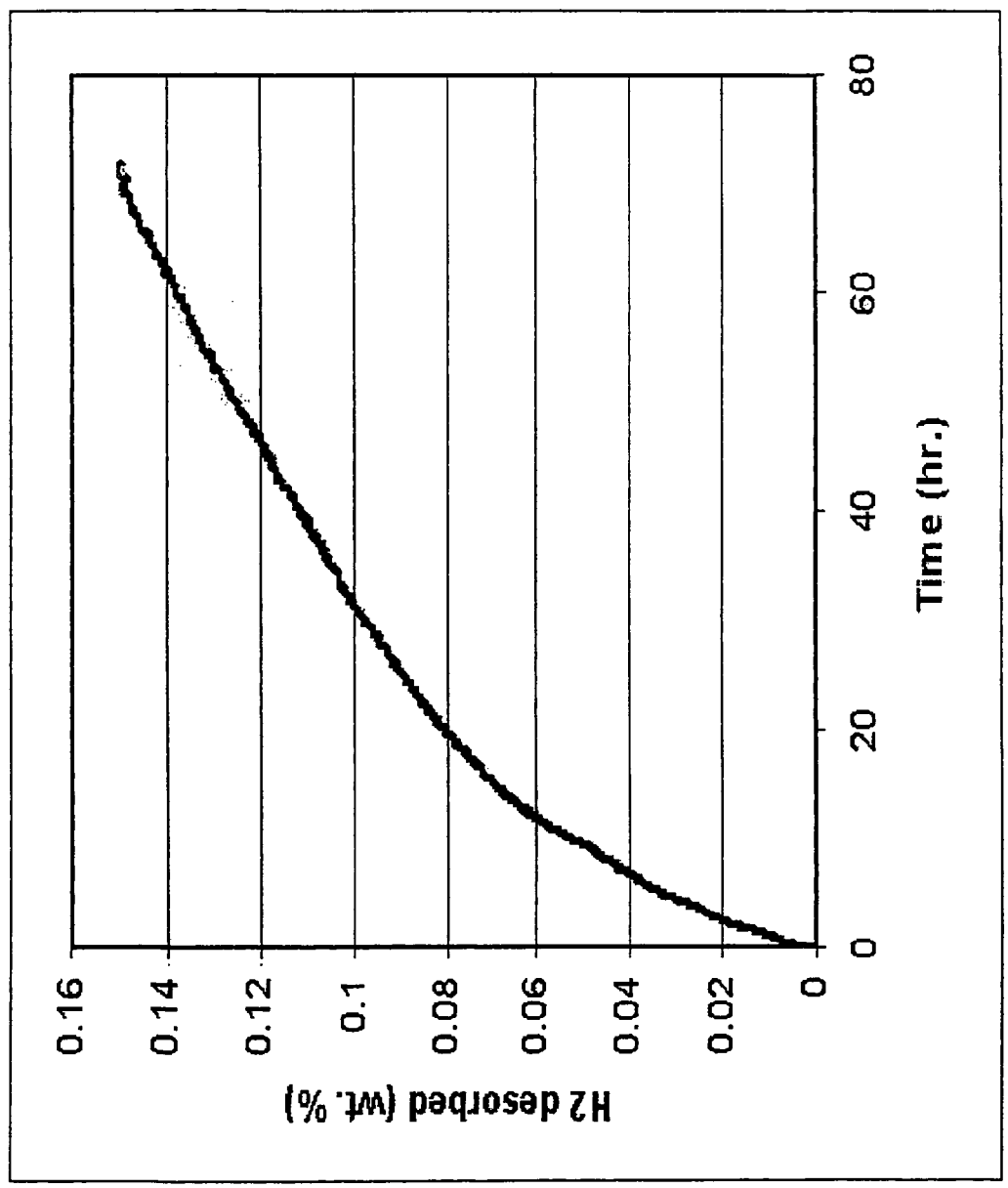

FIG. 19 is a plot of the hydrogen desorption vs. time of a sample (Comparative Example 1) of pentacene with 5% Rh on carbon catalyst.

5. DETAILED DESCRIPTION OF THE INVENTION

Provided herein is a process for the storage of hydrogen by its reversible chemical reaction with extended pi-conjugated substrates. It may be carried out with extended pi-conjugated substrates as herein defined and with reaction parameters, as illustrated by the following computational and experimental examples.

Pi-conjugated (often written in the literature using the Greek letter Π) molecules are structures which are characteristically drawn with a sequence of alternating single and double bonds. But this representation of the chemical bonding is only a means of recognizing such molecules by their classical valence bond structures. It does not alone provide a description of their useful properties in the context of this invention for which concepts of modern molecular orbital theory of bonding need to be invoked.

Figure 1:
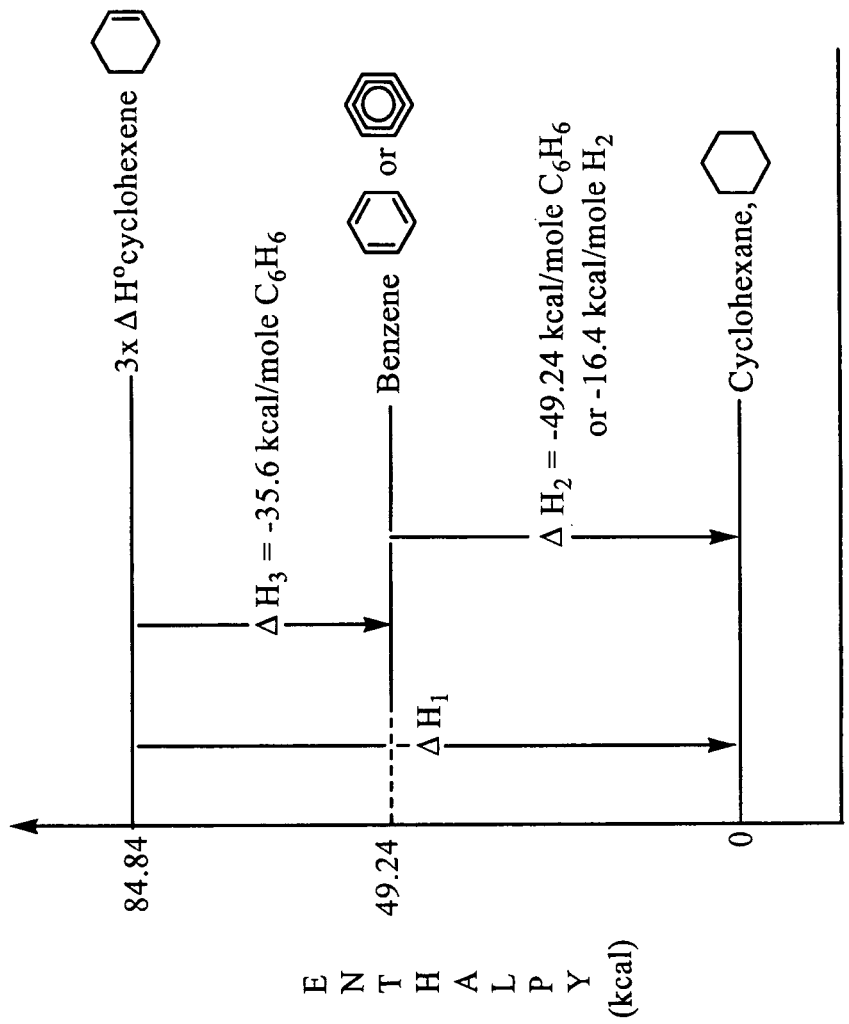
FIG. 1 is a comparison of the enthalpy change for hydrogenating three "isolated" double bonds, exemplified by three molecules of cyclohexene, to cyclohexane and of hydrogenating benzene to the same product. $\Delta H_3$ is the pi-conjugation or resonance stabilization energy for benzene.

In molecular orbital theory, the classically written single bond between two atoms is referred to as a π-bond, and arises from a bonding end-on overlap of two dumbbell shaped "p" electron orbitals. It is symmetrical along the molecular axis and contains the two bonding electrons. In a "double" bond, there is, in addition, a side-on overlap of two "p" orbitals that are perpendicular to the molecular axis and is described as a pi-bond (or "Π-bond"). It also is populated by two electrons but these electrons are usually less strongly held, and more mobile. A molecule that comprises (is depicted as) a sequence of alternating single and double bonds is described as a "pi-conjugated system" in the sense that the pi-electrons of the double bonds can be delocalized over this sequence for the entire molecule. The consequence of this is that the pi-conjugated molecule has a lower overall energy, i.e. is more stable than if its pi-electrons were confined to or localized on the double bonds. This is well evident experimentally in the simplest pi-conjugated system, trans-1,3-butadiene. The heat (enthalpy) change at standard conditions (1 atm. pressure, 25° C.) for hydrogenating the two double bonds to yield butane is −56.24 kcal/mole as compared to a total of −60.06 kcal/mole for hydrogenating two molecules of 1-butene to the same end product. Thus, 1,3-butadiene is more stable by 3.82 kcal/mol because of the internal conjugation, as evidenced by the lower modulus (absolute value) of the negative enthalpy of hydrogenation. As illustrated in FIG. 1, a much larger stabilization from pi-conjugation of 35.6 kcal/mol can be calculated in the same way for benzene compared to cyclohexane and is referred to as its aromatic stabilization energy.

The practical consequence of this additional stability that can be achieved with extended pi-conjugated substrates is that it brings these closer in energy to their corresponding saturated or fully hydrogenated derivatives, i.e. minimizing $\Delta H_2$ in FIG. 1 thus making possible hydrogen storage via catalytic hydrogenation/dehydrogenation processes that are more easily reversible at mild temperatures and are less energy intensive.

This concept can be fully quantified in terms of the basic thermodynamic parameters, enthalpy ($\Delta H$), entropy ($\Delta S$), Gibbs free energy ($\Delta G$), and the equilibrium constant K, for the reversible hydrogenation reaction of substrate A to $A\text{---}H_{2n}$:

$$A + nH_2 \xleftrightarrow{K} A\text{-}H_2 n \qquad (1)$$

by the familiar thermodynamic relationship:

$$\Delta G = -RT \ln K = \Delta H - T \Delta S \qquad (2)$$

where R is the ideal gas constant, T is the reaction temperature (in degrees Kelvin), and $$\text{where } K = [A\text{-}H_{2n}]/[A]P^n_{H2} \qquad (3)$$

where the terms in [ ] refer to concentration or partial pressure of A and $A\text{---}H_2$, and $P_{H2}$ designates the hydrogen partial pressure.

The enthalpy change ($\Delta H$) for hydrogenation of A to $A\text{---}H_{2n}$ at the standard state of 25° C. and 1 atm. $H_2$ will henceforth be referred to as $\Delta H°_{H2}$. Unless otherwise indicated experimentally derived and computational $\Delta H°_{H2}$ data herein refers to compositions in their standard state as gases at 1 atm., 25° C. The most common highly conjugated substrates are the aromatic compounds, benzene and naphthalene. While these can be readily hydrogenated at, e.g., 10-50 atm. at $H_2$ at ca 150° C. in the presence of appropriate catalysts, the reverse reaction—an extensive catalytic dehydrogenation of cyclohexane and decahydronaphthalene (decalin) at about 1 atm. $H_2$ is only possible at much higher temperatures (vide infra). For a practical $H_2$, storage system it is desirable to have the dehydrogenation provide $H_2$ at 1-3 atm. at ca 200° C. for potential use in conjunction with a hydrogen internal combustion engine and preferably at lower temperatures, e.g., 80° C.-120° C., where present day PEM fuel cells operate. The lower dehydrogenation temperatures are also desirable for maintaining the reacting system in a condensed state (solid or preferably liquid) and minimizing coking and other problems that are often encountered in higher temperature catalytic dehydrogenation reactions.

For the hydrogenation of benzene to cyclohexane, a system which has been described in the prior art for hydrogen storage, the experimental enthalpy change at standard conditions (1 atm. pressure gas, 25° C.), $\Delta H°$, is −16.42 kcal/mol $H_2$; $\Delta G$ at 80° C. is −6.17 kcal/mol $H_2$, with a corresponding K=2.91× $10^{11}$ atm.$^{-1}$ and approaches a zero value only at about 280° C. (where K=1.1 atm.$^{-3}$). As shown in FIG. 5, the temperature is required for a 95.24% conversion of cyclohexane to benzene (1), at equilibrium (K=0.05) for this system at 1 atm. $H_2$ is 319° C. (Table 1a).

For the hydrogenation of naphthalene (liquid), $C_{10}H_8$, to cis-decalin (liquid), $C_{10}H_{18}$, (which has also been investigated as a hydrogen storage system), the experimental $\Delta H°$=− 15.13 kcal/mol $H_2$ and $\Delta G$ at 80° C. is −4.87 kcal/mol $H_2$ and approaches zero only at about 235° C. (where K=0.8 atm.$^{-1}$). The temperature for 95.24% conversion of naphthalene, $C_{10}H_8$, to cis-decalin $C_{10}H_{18}$, at equilibrium (K=0.05) for this system at 1 atm. $H_2$ is 319° C. (see Table 1a, 2). Therefore, it is very clear that with the reversible hydrogenation systems of the prior art, a recovery of hydrogen that is stored by hydrogenation will only be possible at quite elevated temperatures. And in addition, as noted earlier, these prior art systems all comprise highly volatile components, which would require another unit operation for their separation from hydrogen.

Described here are extended pi-conjugated substrates which can advantageously be reversibly hydrogenated at much milder conditions than for benzene and naphthalene and are not appreciably volatile, thus precluding the need of a complex separation process for the evolved recovered hydrogen. In one embodiment, these hydrogenated extended pi-conjugated substrates can be dehydrogenated at temperatures below about 250° C. while at hydrogen partial pressures of greater than about 1.449 psia (0.1 bar) and even at pressures in excess of 14.49 psia (1.0 bar) as will be shown by the examples. This is highly unexpected since temperatures required to effect dehydrogenation increase significantly with increasing hydrogen partial pressures. An added advantage of the extended pi-conjugated substrates of this invention is the relative involatility of the substrate, both in hydrogenated and dehydrogenated states, as this eases the separation of the released hydrogen for subsequent usage.

In another embodiment, these hydrogenated extended pi-conjugated substrates can be dehydrogenated at temperatures below about 300° C. while at hydrogen partial pressures of greater than about 1.449 psia (0.1 bar) and even at pressures in excess of 14.49 psia (1.0 bar) as will be shown by the examples.

Equations 2 and 3 fully define the thermodynamic boundaries for the reversible hydrogenation of substrate, A in Equation 1. The enthalpy and entropy change terms for Equation 1, $\Delta H$ and $\Delta S$, respectively, are arrived at from the corresponding experimentally or computationally derived thermodynamic functions for the reaction components, A, $A\text{---}H_{2n}$ and hydrogen. Temperature and hydrogen pressure are process parameters, which for a set of values of $\Delta H$ and $\Delta S$, may be chosen for attaining at reaction equilibrium a high conversion of A to $A\text{---}H_{2n}$: for example, $[A\text{---}H_{2n}]/[A]>20$ for the $H_2$ storage step and conversely $[A\text{---}H_{2n}]/[A]<0.05$ for the reverse reaction. Given $\Delta H$ and $\Delta S$ information for pi-conjugated systems, it should therefore be possible to select a suitable hydrogenation substrate and design an $H_2$ storage and delivery process. Unfortunately, such data is only available for very few systems, i.e., benzene, naphthalene, pyridine, pyrrole, and the corresponding perhydrogenated molecules (cf. Tables 1a and 1b). We have noticed from an analysis of the available data (and confirmed by subsequent calculations) that for the hydrogenation of aromatic substrates, $\Delta S$ which is largely representative of the loss of the translational entropy of the hydrogen molecule, is close to −30 cal/deg. mole of $H_2$. The enthalpy change, $\Delta H$ (expressed as kcal/mol $H_2$) in Equation 1, is therefore the quantity that mostly determines for pi-conjugated substrates the reversibility of this chemistry at specified hydrogenation and dehydrogenation process parameters. Since $\Delta H°$ varies only slightly with temperature, $\Delta H°$, the enthalpy change for the reaction with all components at their standard state (1 atm., 25° C.), is employed here as a first-order indication of the reversibility and hence the usefulness of a given hydrogenation/dehydrogenation reaction system for $H_2$ storage and delivery.

In one embodiment, the invention relates to a practical hydrogen storage device that operates via a reversible hydrogenation of a pi-conjugated system for which the change in enthalpy at standard conditions (referred to hereinafter as $\Delta H°_{H2}$, standard conditions being 25° C. and 1 atm.) of hydrogenation of the substrate is less than about −15.0 kcal/mol $H_2$, (a range of hydrogenation enthalpies enthalpy changes that does not encompass the $\Delta H°_{H2}$ for benzene or the $\Delta H°_{H2}$ for naphthalene to their corresponding hydrocarbons). Substrates having a lower modulus (absolute value) of the negative standard enthalpy change of hydrogenation, will be the more easily dehydrogenated. The modulus of $\Delta H°_{H2}$ is designated henceforth as $|\Delta H°_{H2}|$. Substrates with $|\Delta H°_{H2}|$<about −15.0 kcal/mol $H_2$ will be the more easily dehydrogenated.

In another embodiment, the invention relates to a practical hydrogen storage device that operates via a reversible hydrogenation of a pi-conjugated system, the change in enthalpy at standard conditions of hydrogenation of the substrate as determined experimentally is within the range of about −7.0 to about −20.0 kcal/mol $H_2$.

Figure 2:
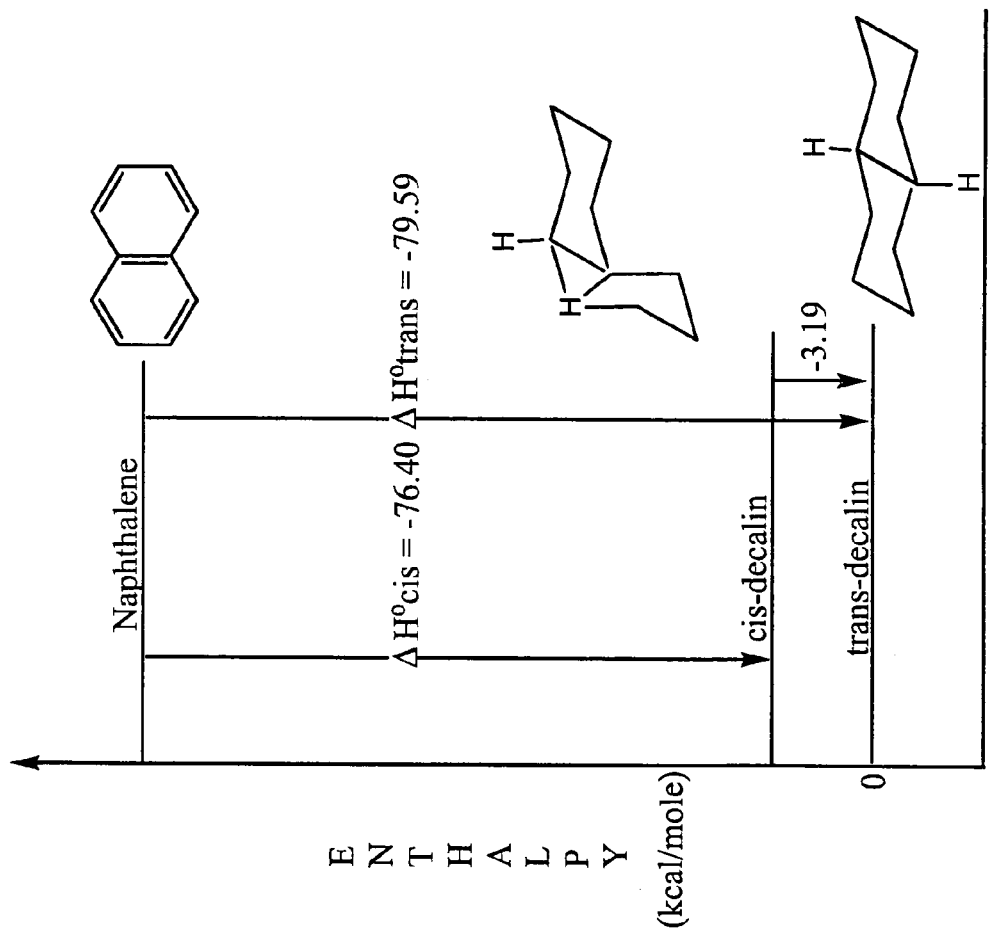
FIG. 2 shows the enthalpy changes, $\Delta H°$, associated with the formation of conformers as exemplified by the hydrogenation of naphthalene to cis- and trans-decalin.

The hydrogenation of the pi-conjugated substrate molecule may in some cases yield more than one product of the same overall chemical composition. There may be found structural isomers or conformers of the product molecule that differ only in the relative disposition of its carbon-hydrogen bonds or of other atoms or groups of atoms in the molecule. The conformers will each have different energies (standard heats of formation, $\Delta H°_f$), the thermodynamically most stable conformer having the lowest $\Delta H°_f$. This occurs in the hydrogenation of naphthalene, which can result in the formation of the two conformers, both saturated molecules, cis-decalin and trans-decalin, which as illustrated by FIG. 2, differ in the relative disposition of the two C—H linkages, along the common carbon-carbon bond. Commercial decalin contains a 67:33 distribution of cis and trans conformers, the latter where the C—H bonds are on opposite sides of the common C—C linkage, is more stable by ca. 3 kcal/mol. Larger, fully hydrogenated pi-conjugated molecules and particularly those containing nitrogen heteroatoms can potentially have a myriad of conformers which may differ in energy ($\Delta H°$) by several kcal/mol vis-à-vis the most stable conformer. In practice, the formation of conformers will depend on the conditions at which the catalytic hydrogenation of the pi-conjugated substrate is carried out; lower hydrogenation reaction temperatures favoring the least stable conformer molecules. As is clear from the illustration for naphthalene in (FIG. 2), the formation of such non-equilibrium conformers provides a means of desirably lowering the hydrogenation enthalpy $\Delta H°_{H2}$ of the pi-conjugated unsaturated molecule, by now making its hydrogenation product less stable, thus enabling the dehydrogenation process to occur at a lower temperature. There may also be in some cases, depending on the catalytic dehydrogenation mechanism, the additional advantage of a kinetically more facile dehydrogenation of the more energetic non-equilibrium conformers.

5.1 Thermodynamic Calculations

A difficulty in defining suitable pi-conjugated substrates for hydrogen storage is that experimentally derived hydrogenation enthalpy change data is available only for relatively small pi-conjugated molecules. Our basis for defining the following classes of extended pi-conjugated substrates suitable for the reversible hydrogenation/dehydrogenation processes of our invention is in terms of their enthalpy of hydrogenation as derived from quantum mechanical (QM) calculations. The calculations were done at two levels of theory: 1) Using the PM3 (Parametric Method 3) semi-empirical QM algorithm for a prediction of $\Delta H°$ for the hydrogenation reaction expressed by Equation 1; and 2) employing an ab initio ("from the beginning") QM algorithm that utilizes density functional theory (DFT) which allowed a prediction of both $\Delta H$ and $\Delta S$ for the hydrogenation reaction at any temperature without input of experimental data. For a review of these computational techniques, see "Computational Chemistry—A Practical Guide for Applying Techniques to Real World Problems" by D. Young, Wiley—Interscience, NY, 2001, the entire contents of which are expressly incorporated herein by reference.

5.1.1 Thermodynamic Calculations Carried Out Using the Semi-Empirical PM3 Algorithm The PM3 method was implemented using the commercial software program package Spartan 02 and Spartan 04 by Wavefunction Inc., Irvine, Calif. In performing the calculations, all structures were first fully optimized in their molecular geometry by an energy minimization procedure. The conformation of the hydrogenated species was carefully chosen so that the adjacent hydrogen atoms are present alternatively at opposite sides of the aromatic planes; the ultimate criteria being a selection of the conformer of lowest energy. It is known that PM3 incorrectly yields the heat of formation for the $H_2$ molecule. However, by replacing it with the experimental value of the heat of formation for $H_2$ at its standard state, we obtain the value of heat of reaction at standard conditions, $\Delta H°$, for hydrogenation that is in fair agreement with the available experimental data. For example, for hydrogenation of benzene (gas) to cyclohexane (gas), the calculated value of $\Delta H°$ is −18.16 kcal/mol $H_2$ (exp.−16.42 kcal/mol $H_2$); for hydrogenation of naphthalene (gas) to trans-decalin (gas), the calculated value is −17.03 kcal/mol $H_2$ (exp.−15.96 kcal/mol $H_2$). While a similar level of accuracy was also found for other all carbon-hydrogen only aromatic compounds, the technique appears to be somewhat less satisfactory when applied to compounds with nitrogen or other hetero atoms for which the ab initio DFT method is much more reliable (see below). Nevertheless, PM3 works satisfactorily for providing the correct trend of $\Delta H°_f$ values over a range of similar molecules. And it is the only method available for very large systems (>about seven, five or six-membered rings) where the computational cost for the more sophisticated and higher precision ab initio methods would be impractical. Therefore we have only used the PM3 method for calculating $\Delta H°$ of hydrogenation for the series of polyaromatic hydrocarbons (FIGS. 6 and 7) which comprise relatively larger molecules (greater than about seven five- or six-membered rings) for which the computational cost of the ab initio DFT methodology would be prohibitive.

5.1.2 Thermodynamic Calculations Carried Out Using the Ab Initio Density Functional Theory Computational Approach In the ab initio DFT computational approach, the molecular geometry is as before carefully selected to ensure that the lowest energy conformer has been chosen. The final geometry optimization is carried out using the B3LYP functional with a 6-311 G or higher basis set (see Chapter 5 and 10, respectively in the above "Computational Chemistry" reference). This calculation also provides the electronic energy, E of the molecule. The molecule's normal vibrational frequencies are estimated using the harmonic oscillator approximation, derived from the second derivative of the energy. The frequencies are a measure of the vibrational energy of the molecule from which using standard methods of statistical mechanics, treating the molecule as an ideal gas, the total vibrational enthalpy, Hv and entropy, Sv are determined as a function of temperature. Rotational and translational contributions to the enthalpy ($H_R$, $H_T$) and entropy ($S_R$, $S_T$) and the external energy of the molecule ($R_T$ where R is the gas constant) are also included. In summary, the enthalpy change, $\Delta H$ for the hydrogenation of substrate A to A—$H_{2n}$ (Equation 1) is given by:

$$\Delta H = \Delta E + sHv(A{-}H_{2n}) - sHv(A) - [Hv(H_2) + H_R(H_2) + H_T(H_2) + RT] \quad (4)$$

The harmonic oscillator approximation is known to result in an over-estimate of the vibrational frequencies and thus the vibrational enthalpy, $H_v$. This situation is commonly remedied (see "Computational Chemistry Chapter 11") by modifying the calculated $H_v$'s for the organic molecules by the scaling factor s, which for a hydrogenation of aromatic molecules we have empirically determined as 0.8. This as described ab initio computational method provides hydrogenation enthalpies, $\Delta H°$ which agree well (within +1 kcal/mol $H_2$) with available experimental data (cf. Table 1 data for benzene (1), naphthalene ($2_{cis}$, $3_{trans}$), etc.). The entropy change for hydrogenation, $\Delta S$ is given by:

$$\Delta S = S(A{-}H_{2n}) - S(H_v) - [S_v(H_2) + S_R(H_2) + S_T(H_2)] \quad (5)$$

In practice, for the hydrogenation of pi-unsaturated compounds the translational entropy for hydrogen, $S_T(H_2)$, largely predominates and as assumed earlier, $\Delta S_{H2}$ at standard condition for many systems is close to −30 cal/deg. mol. The thus estimated values of $\Delta H$ and $\Delta S$ along with Equations 2 and 3 were used to estimate the temperature at which 95.24% of the hydrogenated carrier, A—$H_{2n}$ would be converted back to the pi-unsaturated substrate, A, at 1 atm. of $H_2$, i.e., where K=[A—$H_{2n}$]/[A] (Equation 3) at reaction equilibrium at this temperature and $H_2$ pressure is equal to 0.05 atm.$^{-n}$. The corresponding temperatures for selected carriers were estimated from published experimental data (where available, e.g., the NIST Standard Reference Database No. 69 (March 2003)) using the HSC5 Chemistry for Windows software program package (Outokumpu Research, Finland). The thus calculated dehydrogenation temperature results using (a) the specific above described ab initio DFT method and (b) experimental data (where available, including the NIST database) is collected in FIG. 5 for a number of pi-conjugated substrates.

Experimentally determined values for the hydrogenation enthalpies can be obtained from measuring the heat of combustion of hydrogenated and dehydrogenated substrates to products of known thermodynamic properties (i.e., $CO_2$, $H_2O$, NO, or $N_2$) using known in the art or methods as described in Example 13 of the present application.

For the purposes of this description and the claims, "extended pi-conjugated substrates" are defined to include extended polycyclic aromatic hydrocarbons, extended pi-conjugated substrates with nitrogen heteroatoms, extended pi-conjugated substrates with heteroatoms other than nitrogen, pi-conjugated organic polymers or oligomers, ionic pi-conjugated substrates, pi-conjugated monocyclic substrates with multiple nitrogen heteroatoms, pi-conjugated substrates with at least one triple bonded group and selected fractions of coal tar or pitch that have as major components the above classes of pi-conjugated substrates, or any combination of two or more of the foregoing. These classes are further defined below, and non-limiting embodiments of species falling within these classes are provided.

In one embodiment, the modulus of the standard enthalpy change of hydrogenation of the extended pi-conjugated substrate, $|\Delta H°_{H2}|$, to their corresponding saturated counterparts (e.g., the at least partially hydrogenated extended pi-conjugated substrates) is less than about 15.0 kcal/mol $H_2$ as determined experimentally (e.g., by combustion methods described above) or by the above-described ab initio DFT method. Accordingly, such molecules would therefore be suitable as reversible hydrogenation substrates for storing hydrogen according to this invention.

The $\Delta H°_{H2}$ reaction enthalpies in FIG. 3, Tables 1a-1d and the dehydrogenation temperature data (FIG. 5) provide an instructive and useful classification of pi-conjugated substrates in terms of their suitability for hydrogen storage. Referring to the "Exp." column of data in FIG. 3, for the substrates/reaction systems 1, 2, 3, and 5 (respectively; benzene/cyclohexane; naphthalene/cis-decalin; naphthalene to trans-decalin and pyridine to pyrimidine) the modulus of $\Delta H°_{H2}$ is greater than about 15 kcal/mole, at least for the first three of these systems which have been touted in the prior art for $H_2$ storage. The molecules (1, 2, 3, and 5) also fit under this classification on the basis of $\Delta H°_{H2}$ data as calculated by ab initio DFT method, for which the agreement (within 1 kcal/mol $H_2$) with the experimentally derived data is excellent.

With confidence in the precision of ab initio DFT method we claim the use of pi-unsaturated substrates of this invention molecules for which the modulus of $\Delta H°_{H2}$ is less than about 15 kcal/mol $H_2$. Referring now to FIG. 5: On the basis of both experimental and ab initio DFT method calculations, the hydrogenated forms of molecules 1 to 5 are expected to be at equilibrium, ca. 95% in the dehydrogenated form at about above about 240° C., which is indicated by the horizontal dotted line at 1 atm. $H_2$ pressure. The fully hydrogenated reaction systems of this invention as exemplified in FIG. 5 by pi-conjugated substrates 6 to 19 are expected to undergo a ca. 95% dehydrogenation under 1 atm. $H_2$ at temperatures below about 250° C. Surprisingly, some of these molecules are predicted to de-hydrogenate even below 100° C.; (this would also require appropriately reactive catalysts).

In another embodiment, we claim the use of pi-unsaturated substrates of this invention molecules for which the modulus of $\Delta H°_{H2}$ is less than about 20 kcal/mol $H_2$.

While the extended pi-conjugated substrates useful for reversible hydrogenation in accordance with this invention are represented as the unhydrogenated form of the substrate molecule, the actual substrate subjected to hydrogenation may already have some degree of hydrogenation. For purposes of the hydrogenation/dehydrogenation cycle to store and release hydrogen and to re-hydrogenate the substrate, the extended pi-conjugated substrate may exist and be cycled between different levels of full or partial hydrogenation and dehydrogenation as to either the individual molecules or as to the bulk of the substrate, depending upon the degree of conversion of the hydrogenation and dehydrogenation reactions. The levels of hydrogenation and dehydrogenation of the starting extended pi-conjugated substrate and the at least partially hydrogenated extended pi-conjugated substrate will be selected to provide the requisite level of hydrogen storage and release under practical operating conditions and requirements. The substrates useful according to this invention may also have various ring substituents, such as -n-alkyl, -branched-chain alkyl, -alkoxy, -nitrile, -ether and -polyether, which may improve some properties such as melting temperature of the substrate while at the same time not adversely interfering with the hydrogenation/dehydrogenation equilibrium but due to the increased weight resulting in some loss of $H_2$ storage hydrogen storage capacity of the substrate. Preferably, any of such substituent groups would have 12 or less carbons. As discussed below in the section on "Pi-conjugated Substrates with Multiple Nitrogen Heteroatoms" alkyl substituents (and it's expected that also alkoxy substituents) will actually favorably slightly lower the modulus of the heat of hydrogenation, $\Delta H°_{H2}$

5.2 Extended Pi-Conjugated Substrates

Classes of extended pi-conjugated substrates suitable for the processes of this invention are further and more specifically defined as follows:

Extended Polycyclic Aromatic Hydrocarbons (EPAH). For the purposes of this description and the claims, "extended polycyclic aromatic hydrocarbons" are defined to be those molecules having either (1) a polycyclic aromatic hydrocarbon comprising a fused ring system having at least four rings wherein all rings of the fused ring system are represented as 6-membered aromatic sextet structures; or (2) a polycyclic aromatic hydrocarbon of more than two rings comprising a six-membered aromatic sextet ring fused with a 5-membered ring.

The EPAH molecules represent a particular class of extended pi-conjugated substrates since their pi electrons are largely delocalized over the molecule. While, on a thermodynamic basis, generally preferred are the larger molecules (i.e., those with considerably more than four rings), the value of the standard enthalpy change of hydrogenation, $\Delta H°_{H2}$, and thus the ease of reversible hydrogenation can be very dependent on the "external" shape or structure of the EPAH molecule. Fundamentally, the EPAH molecules that have the highest aromatic resonance stabilization energy will have the lowest modulus (absolute value) of the standard enthalphy of hydrogenation, $\Delta H°_{H2}$. As is taught by E. Clar in "Polycyclic Hydrocarbons" Academic Press, 1984, Chapter 6, it is a general principle that the stability of isomers of fused ring substrates increases with the number of aromatic sextets. For instance anthracene

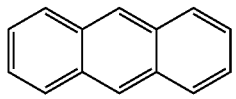

has one aromatic sextet (conventionally represented by three alternating single and double bonds in a single ring or by an internal circle), as for benzene, while phenanthrene,

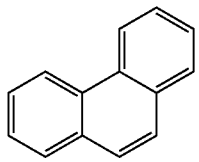

has two aromatic sextets, with the result that phenanthrene is more stable by 4.4 kcal/mol (based on the molecules' relative heats of formation).

Thus, according to this invention, for a EPAH of a given number of fused rings the structural isomer that is represented with the largest number of aromatic sextets will be preferred as a hydrogenation/dehydrogenation extended pi-conjugated substrate. EPAH's with a large number of aromatic sextets are preferred structures in accordance with this invention. These two criteria provides a useful but only qualitative indication of the relative $\Delta H_{H2}$ of hydrogenation of a series of EPAH isomers and EPAH molecules of varying size.

Quantum mechanics calculations utilizing the PM3 methodology provide a more useful and quantitative but only approximate prediction of the $\Delta H°_{H2}$ values for hydrogenation as summarized in FIG. 6 for the represented molecules.

In FIG. 6, Curve I shows the variation of $\Delta H°_{H2}$ of hydrogenation for a series of linear polyacenes for which the first three members are benzene, naphthalene, and anthracene. The heat, or enthalpy, of hydrogenation reaches its least negative value (smallest more favorably $|\Delta H°_{H2}|$) at naphthalene (2 rings) and becomes increasingly more negative with an increasing number of aromatic rings. We have discovered that fusing the aromatic rings in a staggered ("armchair") linear arrangement results in a less negative $\Delta H$ $H_2$ of hydrogenation as the number of rings increases (FIG. 6, Curve II). We have observed a more pronounced effect of fused ring number on $\Delta H°_{H2}$ of hydrogenation for a series of roughly circular polyaromatic hydrocarbons (FIG. 6, Curve III). Increasing the number of fused rings from pyrene (4 rings) to coronene (7 rings) results in a decrease of 1.72 kcal/mol $H_2$ in the modulus of the $\Delta H°$ of hydrogenation. This curve portraying larger and still larger polyaromatic hydrocarbons suggests that the $\Delta H°$ of hydrogenation of a single sheet of graphite will be of the order of about −8 to about −11 kcal/mol $H_2$ and represents the ultimate in large molecular size (if not the ideal) potentially reversibly hydrogenable polyaromatic hydrocarbons. The large effect of polyaromatic hydrocarbon shape on the $\Delta H°$ of hydrogenation can also be illustrated by comparing the $\Delta H°$ of hydrogenation values for the three 13-ring polyaromatic hydrocarbons in FIG. 6. There is a span of over 5.5 kcal/mol $H_2$ between the (PM3 derived) $\Delta H°$ of hydrogenation of hexabenzocoronene ($C_{42}H_{18}$, −12.9 kcal/mol $H_2$):

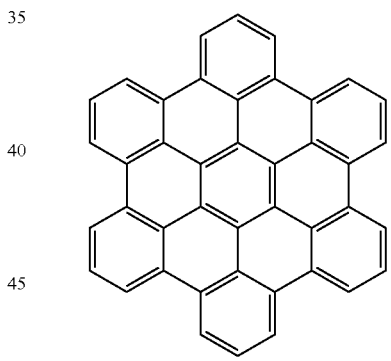

and the also 13-ring linear polyacene of curve I of FIG. 6 for which the (PM3) $\Delta H°$ of hydrogenation is −18.4 kcal/mol $H_2$.

Other non-limiting examples polycyclic aromatic hydrocarbons particularly useful according this invention include pyrene, perylene, coronene, ovalene, picene and rubicene.

As noted above, EPAH's comprising 5-membered rings are defined to be those molecules comprising a six-membered aromatic sextet ring fused with a 5-membered ring. We have also discovered that, surprisingly, these pi-conjugated substrates comprising 5-membered rings would provide effective reversible hydrogen storage substrates according to this invention since they have a lower modulus of the $\Delta H°$ of hydrogenation than the corresponding conjugated system in a 6-membered ring. The calculated (PM3) $\Delta H°$ for hydrogenation of three linear, fused 6-membered rings (anthracene) is −17.1 kcal/mol $H_2$. Replacing the center 6-membered ring with a 5-membered ring gives a molecule (fluorene, $C_{13}H_{10}$)

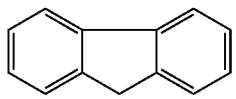

that has a (PM3) calculated standard enthalpy, $\Delta H°$, of hydrogenation of $-15.4$ kcal/mol $H_2$. The corresponding values of this $\Delta H°_{H2}$ as determined by the more precise ab initio DFT method are $-15.8$ kcal/mol $H_2$ for anthracene and $-14.4$ kcal/mol $H_2$ for fluorene. Non-limiting examples of fused ring structures having a five-membered ring include fluorene, indene and acenanaphthylene.

For the purposes of this description and the claims, extended polycyclic aromatic hydrocarbons also include structures wherein at least one of such carbon ring structures comprises a ketone group in the ring structure and the ring structure with the ketone group is fused to at least one carbon ring structure which is represented as an aromatic sextet.

There are prior art teachings on hydrogen storage utilizing the reversible catalytic hydrogenation of simple ketones, e.g., acetone [DE 100557MA1 (2002)] to the corresponding alcohols, for which the hydrogen storage capacities are relatively low. However, we have discovered that by introducing the hydrogenable ketone substituents into polyaromatic substrates with which it is conjugated, acceptable heats and hydrogen storage capacities are achievable. Thus for the pigment pyranthrone,

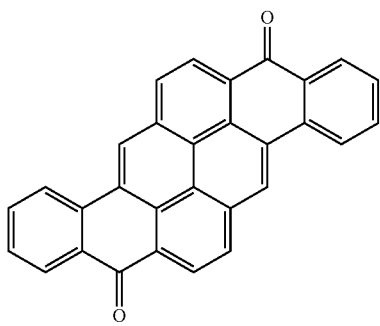

the standard enthalpy of hydrogenation is calculated by the PM3 method to be $-14.4$ kcal/mol $H_2$.

Extended polycyclic aromatic hydrocarbons are available from Aldrich Chemical Company, Milwaukee, Wis.; Lancaster Synthesis, Windham, N.H.; and Acros Organics, Pittsburgh, Pa.; or can be prepared by known methods (see E. Clar, "Polycyclic Hydrocarbons", Academic Press, New York, 1964, Chapter 19)

Extended Pi-conjugated Substrates with Nitrogen Heteroatoms. For purposes of this description and invention, "extended pi-conjugated substrates with nitrogen heteroatoms" are defined as those N-heterocyclic molecules having (1) a five-membered cyclic unsaturated hydrocarbon containing a nitrogen atom in the five membered aromatic ring; or (2) a six-membered cyclic aromatic hydrocarbon containing a nitrogen atom in the six membered aromatic ring; wherein the N-heterocyclic molecule is fused to at least one six-membered aromatic sextet structure which may also contain a nitrogen heteroatom.

Pyridine is known to have a greater aromatic stabilization energy than benzene and hence a lower $\Delta H°_{H2}$ (Table 1). We have found that an introduction of N heteroatoms (i.e., replacing carbons) in polycyclic aromatic hydrocarbons also generally results in a lower modulus (absolute value) of the standard enthalpy of hydrogenation, $\Delta H°_{H2}$, i.e. a higher aromatic (or pi-conjugation) stabilization energy than their corresponding all carbon counterparts. This trend is illustrated in FIG. 7 where it should be noted that the $H°_{H2}$ data was calculated using the PM3 method which, although less precise than DFT does correctly show the relative trend of hydrogenation enthalpies as validated both by the more precise DFT calculations for some of the smaller molecules (cf. Tables 1a and 1 b) The substitution of a nitrogen heteroatom for a carbon atom in a six membered sextet structure ring results in retention of the sextet structure. We have observed an even more remarkable decrease in standard enthalpy of hydrogenation, $\Delta H°$, for the staggered ("armchair") linear polyaromatic hydrocarbon with the substitution of one N heteroatom per aromatic ring. For the series of staggered ("armchair") linear polyaromatic hydrocarbon from 3 to 14 rings, (Curves III and IV in FIG. 7) there is an approximately 3.5 kcal/mol $H_2$ less negative (PM3 calculated) $\Delta H°_{H2}$ when one of the carbon atoms per ring is replaced by a nitrogen atom. And once again, we have observed that the overall external "shape" of the molecule can greatly affect the standard enthalpy of hydrogenation, $\Delta H°$. The N heteroatom polycyclic hydrocarbons that contain the greatest number of pyridine-like aromatic sextets will be the most preferred structure and have the lowest modulus of the standard enthalpy of hydrogenation $\Delta H°_{H2}$ structures. The incorporation of two N atoms in a six membered ring (i.e., replacing carbons) provides an even further advantage, the effect on $\Delta H°_{H2}$ depending on the nitrogens' relative positional substitution pattern. A particularly germane example is provided by 1,4,5,8,9,12-hexaazatriphenylene, $C_{18}H_6N_6$,

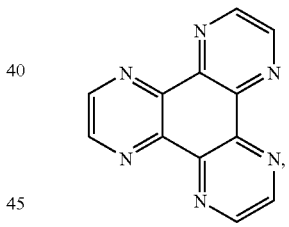

and its perhydrogenated derivative, $C_{12}H_{24}N_6$ system

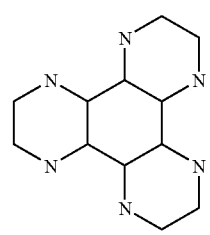

for which the (DFT calculated) $\Delta H°_{H2}$ of hydrogenation is $-11.5$ kcal/mol $H_2$ as compared to the (DFT calculated) $\Delta H°_{H2}$ of hydrogenation of $-14.2$ kcal/mol $H_2$ for the corresponding all carbon triphenylene, perhydrotriphenylene system. Another representative example is pyrazine[2,3-b]pyrazine:

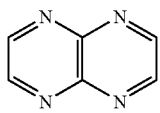

where the (DFT calculated) of $\Delta H°_{H2}$ of hydrogenation is −12.5 kcal/mol $H_2$. This is substantially lower than the DFT calculation of $\Delta H°$ of hydrogenation for all carbon naphthalene (−15.1 kcal/mol $H_2$ for cis-decalin and −15.8 kcal/mol $H_2$ for trans-decalin) due to the presence of the four nitrogen atoms in the ring systems.

Pi-conjugated aromatic molecules comprising five membered rings substrate classes identified above and particularly where a nitrogen heteroatom is contained in the five membered ring provide the lowest potential modulus of the $\Delta H°_{H2}$ of hydrogenation of this class of compounds and are therefore effective substrates for hydrogenation/dehydrogenation according to this invention. An experimental example of this is provided by carbazole,

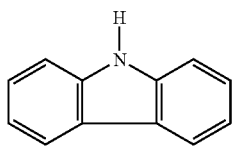

in Example 7, for which the (DFT calculated) $\Delta H°$ of hydrogenation=−12.2 kcal/mol $H_2$; and N-alkylcarbazoles such as N-ethylcarbazole

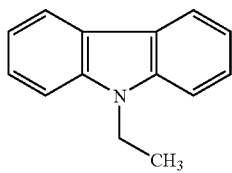

which has a (DFT calculated) $\Delta H°_{H2}$ of hydrogenation of −12.1 kcal/mol $H_2$ and an experimentally measured average $\Delta H°_{H2}$ of hydrogenation (Example 13) that ranges between −11.8 and −12.4 kcal/mol $H_2$.

Other non-limiting examples of polycyclic aromatic hydrocarbons with a nitrogen heteroatom in the five-membered ring fitting this class include the N-alkylindoles such as N-methylindole, 1-ethyl-2-methylindole (see 21 in Table 1b); N-alkylcarbazoles such as N-methylcarbazole and N-propylcarbazole; indolocarbazoles such as indolo[2,3-b]carbazole (see 12 in Table 1b) and indolo[3,2-a]carbazole; and other heterocyclic structure with a nitrogen atom in the 5- and 6-membered rings such as N,N',N''-trimethyl-6,11-dihydro-5H-diindolo[2,3-a:2',3'-c]carbazole (see 42 in Table 1b), 1,7-dihydrobenzo[1,2-b:5,4-b']dipyrrole (see 14 in Table 1b), and 4H-benzo[def]carbazole (see 30 in Table 1 b). All of these compounds have |$\Delta H°_{H2}$| values that are less than 15 kcal/mol $H_2$ with molecules of this class that contain multiple hetero nitrogen atoms (see, e.g., 43, 41 and 19 in Table 1b)) having a |$\Delta H°_{H2}$| that is even less than 11 kcal/mol $H_2$.

The extended pi-conjugated substrates with nitrogen heteroatoms also comprise structures having ketone a group in the ring structure, wherein the ring structure with the ketone group is fused to at least one carbon ring structure which is represented as an aromatic sextet. An example of such structure is the molecule flavanthrone, a commercial vat dye,

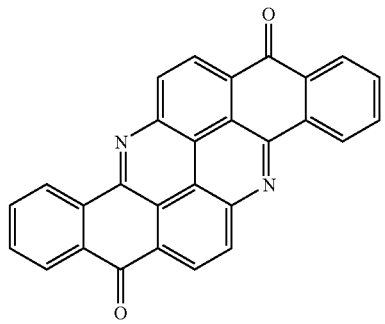

a polycyclic aromatic that contains both nitrogen heteroatoms and keto groups in the ring structure, and has a favorable (PM3 calculated) $\Delta H°$ of hydrogenation of −13.8 kcal/mol $H_2$ for the addition of one hydrogen atom to every site including the oxygen atoms.

Extended pi-conjugated substrates with nitrogen heteroatoms are available from Aldrich Chemical, Lancaster Synthesis and Across, or can be prepared by known methods (see Tetrahedron 55, 2371 (1999) and references therein)

Extended Pi-conjugated Substrates with Heteroatoms other than Nitrogen. For purposes of this description and invention, "extended pi-conjugated substrates with heteroatoms other than nitrogen" are defined as those molecules having a polycyclic aromatic hydrocarbon comprising a fused ring system having at least two rings wherein at least two of such rings of the fused ring system are represented as six-membered aromatic sextet structures or a five-membered pentet wherein at least one ring contains a heteroatom other than nitrogen. An example of an extended pi-conjugated substrate with an oxygen heteroatom is dibenzofuran, $C_{12}H_8O$,

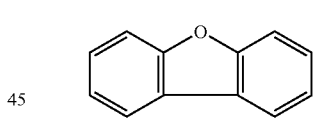

for which the (DFT calculated) $\Delta H°_{H2}$ of hydrogenation is −13.5 kcal/mol $H_2$.

An example of a extended pi-conjugated substrate with an phosphorous heteroatom is phosphindol-1-ol (see 55, table 1c):

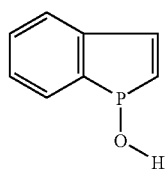

for which the ab initio DFT calculated the $\Delta H°_{H2}$ of hydrogenation is −17 kcal/mol $H_2$.

An example of a extended pi-conjugated substrate with an silicon heteroatom is silaindene (see 56, table 1c):

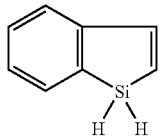

for which the DFT calculated the ΔH° of hydrogenation is −16.4 kcal/mol $H_2$. An example of a extended pi-conjugated substrate with an boron heteroatom is borafluorene (see 29, table 1c):

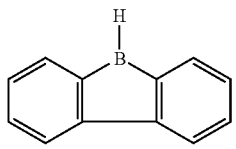

for which the ab initio DFT calculated the ΔH° of hydrogenation is −10.2 kcal/mol $H_2$.

Other non-limiting examples of extended pi-conjugated substrates with heteroatoms other than nitrogen include dibenzothiophene, 1-methylphosphindole, 1-methoxyphosphindole, dimethylsilaindene, and methylboraindole.

Extended pi-conjugated substrates with heteroatoms other than nitrogen are available from Aldrich Chemical, Lancaster Synthesis and Acros.

Pi-conjugated Organic Polymers and Oligomers Containing Heteroatoms. For the purposes of this description and the claims, "pi-conjugated organic polymers and oligomers containing heteroatoms" are defined as those molecules comprising at least two repeat units and containing at least one ring structure represented as an aromatic sextet of conjugated bonds or a five membered ring structure with two double bonds and a heteroatom selected from the group consisting of boron, nitrogen, oxygen, silicon, phosphorus and sulfur. Oligomers will usually be molecules with 3-12 repeat units. This class of materials represents many organic polymers that are electrical conductors or semiconductors, typically after "doping" with a proton source or an oxidant, the latter (doping) not being a requirement for the present invention. While there are often wide variations in the chemical structure of monomers and, often, the inclusion of heteroatoms (e.g., N, S, O) replacing carbon atoms in the ring structure in the monomer units, all of these pi-conjugated polymers and oligomers have the common structural features of chemical unsaturation and an extended conjugation. Generally, while the molecules with sulfur heteroatoms may possess the relative ease of dehydrogenation, they may be disfavored in fuel cell applications because of the potential affects of the presence of the sulfur atoms. The chemical unsaturation and conjugation inherent in this class of polymers and oligomers represents an extended pi-conjugated system, and thus these pi-conjugated polymers and oligomers, particularly those with nitrogen or oxygen heteroatoms replacing carbon atoms in the ring structure, are a potentially suitable substrate for hydrogenation. These pi-conjugated organic polymers and oligomers may comprise repeat units containing at least one aromatic sextet of conjugated bonds or may comprise repeat units containing five membered ring structures. Aromatic rings and small polyaromatic hydrocarbon (e.g., naphthalene) moieties are common in these conducting polymers and oligomers, often in conjugation with heteroatoms and/or olefins. For example, a heteroaromatic ladder polymer or oligomer containing repeat units such as

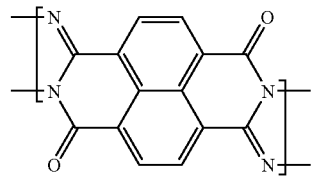

contains a monomer with a naphthalene moiety in conjugation with unsaturated linkages containing nitrogen atoms. We have previously discussed the low modulus of the $\Delta H°_{H2}$ of hydrogenation associated with extended pi-conjugated substrates containing five membered rings and conjugated by nitrogen atoms (see carbazole, above). A pi-conjugated polymer or oligomer formed from a derivatised carbazole monomer repeat unit,

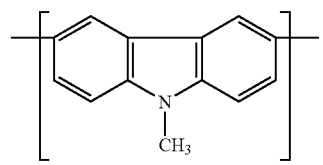

would be expected to demonstrate a low modulus of the ΔH° of hydrogenation as well, at least less than that found for the monomer unit N-methylcarbazole due to the greater conjugation of the oligomers and polymer. Other oligomers that contain 5-membered ring structures with nitrogen atoms are also subject of the present invention. For example, oligomers of pyrrole such as:

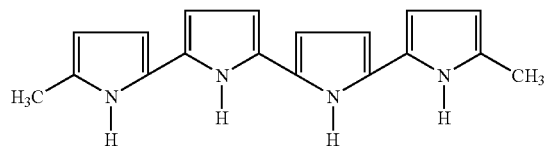

which has four pyrrole monomers terminated by methyl groups has a ab initio DFT calculated $\Delta H°_{H2}$ of hydrogenation of −12.5 kcal/mol $H_2$. Other members of this class of pi-conjugated organic polymers and oligomers which are particularly useful according to this invention as extended pi-conjugated substrates are polyindole, polyaniline, poly(m-ethylcarbazole), and poly(9-vinylcarbazole). The monomers of these compositions have $|\Delta H°_{H2}|<15.0$ kcal/mole $H_2$ and the corresponding more extended pi-conjugated oligomeric or polymeric systems (e.g. polyindole and polycarbazoles) are expected to have even lower values of $|\Delta H°_{H2}|$ Pi-conjugated organic polymers and oligomers are available from Aldrich Chemical Company, Lancaster Synthesis and Acros, or can be prepared by known methods (see "Handbook of Conducting Polymers" T. A. Skotheim et al. Eds. $2^{nd}$ Ed., (1998) Marcel Dekker, Chapter 11.

Ionic Pi-conjugated Substrates. For the purposes of this description and the claims, "ionic pi-conjugated substrates" are defined as those substrates having pi-conjugated cations and/or anions that contain unsaturated ring systems and/or unsaturated linkages between groups. Pi-conjugated systems which contain a secondary amine function; $HNR_2$ can be readily deprotonated by reaction with a strong base, such as lithium or potassium hydride, to yield the corresponding lithium amide or potassium amide salt. Examples of such systems are carbazole, imidazole and pyrrole. N-lithium carbazole and its fully hydrogenated lithium salt derivative were modeled using the same ab initio DFT methodology which afforded a geometry optimized structure with a nitrogen-bound lithium atom at a relatively long N—Li bond distance consistent with the expected highly polar, partially ionic nature of this bond. Surprisingly, for the hydrogenation of N-lithium carbazole $|\Delta H°_{H2}|=8.4$ kcal/mol $H_2$, is significantly lower than that for carbazole ($|\Delta H°_{H2}|=12.4$ kcal/mol). The same calculation carried out on the free anion provided an even lower $|\Delta H°_{H2}|$ for this idealized gas-phase species. However this free anion is not accessible in practice but the calculation teaches that by employing larger aprotic cationic substituents for lithium, e.g., $Na^+$, $K^+$, and $(CH_3)_4N^+$, which are expected to lead to a more polar (i.e., more ionic) metal-nitrogen linkage, it should be possible to realize an even lower $|\Delta H°_{H2}|$ than that for the lithium compound. An alternative would be to solvate or chelate the lithium with a neutral donor solvent or ligand thus further polarizing the metal-nitrogen bond, thereby increasing the effective negative charge on the pi-conjugated anion and lowering $\Delta H°_{H2}$. The hydrogenation of the two aromatic rings in the N-lithium diphenylamine salt, $C_6H_5N(Li)C_6H_5$, for which $|\Delta H°_{H2}|$ is 13.2 kcal/mol $H_2$ is significantly less than the $|\Delta H°_{H2}|=16.4$ kcal/mole $H_2$ of benzene, and provides a further example of the favorable effect of lithium on the standard enthalpy of hydrogenation. Here also, the use of larger cations and polar solvents or chelate ligands; or any such additives that increase the overall effective negative charge on the pi-conjugated anion are expected to lower $|\Delta H°_{H2}|$ vis-à-vis the parent non-ionic pi-conjugated structure.

Ionic pi-conjugated systems of this sub-class are pi-conjugated molecules that exist as salts, or cation-anion paired species wherein the anion of the latter constitutes the pi-conjugated system. The latter comprises the amido, —$NR_2$ or —NHR anionand also the alkoxide —OR anion where —R can be any organic group that is part of a pi-conjugated system. An example of the latter is the dilithium salt of 1,4-dihydroxybenzene $LiO(C_6H_4)OLi$, for which $\Delta H°_{H2}=-11.6$ kcal/mol $H_2$ vis-a-vis a $\Delta H°_{H2}$ of −15.1 kcal/mol $H_2$ for 1,4-dihydroxybenzene.

Non-limiting examples of ionic pi-conjugated substrates include N-lithiocarbazole, N-lithioindole, and N-lithiodiphenylamine and the corresponding N-sodium, N-potassium and N-tetramethylammonium compounds.

Ionic pi-conjugated substrates are available from Aldrich Chemical, Lancaster Synthesis and Acros, or can be prepared by methods commonly practiced in the art. For example, the reaction of a secondary amine with a strong base such as LiH, NaH, KH, methyllithium, or n-butyllithium in an appropriate solvent, such as tetrahydrofuran.

Pi-conjugated monocyclic substrates with multiple nitrogen heteroatoms. For the purposes of this description and the claims, "pi-conjugated monocyclic substrates with multiple nitrogen heteroatoms" are defined as those molecules having a five-membered or six-membered aromatic ring having two or more nitrogen atoms in the aromatic ring structure, wherein the aromatic ring is not fused to another aromatic ring. The pi-conjugated monocyclic substrates with multiple nitrogen heteroatoms may have alkyl, N-monoalkylamino and N,N-dialkylamino substituents on the ring. Pyridine is well known to have a higher resonance stabilization energy than benzene and consistent with this, the modulus of its enthalpy of hydrogenation to piperidine at standard conditions, $|H°_{H2}|$, of ca. 15 kcal/mole $H_2$ is 1.4 kcal/mol $H_2$ lower than that for the hydrogenation of benzene. We have found that by introducing two or more non-adjacent nitrogen heteroatoms (i.e., replacing carbon in the six membered ring) the now thus pi-conjugated monocyclic molecules can usefully display an even lower heat of hydrogenation. Thus for the hydrogenation of 1,4-diazene to the chair form of 1-4-diazacyclohexane, $|\Delta H°_{H2}|=13.5$ kcal mol $H_2$; as compared to that for pyridine, $|\Delta H°_{H2}|=15.2$ kcal/mol $H_2$.

Generally, the substitution of alkyl groups for hydrogen atoms on the ring results in a slight lowering of $\Delta H°_{H2}$. The greatest reduction in the hydrogenation enthalpy however, is seen with amino, —$NH_2$, alkylamino, —NHR, or dialkyl amino, —$NHR_2$, substituents which act as overall electron donating groups to the pi-conjugated monocyclic compound, thus effectively extending its pi-conjugation. An illustration is provided by 1,4-bis(methylamino)benzene for which $\Delta H°_{H2}$ is −13.5 kcal/mol $H_2$, as compared to −16.42 kcal/mol $H_2$ for benzene. However, while substitution of hydrogen for other groups may result in a more favorable $\Delta H°_{H2}$ and more desirable physical properties of the hydrogen carrier, there will be a penalty in terms of gravimetric storage capacity and the substituents should be of minimal molecular weight consistent with performance.

As seen in Table 1b, the pi-conjugated five-membered ring molecule pyrrole (4) has the remarkably low $|\Delta H°_{H2}|$ of 13.37 kcal/mol $H_2$, which is predicted well by our ab initio DFT computational method as 13.1 kcal/mol $H_2$. Without being limited by theory, the applicants believe that the low $|\Delta H°_{H2}|$ of pyrrole is associated with ring strain and the effect of the N heteroatom. For example, the $|\Delta H°_{H2}|$ of pyrrole is significantly less than the heat of hydrogenation of 1,3-cyclopentadiene to cyclopentane ($|\Delta H°_{H2}|=25.3$ kcal/mol $H_2$) and for the hydrogenation of 1-pentene to n-pentane ($|\Delta H°_{H2}|=29.8$ kcal/mol $H_2$.) A second nitrogen atom inserted in the five-membered ring as in imidazole (40, Table 1 b) has the effect of further reducing $|\Delta H°_{H2}|$ to 8.8 kcal/mol $H_2$. This enthalpy may be still further reduced by the substitution of an alkyl group on nitrogen for hydrogen as in N-methylimidazole for which $|\Delta H°_{H2}|=8.6$ kcal/mol $H_2$).

Another non-limiting example of a pi-conjugated monocyclic substrates with multiple nitrogen heteroatoms is pyrazine.

Pi-conjugated monocyclic substrates with multiple nitrogen heteroatoms are available from Aldrich Chemical, Lancaster Synthesis and Acros.

Pi-conjugated substrates with triply bonded groups. For the purposes of this description and the claims, "pi-conjugated substrates with triply bonded groups" are defined as those molecules having carbon-carbon and carbon-nitrogen triple bonds. The pi-conjugated molecules described thus far comprise atom sequences conventionally written as alternating carbon-carbon single, and carbon-carbon double bonds i.e. C—C=C—C=C— etc., incorporating at times carbon-nitrogen double bonds, i.e., imino groups as in the sequence, C—C=N—C=C—. The mean formal bond order here is 1.5 and the maximum hydrogen storage capacity is that for an atom ratio of C:H=1:1 or 7.6 wt % $H_2$ for the fully hydrogenated carrier. Now provided here are methods for desirably increasing the mean bond order to >1.5 and hence the hydrogen carrying capacity of the substrate, by favorably incorporating the multiply conjugated triply-bonded cyano (—C≡N) and alkynyl (—C—C—) groups into the carrier molecule.

In one embodiment, the invention relates to a process for the storage of hydrogen by a reversible catalytic hydrogenation of molecules containing the cyano or nitrile, —C≡N, group where the latter is converted to an alkyl amino group, —CH$_2$NH$_2$. An example is the hydrogenation of acetonitrile, CH$_3$CN, to ethylamine, CH$_3$CH$_2$NH$_2$, which provides a very modest almost 9 wt. % theoretical hydrogen storage capacity. The standard enthalpy for this reaction ($\Delta H°_{H2}$=−16.5 kcal/mol H$_2$) calculated using the same ab initio DFT method agrees well with the experimental value of −16.0 kcal/mol H$_2$. Higher molecular weight analogs of acetonitrile, e.g., 1,2-dicyanoethane for which $\Delta H°_{H2}$=−17.2 kcal/mol H$_2$ would be preferred because of their lower volatility, and preferably compounds where the nitrile group is strongly conjugated with other unsaturated groups, that tends to lower $|\Delta H°_{H2}|$. An illustration is provided by 1,4-dicyanobenzene:

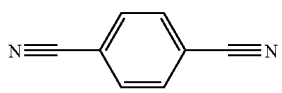

which can be reversibly hydrogenated to 1,4-aminomethyl cyclohexane:

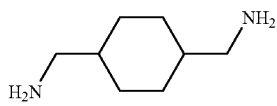

The enthalpy for this reaction, $\Delta H°_{H2}$, is −16.4 kcal/mol H$_2$ but it is expected that its value can be favorably lowered with even more extensively pi-conjugated substrates, in general, aromatic nitriles, dinitriles and trinitriles where the aromatic ring may contain one to three nitrogen heteroatoms.

Another approach for lowering the $\Delta H°_{H2}$ for —C≡N group-containing molecules involves the use of anionic or metal-organic systems. As disclosed above (section "Ionic Pi-conjugated Substrates"), the latter systems can have far lower hydrogenation enthalpy values; this also applies to the conjugated substrates that comprise the nitrile group. The hydrogenation of lithium dicyanamide, N≡C—N(Li)C≡N to lithium diethylamide, H$_2$NCH$_2$N(Li)CH$_2$NH$_2$, for which $\Delta H°_{H2}$=−15.4 kcal/mol H$_2$, serves here as an example of lithium providing a lower $|\Delta H°_{H2}|$ system which may be even further lowered by using larger, i.e. Na$^+$, K$^+$ or (CH$_3$)$_4$N$^+$ cations).

The hydrogenation of isolated alkyne, —C≡C— groups to alkanes is a highly energetic process ($|\Delta H°_{H2}|$>>30 kcal/mole H$_2$) and can only be reversed at elevated temperatures. However, we unexpectedly found that highly lithiated acetylenic molecules, preferably those that also have nitrogen-containing functional groups, where the negative charge is "spread" or highly conjugated over the anion, have much lower hydrogenation enthalpies. This is seen for the hydrogenation of dilithium acetylide to 1,2-dilithium ethane for which $|\Delta H°_{H2}|$=17.4 kcal/mol H$_2$, which may be contrasted with the corresponding standard enthalpy of −37.3 kcal/mole H$_2$ for the hydrogenation of acetylene to ethane. The $|\Delta H°_{H2}|$ for hydrogenating an alkyne linkage can also be reduced by attaching electron-donating groups, which strongly interact (conjugate) with the alkyne. This is illustrated by the hydrogenation of LiHN—C≡C—NHLi to LiNHCH$_2$CH$_2$NHLi for which $\Delta H°_{H2}$ is −13.8 kcal/mol H$_2$.

In one embodiment, the invention relates to a process for using pi-conjugated substrates that comprise nitrile and alkynyl functions as a reversible hydrogen source, where the modulus of the $\Delta H°_{H2}$ value $|\Delta H°_{H2}|$ is <20 kcal/mol H$_2$, and preferably <18 kcal/mol H$_2$. Non-limiting examples of pi-conjugated substrates with multiply bonded linkages and groups include terephthalonitrile (1,4-dinitrilobenzene), benzonitrile, and 1,3,5-trinitrilobenzene.

Pi-conjugated substrates with triple bonded groups with multiple nitrogen heteroatoms are available from Aldrich Chemical, Lancaster Synthesis and Acros. The corresponding lithium derivatives can also be prepared by the reaction of the pi-conjugated substrates with triple bonded groups with a strong base such as LiH, methyllithium, or n-butyllithium in an appropriate solvent, such as tetrahydrofuran.

Tables 1a-1d provides illustrative examples of extended pi-conjugated substrates and their corresponding enthalpies of hydrogenation at 300 K as calculated using the ab initio DFT method described above, $\Delta H°_{H2}$(300 K) (cal.), and as determined experimentally, $\Delta H°_{H2}$ (298 K) (exp.). Tables 1 a-1 d also provide for selected systems the predicted temperature (T$_{95\%}$) atm. at which 95.24% (nominally 95%) of the fully hydrogenated carrier will be converted back to the pi-unsaturated substrate, ([A—H$_{2n}$]:[A]=0.05:1) at 1 atm. H$_2$, as calculated using the ab initio method described above, and as calculated from experimentally derived data (exp.).

TABLE 1a

Extended polycyclic aromatic hydrocarbons and comparative data for benzene (1), naphthalene (2,3), anthracene (46) and phenanthrene (47).

| Substrate Number | Substrate Structure | $\Delta H°_{H2}$(300 K) (cal.) | $\Delta H°_{H2}$(298 K) (exp.) | T$_{95\%}$° C. (cal.) | T$_{95\%}$° C. (exp.) |
|---|---|---|---|---|---|
| 1 | | −15.6 | −16.42 | 319 | 318 |
| 2$^a$ | 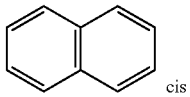 cis | −15.1 | −15.29 | 244 | 262 |

TABLE 1a-continued
Extended polycyclic aromatic hydrocarbons and comparative data for benzene (1), naphthalene (2,3), anthracene (46) and phenanthrene (47).
| Substrate Number | Substrate Structure | $\Delta H°_{H2}$(300 K) (cal.) | $\Delta H°_{H2}$(298 K) (exp.) | $T_{95\%}$ ° C. (cal.) | $T_{95\%}$ ° C. (exp.) |
|---|---|---|---|---|---|
| 3[b] | 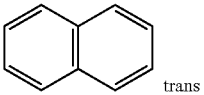 trans | −15.8 | −15.91 | 273 | 280 |
| 6 | 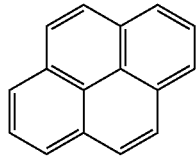 | −14.6 | | 226 | |
| 7 | 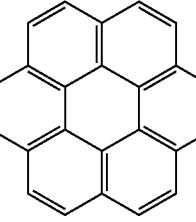 | −13.0 | | 169 | |
| 22 | 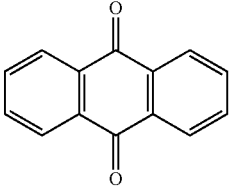 | −13.9 | | 206 | |
| 26 |  | −52.2 | | | |
| 27 | 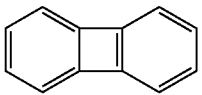 | −17.9 | | 333 | |
| 28 | 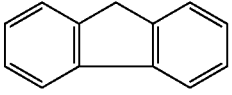 | −14.4 | | 223 | |
| 31 | 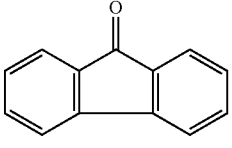 | −14.1 | | 216 | |
| 34 | 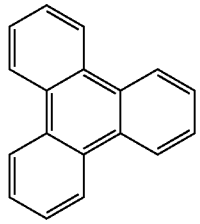 | −14.2 | | 216 | |

TABLE 1a-continued

Extended polycyclic aromatic hydrocarbons and comparative data for benzene (1), naphthalene (2,3), anthracene (46) and phenanthrene (47).

| Substrate Number | Substrate Structure | $\Delta H°_{H2}$(300 K) (cal.) | $\Delta H°_{H2}$(298 K) (exp.) | $T_{95\%}$ °C. (cal.) | $T_{95\%}$ °C. (exp.) |
|---|---|---|---|---|---|
| 46 | (anthracene) | −15.8 | | 271 | |
| 47 | (phenanthrene) | −14.8 | | 237 | |

[a] Heat of hydrogenation to form cis-decalin.
[b] Heat of hydrogenation to form the trans-decalin.

TABLE 1b

Extended pi-conjugated substrates with nitrogen heteroatoms (see above for explanation).

| Substrate Number | Substrate Structure | $\Delta H°_{H2}$(300 K) (cal.) | $\Delta H°_{H2}$(298 K) (exp.) | $T_{95\%}$ °C. (cal.) | $T_{95\%}$ °C. (exp.) |
|---|---|---|---|---|---|
| 4 | pyrrole | −13.2 | −13.37 | 248 | 274 |
| 5 | pyridine | −15.2 | −14.96 | 268 | 262 |
| 8 | carbazole | −12.2 | | 153 | |
| 9 | N,N'-bipyrrole | −11.9 | | 164 | |
| 10 | 2,5-dimethylpyrrole | −12.5 | | 182 | |
| 11 | β-carboline | −11.2 | | 117 | |
| 12 | indolo-carbazole | −10.6 | | 96 | |

TABLE 1b-continued

Extended pi-conjugated substrates with nitrogen heteroatoms (see above for explanation).

| Substrate Number | Substrate Structure | $\Delta H^\circ_{H2}$(300 K) (cal.) | $\Delta H^\circ_{H2}$(298 K) (exp.) | $T_{95\%}$ °C. (cal.) | $T_{95\%}$ °C. (exp.) |
|---|---|---|---|---|---|
| 13 | | −10.7 | | 87 | |
| 14 | | −11.4 | | 131 | |
| 15 | | −14.4 | | 225 | |
| 16 | | −11.5 | | 124 | |
| 17 | | −9.7 | | 66 | |
| 18 | | −11.7 | | 132 | |
| 19 | | −8.7 | | 27 | |

TABLE 1b-continued

Extended pi-conjugated substrates with nitrogen heteroatoms (see above for explanation).

| Substrate Number | Substrate Structure | $\Delta H°_{H2}$(300 K) (cal.) | $\Delta H°_{H2}$(298 K) (exp.) | $T_{95\%}$° C. (cal.) | $T_{95\%}$° C. (exp.) |
| --- | --- | --- | --- | --- | --- |
| 20 | | −12.1* | −12.4* | 128 | 128 |
| 21 | | −12.4 | | 164 | |
| 23 | | −14.2 | | 220 | |
| 24 | | −14.8 | | 239 | |
| 25 | | −12.5 | | 168 | |
| 30 | | −12.2 | | 139 | |
| 35 | | −13.8 | | 201 | |
| 36 | | −15.1 | | 245 | |
| 37 | | −12.5 | | 163 | |

TABLE 1b-continued

Extended pi-conjugated substrates with nitrogen heteroatoms (see above for explanation).

| Substrate Number | Substrate Structure | $\Delta H°_{H2}$(300 K) (cal.) | $\Delta H°_{H2}$(298 K) (exp.) | $T_{95\%}$ °C. (cal.) | $T_{95\%}$ °C. (exp.) |
|---|---|---|---|---|---|
| 38 | 2,4,6-trimethyl-1,3,5-triazine | −15.2 | | 413 | |
| 39 | 2-indolinone | −9.9 | | 82 | |
| 40 | imidazole | −8.8 | | 70 | |
| 41 | purine | −6.4 | | | |
| 42 | N,N',N''-trimethyl-triindole | −9.0 | | | |
| 43 | indolo-carbazole | −10.5 | | 88 | |
| 53 | pyrazine | −13.5 | | | |

TABLE 1b-continued

Extended pi-conjugated substrates with nitrogen heteroatoms (see above for explanation).

| Substrate Number | Substrate Structure | $\Delta H^\circ_{H2}$(300 K) (cal.) | $\Delta H^\circ_{H2}$(298 K) (exp.) | $T_{95\%}$° C. (cal.) | $T_{95\%}$° C. (exp.) |
|---|---|---|---|---|---|
| 54 | (structure: pyrazine-pyrrole-pyrazine fused tricyclic with NH) | −7.7 | | | |

*Calculated and experimental data, both at 150° C.

TABLE 1c

Extended pi-conjugated substrates with heteroatoms other than nitrogen and comparative data for diphenylsilanes 44 and 45 (see above for explanation).

| Substrate Number | Substrate Structure | $\Delta H^\circ_{H2}$(300 K) (cal.) | $\Delta H^\circ_{H2}$(298 K) (exp.) | $T_{95\%}$° C. (cal.) | $T_{95\%}$° C. (exp.) |
|---|---|---|---|---|---|
| 29 | (9H-borafluorene, B–H) | −10.2 | | 52 | |
| 32 | (dibenzofuran) | −13.5 | | 197 | |
| 33 | (dibenzo-1,4-dioxin) | −16.4 | | 285 | |
| 44 | (dimethyldiphenylsilane) | −15.6 | | 275 | |
| 45 | (dimethoxydiphenylsilane) | | | 273 | |
| 55 | (benzo-fused phosphole with P–OH) | −17.0 | | | |

TABLE 1c-continued

Extended pi-conjugated substrates with heteroatoms other than nitrogen and comparative data for diphenylsilanes 44 and 45 (see above for explanation).

| Substrate Number | Substrate Structure | $\Delta H°_{H2}(300\ K)$ (cal.) | $\Delta H°_{H2}(298\ K)$ (exp.) | $T_{95\%}$° C. (cal.) | $T_{95\%}$° C. (exp.) |
|---|---|---|---|---|---|
| 56 | 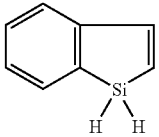 | −16.4 | | | |

TABLE 1d

Pi-conjugated organic polymers and oligomers and comparative data for phenylene oligomers (see above for explanation).

| Substrate Number | Substrate Structure | $\Delta H°_{H2}(300\ K)$ (cal.) | $\Delta H°_{H2}(298\ K)$ (exp.) | $T_{95\%}$° C. (cal.) | $T_{95\%}$° C. (exp.) |
|---|---|---|---|---|---|
| 52 | 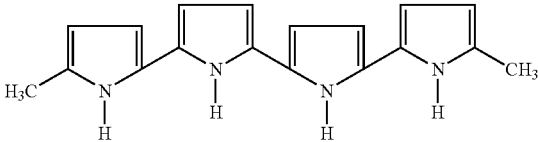 | −12.5 | | | |
| 57 | 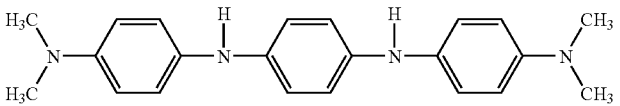 | −15.1 | | | |
| 48 | 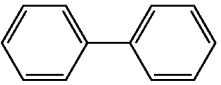 | −16.0 | | | 298 |
| 49 | 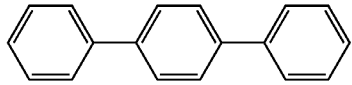 | −15.7 | | | |
| 50 | 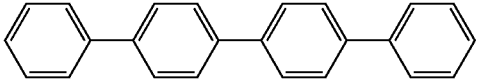 | −15.6 | | | |
| 51 | 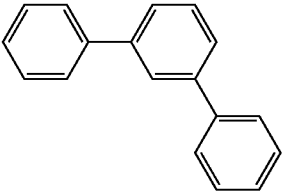 | −15.8 | | | |

5.3 Use of the Extended Pi-Conjugated Substrates As Reversible Hydrogen Carriers In certain embodiments, the extended pi-conjugated substrates identified above will for the most part be solids in their relatively pure state at ambient conditions. From Examples 1-7 it is clear that in admixtures with suitable catalysts it is possible, though admittedly surprising, to conduct the hydrogenation and dehydrogenation chemistry well below the melting point of the substrate, and in most of these examples, also well below the melt temperature of hydrogenated substrate.

But it may be preferable under some circumstances to use extended pi-conjugated substrates that are liquid, at least at the hydrogenation and dehydrogenation reaction conditions, that is, the substrates remain in a continuous liquid phase while in contact with the catalyst. In the latter case, the hydrogen storage and release chemistry can be conducted in conventional stirred tank reactors in which mechanical mixing ensures that there is a good mass transfer between the substrate molecules, the dispersed (or dissolved) catalyst, and hydrogen, with minimal mass transfer limitations ensuring rapid kinetics. Alternatively, the hydrogenation or the dehydrogenation could be conducted in a flow-through reactor (see Example 12). A liquid phase hydrogenated substrate could be used to safely and economically transport the gas as the hydrogenated pi-conjugated molecule from a large hydrogen plant, where there is the economy of scale, to distribution and use centers where the hydrogen is catalytically liberated from the liquid carrier at mild conditions for use in fuel cells or other devices. Preferably, the substrates, either in their hydrogenated or dehydrogenated states, should have a melting point of lower than about −10° C. in order to be transferable in cold weather conditions, and should have a melting point of lower than about 100° C. if they are to be transported or transferred with supplemental heating. Generally, the substrates will be considered for purposes of this invention to be liquid, and thereby transferable, if they have a viscosity of less than about 2000 cSt (centistokes).

One way to render an extended pi-conjugated substrate as a liquid is to utilize mixtures of two or more components, one or more of which comprises an extended pi-conjugated substrate. In some cases, mixtures may form a eutectic mixture. For instance chrysene (1,2-benzophenanthrene, m.p. 250° C.) and phenanthrene, (m.p. 99° C.) are reported to form a eutectic melting at 95.5° C. and for the 3-component system consisting of chrysene, anthracene and carbazole (m.p. 243° C.), a eutectic is observed at 192° C. (Pascal, Bull.Soc.Chim.Fr. 1921, 648). The introduction of n-alkyl, alkyl, alkoxy, ether or polyether groups as substituents on the ring structures of the polycyclic aromatic molecules, particularly the use such substituents of varying chain lengths up to about 12 carbon atoms, can lower their melting points, but at some cost in "dead weight" and reduced sorbed hydrogen capacity of the systems. As discussed above, certain substituents, e.g., nitriles and alkynes, can provide additional sorbed hydrogen capacity since each nitrile group can accommodate two molar equivalents of hydrogen.

With the growing importance of vehicular fuel cells, and especially polymer electrolyte membrane fuel cells, where operating temperatures are below about 200° C. and therefore easily available heat is also below this temperature, the ability to hydrogenate a substrate having a normal melting point above about 200° C. while present in a mixture having a freezing point of less than about 200° C. would be advantageous, especially where the lowered freezing point mixture was predominantly of two or more of the extended pi-conjugated substrates to provide the maximum reversibility of the hydrogenation/dehydrogenation and highest hydrogen storage capacity. The extended pi-conjugated substrates and mixtures as described above provide such advantages.

As taught by J. C. Fetzer in "Large (C>=24) Polycyclic Aromatic Hydrocarbons" pp. 206-212, coal tar and pitch materials are highly complex mixtures that contain a very large proportion of extended polycyclic aromatics. As used herein and in the claims, the term "pitch" will be used to include the complex mixtures often referred to as "tars". The complexity and variety of the polycyclic aromatic components, including alkyl substituted EPAH's in the pitch, presumably results in the observed liquidity. While appropriately selected coal or petroleum-derived pitch compositions could be employed, more preferable "cleaner" (i.e., sulfur free) synthetic pitch substrates may be utilized. As described by 1. Mochida et al, Carbon 38, 2000, pp. 305-328, and Carbon 26, 1988, pp. 843-852, synthetic pitch consisting of mixtures of dimers to pentamers of naphthalene, anthracene, phenanthrene etc. can be prepared by an HF/BF$_3$ acid-catalyzed condensation, oligomerization of these polycyclic aromatic hydrocarbons. The prepared pitch compositions have softening points which range from 63° C. to 114° C. and even if it proves necessary to add a small amount of an additive (i.e. a low volatility hydrocarbon fluid or some of the hydrogenated liquid LPAH) to increase their fluidity, they represent a class of low volatility liquid LPAH substrates for a storage of hydrogen by their reversible catalytic hydrogenation in accordance with this invention. The term "pitch" also includes natural pitch and synthetic pitch. In one embodiment, the extended pi-conjugated substrate useful in the process of the invention is a pitch or pitch fraction selected from the group consisting of natural pitch, synthetic pitch, synthetic pitch containing molecules with nitrogen heteroatoms, and combinations thereof.

We have suggested that polycyclic aromatic hydrocarbons with nitrogen heteroatoms are particularly preferred because of their expected lower modulus of $\Delta H°$ of hydrogenation. In the above cited article by Mochida (Carbon 28, 2000) a catalytic polymerization of quinoline, and isoquinoline with $AlCl_3$ is said to yield trimers and higher homologs, as mixtures of liquid nitrogen-containing polycyclic aromatic hydrocarbons which are useful hydrogenation substrates for hydrogen storage in accordance with this invention.

The process of storing hydrogen by a reversible hydrogenation of an extended pi-conjugated substrate in accordance with this invention comprises, in its most general form, the following sequence of steps:

a) contacting hydrogen, in the presence of a hydrogenation catalyst under hydrogenation conditions, with an extended pi-conjugated substrate to effect storage of hydrogen by forming an at least partially hydrogenated extended pi-conjugated substrate; and thereafter b) contacting the at least partially hydrogenated extended pi-conjugated substrate under dehydrogenation conditions in the presence of an effective amount of a dehydrogenation catalyst to release hydrogen from the at least partially hydrogenated extended pi-conjugted substrate.

In another embodiment of this invention, the hydrogenation catalyst is removed from the at least partially hydrogenated extended pi-conjugated substrate obtained from step a) prior to conducting step b).

As described below in the examples, the hydrogenation and dehydrogenation can be carried out in a single vessel. Hydrogenation catalysts are also known to function as dehydrogenation catalysts and are described herein. Thus the substrate and catalyst, which functions both as hydrogenation catalyst and dehydrogenation catalyst, can be contained in a single vessel and the hydrogenation and dehydrogenation sequentially carried out in the same vessel under appropriate temperature and hydrogen partial pressures.

In another embodiment, the at least partially hydrogenated extended pi-conjugated substrate can be removed from the vessel in which it is hydrogenated and dehydrogenated in another vessel. This is especially preferred where the extended pi-conjugated substrate and the hydrogenated substrate are in a liquid form and so can be transferred and transported as a liquid. Where the hydrogenated and dehydrogenated substrates have a melting point above about −10° C., they can be transported as a liquid in most weather conditions without supplemental heat to keep them liquid. Even if the melting point is up to 100° C., the substrates can still be transferred and utilized as liquids with low level heating.

In one embodiment, the invention relates to a process for the storage of hydrogen comprising contacting hydrogen gas with a solid extended pi-conjugated substrate in the presence of an effective amount of a hydrogenation catalyst under hydrogenation conditions to at least partially hydrogenate the extended pi-conjugated substrate.

In another embodiment, the invention relates to a process for the storage of hydrogen comprising contacting hydrogen gas at a hydrogen partial pressure greater than about 6.7 bar and at a temperature of between about 50° C. and about 300° C. with a solid extended pi-conjugated substrate in the presence of an effective amount of a hydrogenation catalyst to at least partially hydrogenate the extended pi-conjugated substrate.

In order to efficiently contact the hydrogen in the presence of the hydrogenation catalyst with the extended pi-conjugated substrate, which in many cases of the substrates of this invention are relatively involatile solids or liquids at the reaction conditions, it is generally preferred to prepare an intimate physical mixture of the substrate with a hydrogenation catalyst. The substrate, which may be a solid or a liquid, should preferably be sufficiently involatile at least at ambient temperatures and preferably also at the higher temperature reaction conditions so as to preclude the need for its bulk separation or the separation of any of the reaction products or intermediates from the gaseous hydrogen product. It may be necessary however, as a precautionary step in some cases to provide a trap containing an absorbent, which can scavenge and thus remove any trace level volatile containments from the released hydrogen.

Some of the specified suitable substrates, owing to their relatively large molecular size (e.g., three or more five or six-atom rings), will naturally be solids at the preferred reaction temperatures below about 250° C. But as noted above physical (including eutectic) mixtures of a number of these substrates may be liquids, at least at reaction temperatures, which may be advantageous for providing an adequate mixing of the catalyst and reaction components. In such a mixture one of the components may be regarded as being both a solvent and a hydrogenation substrate. As also described above, natural and synthetic pitch materials which consist of a liquid mixture of many extended polycyclic aromatic hydrocarbons are seen as suitable substrates.

In one embodiment, the invention relates to a process for the storage and subsequent release of hydrogen comprising:

a) contacting hydrogen, in the presence of a hydrogenation catalyst under hydrogenation conditions, with an extended pi-conjugated substrate to effect storage of hydrogen by forming an at least partially hydrogenated extended pi-conjugated substrate; and thereafter b) contacting the at least partially hydrogenated extended pi-conjugated substrate under dehydrogenation conditions in the presence of an effective amount of a dehydrogenation catalyst to release hydrogen from the at least partially hydrogenated extended pi-conjugted substrate; wherein c) the extended pi-conjugated substrate and the at least partially hydrogenated extended pi-conjugated substrate are liquids at the dehydrogenation conditions of step b).

The hydrogenation catalysts, which are generally known and which will generally also function as dehydrogenation catalysts for purposes of this invention, will comprise finely divided metals, and their oxides and hydrides, of Groups 4, 5, 6 and 8, 9, 10 of the Periodic Table according to the International Union of Pure and Applied Chemistry. Preferred are titanium, zirconium of Group 4; tantalum and niobium of Group 5; molybdenum and tungsten of Group 6; iron, ruthenium of Group 8; cobalt, rhodium and iridium of Group 9; and nickel, palladium and platinum of Group 10 of the Periodic Table according to the International Union of Pure and Applied Chemistry. Of these the most preferred being zirconium, tantalum, rhodium, palladium and platinum, or their oxide precursors such as $PtO_2$. These metals may be used as catalysts and catalyst precursors as metals, oxides and hydrides in their finely divided form, as very fine powders or as skeletal structures such as platinum black or Raney nickel, or well-dispersed on carbon, alumina, silica, zirconia or other medium or high surface area supports, preferably on carbon or alumina. Acidic supports, in combination with transition metal dehydrogenation catalysts, or in some cases, the acidic support alone, may be preferable for dehydrogenation catalysts. Examples of acidic supports are silica-alumina, gamma-alumina, zeolites in the proton-exchanged form, sulfonated zirconia, and solid perfluorinated polymeric sulfonic acids. In some cases the dehydrogenation may be catalyzed by solid state Brönsted or Lewis acids in the absence of transition metals. The above listed supports are, for the most part, of the Brönsted or protonic acid types. Suitable Lewis acid catalysts include aluminum trifluoride, aluminum chlorofluorides, zinc chloride, aluminum chloride, tin chloride, copper trifluoromethane sulfonate, scandium trichloride, and the hexafluoroacetylacetonate of complexes of lanthanum and the other members of the Lanthamide series of elements according to the Periodic Table according to the International Union of Pure and Applied Chemistry. Intermetallic hydrides such as $ZnNiH_{2.8}$ and $ZrCoH_{2.8}$ which have been used as either catalysts or catalyst precursors for a hydrogenolysis at very high temperatures (~500° C.) of graphite (to $CH_4$) as described by P. V. Ryabchenko et al. in Khimiya Tverdogo Topliva 19, 129-134 (1985) may likewise be used.

Reaction of the pi-unsaturated substrate and catalyst mixture with hydrogen. Traditionally, the catalytic hydrogenation of pi-conjugated substrates (e.g., naphthalene, phenanthrene, pyrene, etc. which are solids at room temperature) is carried out with the compounds dissolved in an hydrogenation-inert solvent, containing a slurry of a heterogeneous catalyst. For example, these conditions are described in J. Org. Chem. 4, 2797 (1980), where ethyl acetate was used as the solvent and a 10% palladium on carbon catalyst was employed. Substrates which are liquid at reaction temperature can be hydrogenated in the presence of a contained slurry catalyst. In the case of both solution and liquid substrates a hydrogen overpressure is used and since hydrogen has a very low solubility in the liquid phase it is essential for realizing an adequate mass transfer to stir the mixture, apply an external rocking motion to the reactor or otherwise ensure intimate contact between the hydrogen gas and the substrate/catalyst interface such as by bubbling or sparging the hydrogen through the substrate/catalyst mixture or using the hydrogen to fluidize or ebullate the substrate/catalyst mixture.

In one embodiment of this invention, the extended pi-conjugated substrate, charged into the reactor as solid (together with the solid catalyst) is hydrogenated in the absence of any solvent. This is clearly illustrated by Examples 2-5 where the substrates, coronene and hexabenzocoronene, of melting point 442° C. and 700+° C. are solids even at the reaction temperatures of 140° C. and 200° C. respectively. This gas phase hydrogenation of a solid substrate provides for a new and novel gas/solid hydrogenation process.

In another embodiment, the novel gas/solid hydrogenation process can be described as comprising contacting hydrogen gas with a solid extended pi-conjugated substrate as defined in this description in the presence of an effective amount of a hydrogenation catalyst under hydrogenation conditions to at least partially hydrogenate the extended pi-conjugated substrate and more particularly, as a process for the storage of hydrogen comprising contacting hydrogen gas at a hydrogen partial pressure greater than about 100 psia (6.7 bar) and at a temperature of between about 50° C. and about 300° C. with a solid extended pi-conjugated substrate as defined in this description in the presence of an effective amount of a hydrogenation catalyst to at least partially hydrogenate the extended pi-conjugated substrate.

For conducting the dehydrogenation step, the hydrogen gas overhead pressure, usually in the general range of 500-1000 psia, (34.5 bar to 69 bar) for the hydrogenation step, is dropped to about 1.5-50 psia (0.1-3.3 bar), which is generally a sufficient pressure for delivering hydrogen to a fuel cell, with the reactor still at temperature. The increase in hydrogen pressure in the system is monitored as a function of time.

Where possible the calculated total hydrogen uptake and release were confirmed by chemical analyses using nuclear magnetic resonance (NMR) for soluble samples and otherwise by mass spectroscopy. For the relatively highly involatile larger pi-conjugated substrates, matrix-assisted laser desorption mass spectroscopy (MALDI) was found to be invaluable for this purpose.

The following examples are set forth to assist in understanding the invention and do not limit the invention described and claimed herein. Such variations of the invention, including the substitution of all equivalents now known or later developed, which would be within the purview of those skilled in the art, and changes in formulations or minor changes in experimental design, fall within the scope of the present invention.

6. EXPERIMENTAL

EXAMPLE 1

Reversible Hydrogenation of Pyrene. A 0.2 g sample of pyrene (>99%, Fluka) and 0.1 g of rhodium on carbon catalyst (5% Rh, Acros Organics) were ground by hand with an agate mortar and pestle until a uniform color mixture was formed. The mixture was then placed in a 50 cc high pressure reactor (Parr instruments) equipped with a customized grinding apparatus. The grinding apparatus consisted of an elongated stirrer shaft with an arc-shaped paddle. The bottom of the reactor contained a stainless steel insert with a concave bottom, which allowed the paddle of the stirrer shaft to sweep the bottom of the reactor with $\frac{1}{8}$" clearance. Mechanical agitation of the sample mixture was carried out by adding 5-8 stainless steel ball bearings of varying size ($\frac{1}{16}$"-$\frac{1}{4}$" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was pressurized with helium to 1000 psia (69 bar) and vented. Pressurization and venting with helium was repeated three times. The reactor system was then twice pressurized to 1000 psia (69 bar) hydrogen and vented. Once purging was completed, the sample mixture was hydrogenated by grinding at 95° C. and 1000 psia (69 bar) hydrogen for 1.5 hours. After the reaction time, the reactor was then quickly cooled to room temperature and vented. Half of the sample mixture was removed from the reactor (h-pyrene), and the remaining material was left in the reactor for dehydrogenation. The material to be dehydrogenated was purged as described above and ground at 95° C. and 15 psia (1 bar) hydrogen for three hours before the reactor was cooled to room temperature. The sample was then removed for analysis (dh-pyrene). Both of the hydrogenated pyrene (h-pyrene) and dehydrogenated h-pyrene (dh-pyrene) samples are separated from the catalyst by extraction with chloroform (HPLC grade, Fisher) and filtering of the insoluble catalyst. The chloroform was then removed under vacuum to obtain the pure products. Gas chromatography-Mass spectroscopy (GC-MS) and proton nuclear magnetic resonance (NMR) spectroscopy analyses were carried out on the hydrogenated and dehydrogenated h-pyrene. GC-MS indicated that >99% of the pyrene starting material was converted to a mixture of hydrogenated products, having a gravimetric storage capacity for hydrogen of 2.3 wt. % on a total sample weight basis (pyrene+catalyst). Upon dehydrogenation, GC-MS showed that approximately 25% of the hydrogenated material in converted back to pyrene. Proton NMR was used to verify the hydrogenation/dehydrogenation of pyrene. Although the proton NMR spectra are too complex for peak assignment of individual hydrogenated pyrene products, integration of pyrene peak intensity versus new resonances in the spectrum indicated substantial conversion during hydrogenation and partial regeneration of pyrene after dehydrogenation. Tables 2 and 3 show the product distribution of h-pyrene and dh-pyrene calculated from GC-MS from areas normalized for those masses:

TABLE 2

Product distribution of h-pyrene calculated from GC-MS from areas normalized for those masses.

| h-Pyrene Sample Components | Molecular Formula | Percentage of Sample Mixture |
|---|---|---|
| Pyrene | $C_{16}H_{10}$ | 0.5 |
| Dihydropyrene | $C_{16}H_{12}$ | 6.0 |
| Tetrahydropyrene | $C_{16}H_{14}$ | 30 |
| Hexahydropyrene | $C_{16}H_{16}$ | 25 |
| Decahydropyrene | $C_{16}H_{20}$ | 36 |
| Hexadecahydropyrene | $C_{16}H_{26}$ | 2.6 |

TABLE 3

Product distribution of dh-pyrene calculated from GC-MS from areas normalized for those masses.

| dh-Pyrene Sample Components | Molecular Formula | Percentage of Sample Mixture |
|---|---|---|
| Pyrene | $C_{16}H_{10}$ | 25 |
| Dihydropyrene | $C_{16}H_{12}$ | 14 |
| Tetrahydropyrene | $C_{16}H_{14}$ | 8 |
| Hexahydropyrene | $C_{16}H_{16}$ | 30 |
| Decahydropyrene | $C_{16}H_{20}$ | 23 |

EXAMPLE 2

Reversible Hydrogenation of Coronene with 5% Rh on carbon catalyst and mechanical grinding. A 0.125 g sample of coronene (95%, Acros Organics) and 0.065 g of rhodium on carbon catalyst (5% Rh, Acros Organics) were ground by hand with an agate mortar and pestle until a uniform dark green mixture was formed. The mixture was then placed in a 50 cc high pressure reactor (Parr instruments) equipped with a customized grinding apparatus. The grinding apparatus consisted of an elongated stirrer shaft with an arc-shaped paddle. The bottom of the reactor contained a stainless steel insert with a concave bottom, which allowed the paddle of the stirrer shaft to sweep the bottom of the reactor with $\frac{1}{8}$" clearance. Mechanical agitation of the sample mixture was carried out by adding 5-8 stainless steel ball bearings of varying size ($\frac{1}{16}$"-$\frac{1}{4}$" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was pressurized with helium to 1000 psia (69 bar) and vented. Pressurization and venting with helium was repeated three times. The reactor system was then twice pressurized to 1000 psia (69 bar) hydrogen and vented. The coronene was hydrogenated by heating the sample mixture to 150° C. under 1045 psia (72 bar) hydrogen while the mixture was continuously ground for four hours. The reactor was then quickly cooled to room temperature and vented to atmospheric pressure. The mixture was removed from the reactor, weighed, and half of the material was returned to the reactor for dehydrogenation. The hydrogenated coronene (h-coronene) was removed from the mixture by extracting with chloroform, filtering of the insoluble catalyst, and drying under vacuum. Dehydrogenation was carried out by continuous grinding at 150° C. under 15 psia (1 bar) hydrogen for 16 hours. After cooling the reactor to room temperature, the sample mixture was removed from the reactor and the dehydrogenated h-coronene (dh-coronene) was isolated by extraction with chloroform, filtering of the insoluble catalyst, and drying under vacuum. Both of the h-coronene and dh-coronene samples were analyzed by proton NMR and DEP Probe CI (isobutane) mass spectrometry. The coronene parent ion (MW=300) was not present in the mass spectrum of the h-coronene. The mass spectrum mainly consisted of masses 318, 314 and 310. The mass spectrum of dh-coronene showed that the three masses at 310, 314, and 318 have decreased in intensity and a new peak was formed at 300 m/z, the molecular weight of coronene. Assuming that the response factors for each product were similar, a particular ion contribution to the spectrum and the weight increase of coronene upon hydrogenation was calculated. Upon hydrogenation coronene added 3.5 wt. % hydrogen and 80 percent of those hydrogenated products were converted back to coronene upon dehydrogenation. The irreversible hydrogenated product mainly consisted of the mass 318 isomer. Proton NMR spectroscopy was in good agreement with the mass spectroscopy results. The coronene resonance (singlet at 9 ppm) diminished significantly after hydrogenation while new upfield resonances, assigned to methylene hydrogens, appeared. The intensity of the coronene resonance was regained after dehydrogenation while the methylene resonances diminished. Tables 4-5 illustrate the relative abundance of each mass signal in the mass spectrum of h-coronene and dh-coronene:

TABLE 4

Results of a mass spectroscopy study showing the relative abundance of the mass signal corresponding to the h-coronene components formed during hydrogenation of coronene.

| h-Coronene Sample Components | Molecular Formula | Percentage of Sample Mixture |
|---|---|---|
| Coronene | $C_{24}H_{12}$ | <1 |
| Decahydrocoronene | $C_{24}H_{22}$ | 2 |
| Tetradecahydrocoronene | $C_{24}H_{26}$ | 27 |
| Octadecahydrocoronene | $C_{24}H_{30}$ | 70 |

TABLE 5

Results of a mass spectroscopy study showing the relative abundance of the mass signal corresponding to the dh-coronene components formed during dehydrogenation of h-coronene.

| dh-Coronene Sample Components | Molecular Formula | Percentage of Sample Mixture |
|---|---|---|
| Coronene | $C_{24}H_{12}$ | 92 |
| Octahydrocoronene | $C_{24}H_{20}$ | 0.82 |
| Tetradecahydrocoronene | $C_{24}H_{26}$ | 0.54 |
| Octadecahydrocoronene | $C_{24}H_{30}$ | 6.7 |

EXAMPLE 3

Reversible Hydrogenation of Coronene with 5% Rh on carbon catalyst. A 0.066 g sample of coronene (95%, Acros Organics) and 0.033 g of rhodium on carbon catalyst (5% Rh, Acros Organics) were ground with an agate mortar and pestle for 15 minutes until a uniform dark green mixture was formed. The sample was then placed in a differential pressure adsorption unit. The adsorption unit consisted of two identical pressure cells which were spanned by a differential pressure gauge. The absolute pressure of the two cells are measured independently by pressure transducers. Adsorption of hydrogen by the sample was characterized by a relative decrease of the pressure in the sample cell relative to the reference cell while maintaining an identical temperature between the two cells. The sample was degassed at ambient temperature for 30 minutes under vacuum. Both the sample cell and reference cells were placed under 970 psia (67 bar) hydrogen and heated to 150° C. The hydrogen pressure in the sample cell dropped, relative to the reference cell, for a period of 17 hours, indicating adsorption of 3.2 wt. % hydrogen by the sample (FIG. 8). After 17 hours, the cells were cooled to ambient temperature and the pressure in both cells reduced to 20 psia (1.4 bar). Upon heating both cells to 150° C., there was a increase in the pressure of the sample cell relative to the reference cell, indicating desorption of hydrogen from the sample (FIG. 9). After 70 hours, the sample had desorbed 1.0 wt. % hydrogen (31% of the sorbed hydrogen).

EXAMPLE 4

Reversible Hydrogenation of Coronene with Palladium. A 0.1 g sample of coronene (95%, Acros Organics) was impregnated with palladium metal particles by RF sputtering. Subsequent TGA combustion analysis demonstrated a 3% loading of palladium metal in the coronene solid. The sample was then placed in a differential pressure adsorption unit. The adsorption unit consisted of two identical pressure cells which were spanned by a differential pressure gauge. The absolute pressure of the two cells are measured independently by pressure transducers. Adsorption of hydrogen by the sample was characterized by a relative decrease of the pressure in the sample cell relative to the reference cell while maintaining an identical temperature between the two cells. The sample was degassed at ambient temperature for 20 minutes under vacuum. Both the sample cell and reference cells were placed under 995 psia (69 bar) hydrogen and heated to 150° C. The hydrogen pressure in the sample cell dropped, relative to the reference cell, for a period of 63 hours, indicating adsorption of 4.9 wt. % hydrogen by the sample (FIG. 10, Cycle #1). After 63 hours, the pressure in both cells was reduced to 20 psia (1.4 bar). After about 24 hours at 150° C., both cells were heated to 200° C. Throughout the period of heating, up to about 40 hours, there was an increase in the pressure of the sample cell relative to the reference cell, indicating desorption of hydrogen from the sample (FIG. 11). After 40 hours, the sample had desorbed 4.5 wt. % hydrogen (92% of the sorbed hydrogen). The cells were then cooled to 150° C. and the hydrogen pressure in both cells was raised to 1005 psia (69 bar). The hydrogen pressure in the sample cell dropped, relative to the reference cell, for a period of 91 hours, indicating adsorption of 3.9 wt. % hydrogen by the sample (FIG. 10, Cycle #2). The pressure was dropped to 20 psia (1.4 bar) and the temperature raised to 200° C. in both cells. Throughout the period of heating, up to about 9 hours, there was an increase in the pressure of the sample cell relative to the reference cell, indicating desorption of 3.5 wt. % hydrogen from the sample (90% of the sorbed hydrogen in cycle #2, FIG. 12).

EXAMPLE 5

Reversible hydrogenation of hexabenzocoronene (HBC) with 5% Rh on carbon and mechanical grinding. A 0.06 g sample of hexabenzocoronene (HBC) and 0.03 g of rhodium on carbon catalyst (5% Rh, Acros Organics) were ground by hand with an agate mortar and pestle until a uniform dark green mixture was formed. The mixture was then placed in a 50 cc high pressure reactor (Parr instruments) equipped with a customized grinding apparatus. The grinding apparatus consisted of an elongated stirrer shaft with an arc-shaped paddle. The bottom of the reactor contained a stainless steel insert with a concave bottom, which allowed the paddle of the stirrer shaft to sweep the bottom of the reactor with 1/8" clearance. Mechanical agitation of the sample mixture was carried out by adding 5-8 stainless steel ball bearings of varying size (1/16"-1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was pressurized with helium to 1000 psia (69 bar) and vented. Pressurization and venting with helium was repeated three times. The reactor system was then twice pressurized to 1000 psia (69 bar) hydrogen and vented. The HBC was hydrogenated by heating the sample mixture to 200° C. under 1130 psia (78 bar) hydrogen while the mixture was continuously ground for eight hours. The reactor was then quickly cooled to room temperature and vented to atmospheric pressure. Half of the sample mixture was removed from the reactor (h-HBC), and the remaining material was left in the reactor for dehydrogenation. The material to be dehydrogenated was purged as described above and ground at 200° C. and 15 psia (1 bar) hydrogen for 16 hours before the reactor was cooled to room temperature. The sample was then removed for analysis (dh-HBC). Both of the hydrogenated HBC (h-HBC) and dehydrogenated h-HBC (dh-HBC) samples were separated from the catalyst by extraction with chloroform and filtering of the insoluble catalyst. The chloroform was then removed under vacuum to obtain the pure products which were analyzed by MALDI mass spectrometry using tetracyanoquinodimethane as the matrix. Upon hydrogenation of HBC (MW=522), a new mass arose at 540 m/z. This new mass accounted for the addition of nine hydrogen molecules. The spectrum of the dehydrogenated h-HBC showed the regeneration of HBC and diminishing of the hydrogenated product at 540 m/z. The conversion of HBC to h-HBC during hydrogenation was approximately 70%, whereas during dehydrogenation the conversion back to HBC from h-HBC was approximately 63%. Thus, the hydrogen storage capacity of HBC during hydrogenation was approximately 2.4 wt. %. The results of the hydrogenation of HBC (Table 6) and the subsequent dehydrogenation (Table 7) are shown below.

TABLE 6

Results of a mass spectroscopy study showing the relative abundance of the mass signal corresponding to the h-hexbenzocoronene components formed during hydrogenation of hexabenzocoronene.

| h-HBC Sample Components | Molecular Formula | Molecular Weight | Percentage of Sample Mixture |
|---|---|---|---|
| HBC | $C_{42}H_{18}$ | 522 | 28 |
| Hexahydro-HBC | $C_{42}H_{24}$ | 528 | 1 |
| Octadecahydro-HBC | $C_{42}H_{36}$ | 540 | 71 |

TABLE 7

Results of a mass spectroscopy study showing the relative abundance of the mass signal corresponding to the dh-hexbenzocoronene components formed during dehydrogenation of h-hexabenzocoronene.

| dh-HBC Sample Components | Molecular Formula | Molecular Weight | Percentage of Sample Mixture |
|---|---|---|---|
| HBC | $C_{42}H_{18}$ | 522 | 86 |
| Hexahydro-HBC | $C_{42}H_{24}$ | 528 | 5.5 |
| Dodecahydro-HBC | $C_{42}H_{30}$ | 534 | 0.65 |
| Octadecahydro-HBC | $C_{42}H_{36}$ | 540 | 8 |

EXAMPLE 6

Reversible Hydrogenation of Coronene with Titanium Hydride and Mechanical Grinding. In an argon glovebox, a 0.1 g sample of coronene and 0.047 g of titanium hydride ($TiH_2$, Alfa Aesar) were ground by hand with an agate mortar and pestle until a uniform mixture was formed. In the glovebox, the mixture was then placed in a 50 cc high pressure reactor (Parr instruments) equipped with a customized grinding apparatus. The grinding apparatus consisted of an elongated stirrer shaft with an arc-shaped paddle. The bottom of the reactor contained a stainless steel insert with a concave bottom, which allowed the paddle of the stirrer shaft to sweep the bottom of the reactor with 1/8" clearance. Mechanical agitation of the sample mixture was carried out by adding 5-8 stainless steel ball bearings of varying size (1/16"-1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was pressurized to 1000 psia (69 bar) hydrogen and vented. The coronene was hydrogenated by heating the sample mixture to 200° C. under 1185 psia (82 bar) hydrogen while the mixture was continuously ground for two hours. The reactor was then quickly cooled to room temperature and vented to atmospheric pressure. The mixture was removed from the reactor and the hydrogenated coronene (h-coronene) was removed from the mixture by extracting with chloroform, filtering of the insoluble catalyst, and drying under vacuum. Proton NMR spectroscopy showed that the coronene resonance (singlet at 9 ppm) diminished significantly after hydrogenation while new upfield resonances, assigned to methylene hydrogens, appeared. The integration of these methylene resonances vs.

the unhydrogenated coronene demonstrate a 44% conversion of coronene to hydrogenated coronene products.

To study the dehydrogenation of h-coronene using titanium hydride catalyst, 0.03 g of a h-coronene mixture containing 52% coronene and 48% hydrogenated coronene were ground by hand with 0.03 g of titanium hydride (TiH$_2$, Alfa Aesar) in an argon glovebox with an agate mortar and pestle until a uniform mixture was formed. In the glovebox, the mixture was then placed in a 50 cc high pressure reactor (Parr instruments) equipped with a customized grinding apparatus. The grinding apparatus consisted of an elongated stirrer shaft with an arc-shaped paddle. The bottom of the reactor contained a stainless steel insert with a concave bottom, which allowed the paddle of the stirrer shaft to sweep the bottom of the reactor with 1/8" clearance. Mechanical agitation of the sample mixture was carried out by adding 5-8 stainless steel ball bearings of varying size (1/16"-1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was pressurized to 1000 psia (69 bar) hydrogen and vented to 15 psia (1 bar). The h-coronene was dehydrogenated by heating the sample mixture to 150° C. under 15 psia (1 bar) hydrogen while the mixture was continuously ground for seven hours. The reactor was then quickly cooled to room temperature. The mixture was removed from the reactor and the dehydrogenated coronene (dh-coronene) was removed from the mixture by extracting with chloroform, filtering of the insoluble catalyst, and drying under vacuum. GC-MS analysis was carried out on the dehydrogenated h-coronene, and the results indicated that approximately 90% of the h-coronene was converted to coronene upon dehydrogenation with titanium hydride.

EXAMPLE 7

Reversible Hydrogenation of Carbazole with 5% Rh on carbon catalyst and mechanical grinding. A 0.2 g sample of carbazole (96%, Aldrich) and 0.1 g of rhodium on carbon catalyst (5% Rh, Acros Organics) were ground by hand with an agate mortar and pestle until a uniform mixture was formed. The mixture was then placed in a 50 cc high pressure reactor (Parr instruments) equipped with a customized grinding apparatus. The grinding apparatus consisted of an elongated stirrer shaft with an arc-shaped paddle. The bottom of the reactor contained a stainless steel insert with a concave bottom, which allowed the paddle of the stirrer shaft to sweep the bottom of the reactor with 1/8" clearance. Mechanical agitation of the sample mixture was carried out by adding 5-8 stainless steel ball bearings of varying size (1/16"-1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was pressurized with helium to 1000 psia and vented. Pressurization and venting with helium was repeated three times. The reactor system was then twice pressurized to 1000 psia (69 bar) hydrogen and vented. The carbazole was hydrogenated by heating the sample mixture to 125° C. under 1050 psia (72.4 bar) hydrogen while the mixture was continuously ground for four hours. The reactor was then quickly cooled to room temperature and vented to atmospheric pressure. The reactor was brought into an argon glovebox and the mixture was removed from the reactor, weighed, and half of the material was returned to the reactor for dehydrogenation. The hydrogenated carbazole (h-carbazole) was removed from the mixture by extraction with acetone, filtering of the insoluble catalyst, and drying under vacuum. The reactor system was pressurized to 1000 psia (69 bar) hydrogen and vented to 15 psia (1 bar). The h-carbazole was dehydrogenated by heating the sample mixture to 125° C. under 15 psia (1 bar) hydrogen in the absence of mechanical grinding for four hours. The reactor was then quickly cooled to room temperature. The reactor was brought into an argon glovebox and the mixture was removed from the reactor. The dehydrogenated carbazole (dh-carbazole) was removed from the mixture by extraction with acetone, filtering of the insoluble catalyst, and drying under vacuum. Tables 8 and 9 show the product distribution of h-carbazole and dh-carbazole calculated from GC-MS from areas normalized for those masses:

TABLE 8

Product distribution of h-carbazole calculated from GC-MS from areas normalized for those masses.

| h-Carbazole Sample Components | Molecular Formula | Percentage of Sample Mixture |
|---|---|---|
| Dodecahydrocarbazole | $C_{12}H_{21}N$ | 88 |
| Octahydrocarbazole | $C_{12}H_{17}N$ | 6 |
| Carbazole | $C_{12}H_9N$ | 0 |
| Dicyclohexyl | $C_{12}H_{22}$ | 6 |

TABLE 9

Product distribution of dh-carbazole calculated from GC-MS from areas normalized for those masses.

| dh-Carbazole Sample Components | Molecular Formula | Percentage of Sample Mixture |
|---|---|---|
| Dodecahydrocarbazole | $C_{12}H_{21}N$ | 16 |
| Octahydrocarbazole | $C_{12}H_{17}N$ | 14 |
| Tetrahydrocarbazole | $C_{12}H_{13}N$ | 50 |
| Carbazole | $C_{12}H_9N$ | 12 |
| Dicyclohexyl | $C_{12}H_{20}$ | 4 |
| Cyclohexylbenzene | $C_{12}H_{14}$ | 2 |
| Tributylamine | $C_{12}H_{27}N$ | 2 |

EXAMPLE 8

Dehydrogenation of Liquid Pyrene under 0.15 to 0.26 Bar Hydrogen Pressure. A 0.4 g sample of substantially hydrogenated pyrene (colorless liquid at 25° C., h-pyrene) and 0.2 g platinum on carbon catalyst (10% Pt, Strem) were placed in a 50 cc high pressure reactor (Parr instruments) equipped with a customized grinding apparatus. The grinding apparatus consisted of an elongated stirrer shaft with an arc-shaped paddle. The bottom of the reactor contained a stainless steel insert with a concave bottom, which allowed the paddle of the stirrer shaft to sweep the bottom of the reactor with 1/8" clearance. Mechanical agitation of the sample mixture was carried out by adding 5-8 stainless steel ball bearings of varying size (1/16"-1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was evacuated for 5 minutes and pressurized with helium to 700 psia (48.3 bar) and vented. Pressurization and venting with helium was repeated three times. The system was again evacuated and filled with a 15% hydrogen/85% helium mixture. The sample was dehydrogenated by grinding at 160° C. under a 15% hydrogen/85% helium mixture for 24 hours, initially at 15 psia (1 bar) for a hydrogen partial pressure of 2.25 psia (0.1 bar) and, over the course of the heating and evolution of hydrogen from the dehydrogenation reaction, the pressure increased to 24 psia (1.7 bar) for a hydrogen partial pressure of about 3.6 psia (0.26 bar). After reaction, the reactor was quickly cooled to room temperature and vented. The sample mixture (dh-pyrene) was removed from the reactor and separated from the catalyst by extraction with chloroform (HPLC grade, Fisher) and filtering of the insoluble catalyst. The chloroform was then removed under vacuum to obtain the pure products. GC-MS was used to analyze the hydrogenated pyrene and dehydrogenated h-pyrene. Tables 10-11 show the product distribution of h-pyrene and dh-pyrene calculated from GC-MS from areas normalized for those masses:

TABLE 10

Product distribution of h-pyrene calculated from GC-MS from areas normalized for those masses.

| h-pyrene Sample Components | Molecular Formula | Percentage of Sample Mixture |
| --- | --- | --- |
| Pyrene | $C_{16}H_{10}$ | 0 |
| decahydropyrene | $C_{16}H_{20}$ | 35 |
| hexadecahydropyrene | $C_{16}H_{26}$ | 65 |

TABLE 11

Product distribution of dh-pyrene calculated from GC-MS from areas normalized for those masses.

| dh-pyrene Sample Components | Molecular Formula | Percentage of Sample Mixture |
| --- | --- | --- |
| Pyrene | $C_{16}H_{10}$ | 5 |
| dihydropyrene | $C_{16}H_{12}$ | 6.5 |
| tetrahydropyrene | $C_{16}H_{14}$ | 1.5 |
| hexahydropyrene | $C_{16}H_{16}$ | 25.4 |
| decahydropyrene | $C_{16}H_{20}$ | 5.7 |
| hexadecahydropyrene | $C_{16}H_{26}$ | 56 |

As calculated from Tables 10 and 11 above, the gravimetric hydrogen storage capacity of the hydrogenated pyrene+catalyst was 4.7 wt. % and after dehydrogenation the capacity was reduced to 3.7 wt. % hydrogen. This corresponds to approximately 21% of the stored hydrogen being released during dehydrogenation of h-pyrene.

EXAMPLE 9

Dehydrogenation of Liquid pyrene under 1 bar hydrogen pressure. A 0.4 g sample of substantially hydrogenated pyrene (colorless liquid at 25° C., h-pyrene) and 0.2 g rhodium on carbon catalyst (5% Rh, Acros Organics) were placed in a 50 cc high pressure reactor (Parr instruments) equipped with a customized grinding apparatus. The grinding apparatus consisted of an elongated stirrer shaft with an arc-shaped paddle. The bottom of the reactor contained a stainless steel insert with a concave bottom, which allowed the paddle of the stirrer shaft to sweep the bottom of the reactor with 1/8" clearance. Mechanical agitation of the sample mixture was carried out by adding 5-8 stainless steel ball bearings of varying size (1/16"-1/4" diameter). The stirrer motor was programmed such that rotational direction of the stirrer would alternate between clockwise and counterclockwise directions during the course of the reaction in order to ensure that all of the sample mixture would contact the grinding balls. Once the sample mixture and grinding balls were loaded into the reactor, the system was evacuated for 5 minutes and pressurized with helium to 1000 psia (69 bar) and vented. Pressurization and venting with helium was repeated three times. The system was filled with 14.5 psia hydrogen (1 bar). The sample was dehydrogenated by grinding at 150° C. under 23 psia (1.6 bar) hydrogen pressure for 16 hours. After reaction, the reactor was quickly cooled to room temperature and vented. The still-liquid sample mixture (dh-pyrene) was removed from the reactor and separated from the catalyst by extraction with chloroform (HPLC grade, Fisher) and filtering of the insoluble catalyst. The chloroform was then removed under vacuum to obtain the pure products. GC-MS was used to analyze the hydrogenated pyrene and dehydrogenated h-pyrene. Tables 12 and 13 show the product distribution of h-pyrene and dh-pyrene calculated from GC-MS from areas normalized for those masses:

TABLE 12

Product distribution of h-pyrene calculated from GC-MS from areas normalized for those masses.

| h-pyrene Sample Components | Molecular Formula | Percentage of Sample Mixture |
| --- | --- | --- |
| Pyrene | $C_{16}H_{10}$ | 0 |
| decahydropyrene | $C_{16}H_{20}$ | 35 |
| hexadecahydropyrene | $C_{16}H_{26}$ | 65 |

TABLE 13

Product distribution of dh-pyrene calculated from GC-MS from areas normalized for those masses.

| dh-pyrene Sample Components | Molecular Formula | Percentage of Sample Mixture |
| --- | --- | --- |
| Pyrene | $C_{16}H_{10}$ | 9.1 |
| dihydropyrene | $C_{16}H_{12}$ | 4.5 |
| tetrahydropyrene | $C_{16}H_{14}$ | 0.4 |
| hexahydropyrene | $C_{16}H_{16}$ | 20.3 |
| octahydropyrene | $C_{16}H_{18}$ | 0.3 |
| decahydropyrene | $C_{16}H_{20}$ | 19.4 |
| hexadecahydropyrene | $C_{16}H_{26}$ | 46 |

As calculated from Tables 12 and 13 above, the gravimetric hydrogen storage capacity of the hydrogenated pyrene+catalyst was 4.7 wt. % and after dehydrogenation the capacity was reduced to 3.5 wt. % hydrogen. This corresponds to approximately 25% of the stored hydrogen being released during dehydrogenation of h-pyrene.

EXAMPLE 10

Hydrogenation and Dehydrogenation of N-Ethylcarbazole in a Single Reactor System. Under inert atmosphere, 8.0 g of N-ethylcarbazole, 0.2 g of 5% ruthenium on lithium aluminate (hydrogenation catalyst), and 0.2 g of 4% palladium on lithium aluminate (dehydrogenation catalyst) were placed in a 20 cc stirred tank reactor and the reactor was sealed. The reactor was connected to a manifold containing a vacuum source, high-pressure hydrogen source, high-pressure ballast, and a flow measurement system consisting of a calibrated 100 sccm flow meter. After evacuation of residual air from the manifold lines, hydrogen was purged through the reactor to displace the argon from the reactor headspace. The reactor and ballast were charged to 1000 psia with hydrogen and the contents were heated with rapid stirring to 160° C. Heating was continued for ca. 250 minutes until the pressure drop in the system had ceased. The reactor was cooled to 50° C. and the hydrogen pressure reduced to 15 psia (ca. 1 atmosphere). The reactor was then opened to the flow meter. The reactor was heated from 50° C. to 197° C. at a rate of 3° C./minute under one atmosphere of hydrogen. Upon heating, hydrogen evolved from the hydrogenated N-ethylcarbazole liquid and this hydrogen gas was passed through the flow meters for measurement. The pressure in the system was maintained at a constant 15 psia during the dehydrogenation. After ca. 220 minutes, the flow had diminished to <2 sccm and flow meters were isolated from the reactor and the reactor was cooled to 160° C. The total amount of hydrogen evolved was 4.99 liters (at standard temperature and pressure) which corresponds to a desorption of 5.6 wt. % hydrogen from the liquid. The hydrogen pressure in the reactor was increased to 1000 psia and the N-ethylcarbazole was rehydrogenated at 160° C. The sequence of hydrogenation (1000 psia hydrogen, 160° C.) and dehydrogenation (15 psia hydrogen, 197° C.) was repeated for a total of five cycles without opening the reactor, adding any contents to the reactor, or removing any contents of the reactor (FIG. 13). After the fifth cycle, the N-ethylcarbazole was hydrogenated (1000 psia hydrogen, 160° C.) in the reactor and the contents removed for analysis. GC/MS analysis of the hydrogenated N-ethylcarbazole showed no detectable degradation or formation of reaction byproducts.

EXAMPLE 11

Hydrogenation of N-ethylcarbazole and Dehydrogenation of N-ethylcarbazole in a Separate Reactor System. A 100 cc stainless steel pressure reactor was loaded with 50 g N-ethylcarbazole and 2.0 g of 5% ruthenium on lithium aluminate. After purging the headspace with hydrogen, the hydrogen pressure was increased to 800 psia. The reactor was heated to 160° C. and the hydrogen pressure increased to 1000 psia. After 2.5 hours, the reactor was cooled to 25° C. and the contents filtered to remove catalyst. GC/MS analysis showed complete conversion to perhydro-N-ethylcarbazole. The GC/MS analysis also revealed that the perhydro-N-ethylcarbazole was present in the hydrogenated mixture as three different conformational isomers (conformers) that were resolved on the GC column. The perhydro-N-ethylcarbazole was degassed by evacuation ($1.0 \times 10^{-3}$ torr) at 20° C. for 20 minutes. Under inert atmosphere, 4.0 g of N-ethylcarbazole and 0.1 g of 4% palladium on lithium aluminate (dehydrogenation catalyst) were placed in a 20 cc stirred tank reactor and the reactor sealed. The reactor was connected to a manifold containing a vacuum source, hydrogen source, and a flow measurement system consisting of a calibrated 10 and 100 sccm flow meters in series. After evacuation of residual air from the manifold lines, hydrogen was purged through the reactor to displace the argon from the reactor headspace. The reactor was heated to 150° C. with stirring (300 rpm) under 1 atm. hydrogen. After 15 minutes at 150° C., the measured hydrogen flow corresponded to the desorption of 0.2 wt. % hydrogen. The temperature was then raised to 200° C., resulting in the rapid dehydrogenation of the hydrogenated N-ethylcarbazole. In the first 60 minutes at 197° C., 3.8 wt. % hydrogen was desorbed. After 260 minutes at 200° C., 5.35 wt. % hydrogen was desorbed, giving a total hydrogen desorption of 5.55 wt % hydrogen (FIG. 14).

EXAMPLE 12

Dehydrogenation of N-Ethylcarbazole in Continuous Flow Reactor System. A tubular reactor (⅜ inches in diameter by 7 inches in length) was filled with a small amount of glass beads, the desired amount of catalyst (5% Pd on alumina spheres, 3 mm in diameter), and topped with a small amount of glass beads. The reactor was oriented in a vertical orientation and heated using a tube furnace to the desired temperature (FIG. 15). A piston pump was used to obtain the desired flow of perhydrogenated N-ethyl carbazole from a holding tank through the reactor. The dehydrogenated liquid reaction product was passed through a backpressure regulator into a gas-liquid separator (1 liter cylindrical vessel). Hydrogen gas flowed out the top of the separator and was measured by a flow meter while the liquid flow dropped to a receiving vessel. In separate experiments (Table 14), the hydrogenated N-ethylcarbazole was flowed from the top of the reactor to the bottom (downflow) and from the bottom of the reactor to the top of the reactor (upflow). Pressure in the reactor was controlled by the use of backpressure regulators.

TABLE 14

Dehydrogenation of hydrogenated N-ethylcarbazole with palladium on alumina catalyst in a flowing reactor system under various conditions of catalyst loading, temperature, and pressure inside of the reactor system.

| Table Entry | N-Ethylcarbazole Flow (grams/minute) | Catalyst Amount (grams) | Pressure (psia) | Temperature (° C.) | Hydrogen Flow (sccm) |
|---|---|---|---|---|---|
| DOWNFLOW | | | | | |
| 1 | 0.5 | 10 | 25 | 185 | 110 |
| 2 | 0.5 | 10 | 25 | 190 | 160 |
| 3 | 0.25 | 5 | 28 | 190 | 65 |
| 4 | 0.5 | 5 | 28 | 190 | 85 |
| 5 | 0.5 | 5 | 115 | 190 | 40 |
| 6 | 0.5 | 5 | 30 | 170 | 40 |
| 7 | 0.25 | 5 | 30 | 166 | 36 |
| 8 | 0.25 | 5 | 30 | 190 | 68 |
| UPFLOW | | | | | |
| 9 | 0.25 | 5 | 26 | 170 | 30 |
| 10 | 0.5 | 5 | 26 | 170 | 28 |
| 11 | 0.25 | 5 | 29 | 193 | 43 |
| 12 | 0.5 | 5 | 29 | 193 | 60 |

EXAMPLE 13

Measurement of Heat of Reaction for the Hydrogenation of N-Ethylcarbazole. Hydrogenation calorimetry experiments were conducted using a Mettler RC1e Reaction Calorimeter with a HP100 stainless steel reactor. The reactor was equipped with a gas-inducing impeller operated at 1800 rpm. Hydrogen was delivered to the reactor using a Büchi Press-Flow gas controller, to yield an accurate measure of the amount of hydrogen consumed. The reaction calorimeter calculates the heat flow rate into or out of the reactor by multiplying the difference between the jacket temperature and the reaction temperature by the heat transfer coefficient for the reaction system. This heat transfer coefficient, U, varies with the properties of the liquid in the reactor, the reactor internals (impeller, baffles, etc.), and the agitation rate. The rate of heat production by the reaction was calculated from the overall heat flow rate by considering other terms in the heat balance. In a batch experiment, the most important other term is the sensible heat change in the reactor, for example during a temperature ramp, or during a temperature overshoot at the onset of reaction. Calculating this term requires the heat capacity, $c_p$, of the reactor contents. For the highest quality calorimetric data, the values of U and $c_p$ must be measured as a function of temperature and liquid composition, and baseline conditions must be established before and after the reaction phase. A separate experiment was conducted prior to the reaction batches to establish some of the required parameters for the N-ethylcarbazole starting material. Values for U and $c_p$ were measured using the RC1 at temperatures ranging from 100° C. to 160° C. at 20° C. intervals. These measurements were made without catalyst present in the reactor.

The reactor was charged with 1150 grams of N-ethylcarbazole and heated to 150° C. To attain a good baseline and an accurate U measurement at the front end of the experiment, the catalyst was added only after these objectives had been met, i.e., after attaining reaction temperature. The reactor was charged with 40 g of 5% ruthenium on lithium aluminate catalyst by direct addition to the liquid N-ethylcarbazole at 150° C., after which the agitation was started and the reactor was quickly pressurized to 1000 psia. The hydrogenation was conducted for 20 hours at 150° C. while maintaining a constant hydrogen pressure of 1000 psia. After 20 hours, the measured hydrogen uptake suggested a nearly complete hydrogenation. During the hydrogenation, the calculated heat of reaction held steady at about 12.4 kcal/mol $H_2$ for $1.5 < H_2$/N-ethylcarbazole $< 3.5$, then decreased linearly to about 11.8 kcal/mol $H_2$ at $H_2$/N-ethylcarbazole=5.

EXAMPLE 14

Reversible Hydrogenation of 1-Ethyl-2-methylindole/1,2-Dimethylindole Mixture. A mixture of 4.2 g 1,2-dimethylindole and 1.8 g 1-ethyl-2-methylindole was placed in a 20 cc stainless steel reactor. This mixture was a free-flowing liquid at 20° C. To the liquid mixture was added 1.0 g of 5% ruthenium on lithium aluminate. The reactor was sealed and the headspace purged with hydrogen. The mixture was heated to 170° C. under 700 psia hydrogen with stirring (500 rpm) for 3 hours. The reactor was cooled to ambient temperature and the contents dissolved in 100 cc chloroform. The catalyst was removed by filtration. The hydrogenated 1,2-dimethylindole/1-ethyl-2-methylindole mixture was isolated by removing the chloroform under vacuum. GC/MS analysis of the liquid hydrogenated mixture indicated complete hydrogenation of both 1,2-dimethylindole and 1-ethyl-2-methylindole (Table 15).

TABLE 15

GC/MS analysis of the products formed by hydrogenating a mixture of 1,2-dimethylindole and 1-ethyl-2-methylindole and the calculated amount of hydrogen available for the reverse (dehydrogenation) reaction.

| Molecular Weight | Percentage of Sample Mixture | Available wt. % hydrogen |
|---|---|---|
| 153 (perhydrogenated 1,2-dimethylindole) | 67 | 3.5 |
| 167 (perhydro 1-ethyl-2-methyindole) | 33 | 1.6 |

Under an argon atmosphere, a 20 cc stainless steel reactor was charged with 4.8 g of the hydrogenated 1,2-dimethylindole/1-ethyl-2-methylindole mixture and 0.5 g of 5% palladium on alumina. After evacuation of residual air from the manifold lines, hydrogen was purged through the reactor to displace the argon from the reactor headspace. The mixture was heated to 175° C. with stirring under 1 atm. hydrogen for 13 hours. After cooling to 25° C., the reactor was opened under argon and the reactor contents were analyzed by GC/MS (Table 16).

TABLE 16

GC/MS analysis of the products formed by hydrogenating a mixture of 1,2-dimethylindole and 1-ethyl-2-methylindole.

| Molecular Weight | Percentage of Sample Mixture |
|---|---|
| 153 (perhydrogenated 1,2-dimethylindole) | 6.8 |
| 149 (hydrogenated intermediate of 1,2-dimethylindole) | 4.7 |
| 145 (1,2-dimethylindole) | 53 |
| 163 (hydrogenated intermediate of 1-ethyl-2-methylindole) | 2.9 |
| 159 (1-ethyl-2-methylindole) | 33 |

From the distribution of compounds in the dehydrogenated mixture, the calculated amount of desorbed hydrogen was 4.5 wt. %. The reactor was resealed and hydrogen was purged through the reactor to displace the argon from the reactor headspace. The mixture was heated to 185° C. with stirring under 1 atm. hydrogen for 3.0 hours. After cooling to 25° C., the reactor was opened under argon and the reactor contents were analyzed by GC/MS (Table 17).

TABLE 17

GC/MS analysis of the products formed by dehydrogenating the hydrogenated mixture of 1,2-dimethylindole and 1-ethyl-2-methylindole described in Table 16.

| Molecular Weight | Percentage of Sample Mixture |
|---|---|
| 149 (hydrogenated intermediate of 1,2-dimethylindole) | 2 |
| 163 (hydrogenated intermediate of 1-ethyl-2-methylindole) | 1 |
| 159 (1-ethyl-2-methylindole) | 60 |
| 145 (1,2-dimethylindole) | 37 |

From the distribution of compounds in the dehydrogenated mixture, the calculated amount of desorbed hydrogen was 5.03 wt. %, and 99% of the available hydrogen was recovered.

EXAMPLE 15

Reversible Hydrogenation of 1-Ethyl-2-methylindole. A 100 cc stainless steel pressure reactor was loaded with 55 g 1-ethyl-2-methylindole and 2.5 g of 5% ruthenium on lithium aluminate. After purging the headspace with hydrogen, the reactor was heated to 160° C. and the hydrogen pressure increased to 1000 psia with stirring (1000 rpm). After 2 hours the reactor was cooled to ambient temperature. GC-MS analysis of the reactor contents indicated that the hydrogenated product contained 95% perhydrogenated 1-ethyl-2-methylindole (h-1-ethyl-2-methylindole), 2% 1-ethyl-2-methylindole starting material, and 3% hydrogenation intermediates. Under inert atmosphere, 4.0 g of the hydrogenated mixture, 0.1 g of 5% palladium on alumina were placed in a 20 cc stirred tank reactor, and the reactor was sealed. The reactor was connected to a manifold containing a vacuum source, hydrogen source, and a flow measurement system consisting of a calibrated 10 and 100 sccm flow meters in series. After evacuation of residual air from the manifold lines, hydrogen was purged through the reactor to displace the argon from the reactor headspace. The reactor was heated to 180° C. with stirring (300 rpm) under 1 atm. hydrogen. After 17.5 hours at 180° C., the measured hydrogen flow corresponded to the desorption of 4.55 wt. % hydrogen (FIG. 16). The first 4 wt. % hydrogen was desorbed after the first 5 hours at 180° C. The dehydrogenated sample was analyzed by GC/MS (Table 18).

TABLE 18

Normalized distribution of products (GC/MS) formed by dehydrogenating a hydrogenated form of 1-ethyl-2-methylindole at 180° C.

| Molecular Weight | Percentage of Sample Mixture |
|---|---|
| 159 (1-ethyl-2-methylindole) | 96 |
| 163 (hydrogenated intermediate of 1-ethyl-2-methylindole) | 4 |

From the distribution of compounds in the dehydrogenated mixture, the calculated amount of desorbed hydrogen was 4.6 wt. %. Under inert atmosphere, 4.0 g of the hydrogenated mixture, 0.1 g of 5% palladium on alumina were placed in a 20 cc stirred tank reactor, and the reactor was sealed. The reactor was connected to a manifold containing a vacuum source, hydrogen source, and a flow measurement system consisting of a calibrated 10 and 100 sccm flow meters in series. After evacuation of residual air from the manifold lines, hydrogen was purged through the reactor to displace the argon from the reactor headspace. The reactor was heated to 160° C. with stirring (300 rpm) under 1 atm. hydrogen. After 24 hours at 160° C., the measured hydrogen flow corresponded to the desorption of 3.55 wt. % hydrogen (FIG. 17). The dehydrogenated sample was analyzed by GC/MS (Table 19).

TABLE 19

Normalized distribution of products (GC/MS) formed by dehydrogenating a hydrogenated form of 1-ethyl-2-methylindole at 160° C.

| Molecular Weight | Percentage of Sample Mixture |
|---|---|
| 159 (1-ethyl-2-methylindole) | 56.7 |
| 163 (hydrogenated intermediate of 1-ethyl-2-methylindole) | 35.6 |
| 167 (perhydrogenated 1-ethyl-2-methylindole) | 7.6 |

From the distribution of compounds in the dehydrogenated mixture, the calculated amount of desorbed hydrogen was 3.6 wt. %.

COMPARATIVE EXAMPLE 1

Reversible Hydrogenation of Pentacene with 5% Rh on carbon catalyst. A 0.100 g sample of pentacene (Aldrich) and 0.050 g of rhodium on carbon catalyst (5% Rh, Acros Organics) were ground with an agate mortar and pestle for 15 minutes until a uniform mixture was formed. The sample was then placed in a differential pressure adsorption unit. The adsorption unit consisted of two identical pressure cells which were spanned by a differential pressure gauge. The absolute pressure of the two cells was measured independently by pressure transducers. Adsorption of hydrogen by the sample was characterized by a relative decrease of the pressure in the sample cell relative to the reference cell while maintaining an identical temperature between the two cells. The sample was degassed at ambient temperature for 20 minutes under vacuum. Both the sample cell and reference cell were placed under 980 psia (67.6 bar) hydrogen and heated to 150° C. The hydrogen pressure in the sample cell dropped, relative to the reference cell, for a period of about 8 hours, indicating adsorption of 5.5 wt. % hydrogen by the sample (FIG. 18). After 14 hours, the cells were cooled to ambient temperature and the pressure in both cells reduced to 18 psia (1.25 bar). Upon heating both cells to 150° C., there was a small increase in the pressure of the sample cell relative to the reference cell, indicating desorption of hydrogen from the sample (FIG. 19). After 70 hours, the sample had desorbed 0.15 wt. % hydrogen (2.7% of the sorbed hydrogen).

COMPARATIVE EXAMPLE 2

Attempted Dehydrogenation of Decahydronaphthalene (Decalin) with 5% Rh on Carbon Catalyst. A 4.0 g sample of decahydronaphthalene (33% cis- and 66% trans-decalin, 99+%, Aldrich) and 2.0 g of rhodium on carbon catalyst (5% Rh, Acros Organics) were placed in a 25 cc high pressure reactor (Parr instruments). Once the sample mixture was loaded into the reactor, the system was pressurized with helium to 1000 psia (69 bar) and vented. Pressurization and venting with helium was repeated three times. The reactor was pressurized with 1000 psia (69 bar) hydrogen at 150° C. with stirring for one hour to activate the catalyst. The reactor system was vented down to 15 psia (1 bar) hydrogen pressure. Dehydrogenation was attempted by continuous heating at 150° C. under 15 psia (1 bar) hydrogen for 16 hours. After cooling the reactor to room temperature, the sample was isolated by extraction with chloroform, filtering of the catalyst, and drying under vacuum. GC-MS indicated that the sample comprised 100% unreacted decahydronaphthalene and no detectable dehydrogenation had occurred.

6.1 Discussion of the Examples

EXAMPLE 1 demonstrates that the reversible hydrogenation of pyrene ($C_{16}H_{10}$) can be achieved under mild conditions and short reaction times starting from solid pyrene and a solid admixed catalyst. Under 1000 psia (69 bar) of hydrogen gas pressure at 95° C. with moderate mechanical grinding, the conversion of pyrene to hydrogenated pyrene compounds ($C_{16}H_{12}$—$C_{16}H_{26}$) is 99.5% in 1.5 hours (Table 2). This is a 2.3 wt. % increase of the gravimetric hydrogen capacity on a total sample weight basis (pyrene+catalyst). The temperature at which the hydrogenation is carried out is well below the melting point of pyrene (149° C.). The hydrogenated pyrene can be isolated as a solid material at room temperature that shows a melting point onset of approximately 110° C. Thus, it is likely that pyrene, a solid at the onset of the hydrogenation, remains a solid during the hydrogenation reaction carried out at 95° C. The mixture of hydrogenated pyrene compounds can be dehydrogenated, under 15° psia (1 bar) hydrogen gas pressure, at 95° C. with moderate mechanical grinding. After three hours under these conditions, 25% of the sample was converted back to pyrene and the abundance of dihydropyrene ($C_{16}H_{12}$) was increased relative to the more deeply hydrogenated species.

EXAMPLE 2 teaches that the reversible hydrogenation of coronene ($C_{24}H_{12}$) can be achieved under mild conditions and short reaction times starting from solid coronene and a solid admixed catalyst. Under 1045 psia (72 bar) of hydrogen gas pressure at 150° C. with moderate mechanical grinding, the conversion of coronene to hydrogenated coronene compounds ($C_{24}H_{22}$—$C_{24}H_{30}$) is 99+% in 4 hours (Table 4). This is a 3.5 wt. % increase of the gravimetric hydrogen capacity on a total sample weight basis (coronene+catalyst). The temperature at which the hydrogenation is carried out is far below the melting point of coronene (442° C.). The hydrogenated coronene can be isolated as a solid material at room temperature that shows a melting point onset at approximately 280° C. Thus, it is likely that coronene, a solid at the onset of hydrogenation, remains a solid during the hydrogenation reaction carried out at 150° C. The mixture of hydrogenated coronene compounds can be dehydrogenated, under 15 psia (1 bar) hydrogen gas pressure, at 150° C. with moderate mechanical grinding. After 16 hours under these conditions, 91% of the sample was converted back to coronene (Table 5).

EXAMPLE 3 demonstrates that the reversible hydrogenation of coronene can be used to store hydrogen under mild conditions of temperature and pressure and in the absence of mechanical grinding, using solid coronene and a solid admixed catalyst. Under 970 psia (67 bar) of hydrogen gas pressure at 150° C., a 3.2 wt. % increase of the gravimetric hydrogen capacity on a total sample weight basis (coronene+catalyst) is observed over a period of 17 hours (FIG. 8). The mixture of hydrogenated coronene compounds can be dehydrogenated, under 20 psia (1.4 bar) hydrogen gas pressure, at 150° C. in the absence of mechanical grinding. After 70 hours under these conditions the sample desorbed 1.0 wt. % hydrogen (FIG. 9, 31% of the sorbed hydrogen).

EXAMPLE 4 demonstrates that the reversible hydrogenation of coronene can be used to store large quantities of hydrogen under mild conditions of temperature and pressure and in the absence of mechanical grinding, using solid coronene and a solid admixed catalyst. The adsorbent can be subjected to multiple cycles of hydrogenation and dehydrogenation, thus forming the basis for a cyclic hydrogen storage process. Under 995 psia (68.6 bar) of hydrogen gas pressure at 150° C., a 4.9 wt. % increase of the gravimetric hydrogen capacity on a total sample weight basis (coronene+catalyst) is observed over a period of 63 hours (FIG. 10, cycle #1). The mixture of hydrogenated coronene compounds can be dehydrogenated, under 20 psia (1.4 bar) hydrogen gas pressure, at between 150° C. and 200° C. in the absence of mechanical grinding (FIG. 7). After 24 hours at 150° C. and 14 hours at 200° C. the sample desorbed 4.5 wt. % hydrogen (92% of the sorbed hydrogen). The sample was hydrogenated a second time; under 1005 psia (69.4 bar) of hydrogen gas pressure at 150° C., a 3.9 wt. % increase of the gravimetric hydrogen capacity on a total sample weight basis (coronene+catalyst) is observed over a period of 91 hours (FIG. 10, cycle #2). The mixture of hydrogenated coronene compounds can be dehydrogenated, under 20 psia (1.4 bar) hydrogen gas pressure, at 200° C. in the absence of mechanical grinding (FIG. 11). After 9 hours at 200° C. the sample desorbed 3.5 wt. % hydrogen (90% of the sorbed hydrogen). FIGS. 11 and 12 further demonstrate an advantage of gas/solid hydrogenation and dehydrogenation of a two component solid system (hydrogenated and dehydrogenated forms of the solid substrate) in that the hydrogenation and dehydrogenation of the solid can easily and effectively go to completion under equilibrium conditions.

EXAMPLE 5 teaches that the reversible hydrogenation of hexabenzocoronene ($C_{42}H_{18}$) can be achieved starting from solid hexabenzocoronene and a solid admixed catalyst. Under 1130 psia (78 bar) of hydrogen gas pressure at 200° C. with moderate mechanical grinding, the conversion of hexabenzocoronene to hydrogenated hexabenzocoronene compounds ($C_{42}H_{24}$—$C_{42}H_{36}$) is 72% in 8 hours (Table 6). This represents a 1.65 wt. % increase of the gravimetric hydrogen capacity on a total sample weight basis (hexabenzocoronene+catalyst). The temperature at which the hydrogenation is carried out is 500+° C. below the melting point of hexabenzocoronene (700+° C.). Thus, it is extremely likely that hexabenzocoronene, a solid at the onset of hydrogenation, remains a solid during the hydrogenation reaction carried out at 200° C. The mixture of hydrogenated hexabenzocoronene compounds can be dehydrogenated, under 15 psia (1 bar) hydrogen gas pressure, at 200° C. with moderate mechanical grinding. After 16 hours under these conditions, 58% of the hydrogenated hexabenzocoronene was converted back to hexabenzocoronene.

EXAMPLE 6 demonstrates that the reversible hydrogenation of coronene ($C_{24}H_{12}$) can be achieved under mild conditions and short reaction times starting from solid coronene and a solid admixed catalyst from the group of early transition metals (Sc, Y, Ti, Zr, Hf, V, Nb, Ta). This is notable in that metals and metal alloys of the late transition metals (Fe, Ru, Os, Co, Rh, Ir, Ni, Pd, Pt) are typically employed as catalysts for hydrogenation and/or dehydrogenation. In addition, this example teaches that a catalyst in the form of a stable metal hydride ($MH_x$) can be utilized for the reversible hydrogenation of extended pi-conjugated substrates. Under 1185 psia (82 bar) of hydrogen gas pressure at 200° C. with moderate mechanical grinding, the conversion of coronene to hydrogenated coronene compounds (h-coronene) is 44% in only 2 hours. The mixture of hydrogenated coronene compounds can be dehydrogenated, under 15 psia (1 bar) hydrogen gas pressure, at 150° C. with moderate mechanical grinding. After 7 hours under these conditions, 90% of the h-coronene was converted back to coronene.

EXAMPLE 7 teaches that the reversible hydrogenation of extended pi-conjugated substrates containing heteroatoms (e.g. N, O, S) can be carried out under mild conditions and short reaction times in the solid state for the storage of hydrogen. A mixture of solid carbazole ($C_{12}H_9N$) and solid catalyst can be used to efficiently adsorb hydrogen in four hours or less at 125° C. and 1050 psia (72.4 bar) hydrogen gas pressure. This temperature is about 120° C. below the melting point of carbazole (246° C.), which suggests that the hydrogenation occurs readily in the solid state. The quantitative hydrogenation of carbazole and the very high conversion (94%) to the perhydrogenated form, dodecahydrocarbazole ($C_{12}H_{21}N$), leads to a large 6.6 wt. % hydrogen storage capacity. A small amount of hydrogenolysis is observed in the formation of dicyclohexyl during the hydrogenation reaction. This could be attenuated by lessening the reaction time and/or stopping the hydrogenation reaction immediately after complete conversion of carbazole. The generally smaller ΔH of hydrogenation predicted for polyaromatic hydrocarbons containing N heteroatoms (FIG. 7 and related discussion) is manifested in a facile dehydrogenation of the hydrogenated carbazole. Dehydrogenation is accomplished at only 125° C. under 15 psia (1 bar) hydrogen gas pressure in the absence of mechanical grinding to yield 3.1 wt. % hydrogen gas after only four hours. A small amount of additional hydrogenolysis is observed during the dehydrogenation reaction leading to the observation of dicyclohexyl, cyclohexylbenzene, and tributylamine.

EXAMPLE 8 demonstrates that the dehydrogenation of a hydrogenated liquid extended pi-conjugated substrate as taught by this invention can be achieved under mild conditions. Starting from a liquid hydrogenated pyrene and a solid admixed catalyst under 24 psia (1.7 bar) of 15% hydrogen/85% helium gas pressure at 160° C. with moderate mechanical grinding, the conversion of hydrogenated pyrene ($C_{16}H_{20}$—$C_{16}H_{26}$) to dehydrogenated pyrene compounds ($C_{16}H_{10}$—$C_{16}H_{26}$) results in liberation of 21% of the stored hydrogen (Table 11). Due to the extensive hydrogenation of the pyrene (Table 9), the melting point of the starting liquid is below 25° C. After the dehydrogenation was ended, the mixture of dehydrogenated pyrene compounds ($C_{16}H_{10}$—$C_{16}H_{26}$) was still found to be liquid at 25° C.

EXAMPLE 9 demonstrates that the dehydrogenation of a hydrogenated liquid substrate can be achieved at a mild temperature under hydrogen partial pressures of greater than about 1 bar. Starting from a liquid hydrogenated pyrene and a solid admixed catalyst under 23 psia (1.7 bar) of hydrogen gas pressure at 150° C. with moderate mechanical grinding, the conversion of hydrogenated pyrene ($C_{16}H_{20}$—$C_{16}H_{26}$) to dehydrogenated pyrene compounds ($C_{16}H_{10}$—$C_{16}H_{26}$) results in liberation of 25% of the stored hydrogen (Table 13). Due to the extensive hydrogenation of the pyrene (Table 12), the melting point of the starting liquid is below 25° C. After the dehydrogenation was ended, the mixture of dehydrogenated pyrene compounds ($C_{16}H_{10}$—$C_{16}H_{26}$) was still found to be liquid at 25° C. The extent of dehydrogenation of liquid hydrogenated pyrene can be compared to that of liquid decalin in comparative Example 2. At the same temperature (150° C.) and even lower hydrogen pressure (15 psia), the dehydrogenation of decalin proceeded to undetectable (<0.5%) conversion after 16 hours.

EXAMPLE 10 teaches that the reversible hydrogenation of N-ethylcarbazole can be used to store substantial amounts of hydrogen under mild conditions of temperature and pressure. Furthermore, the pi-conjugated N-ethylcarbazole substrate can be subjected to multiple cycles of hydrogenation and dehydrogenation with no discernable chemical degradation of the substrate, thus forming the basis for a cyclic hydrogen storage process in a single vessel. The low volatility of the hydrogenated N-ethylcarbazole liquid substrate facilitates the recovery of hydrogen from the liquid carrier. In the presence of separate hydrogenation and dehydrogenation catalysts, the N-ethylcarbazole substrate was hydrogenated under 1000 psia hydrogen at 160° C. for 250 minutes, storing ca. 5.8 wt. % hydrogen. By reducing the hydrogen pressure to 15 psia and increasing the temperature to 197° C., hydrogen was delivered by a catalytic dehydrogenation of the hydrogenated N-ethylcarbazole (FIG. 13). Due to the low volatility of N-ethylcarbazole and the various hydrogenated N-ethylcarbazole intermediates, no device (e.g. condenser or membrane) was necessary to separate the hydrogen from the liquid substrate in the reactor. The hydrogen evolved from the reactor while the liquid substrate remained in the reactor. After 220 minutes at 197° C., ca. 5.6 wt. % hydrogen was delivered from the N-ethylcarbazole substrate. The substrate was then rehydrogenated under the original hydrogenation conditions (1000 psia hydrogen, 160° C.). The cycle of hydrogenation and dehydrogenation was repeated five times followed by a sixth hydrogenation. In all five cycles, over 5.5 wt. % hydrogen was delivered and no decrease in the hydrogen storage capacity was evident. The rate of hydrogen delivery did not exhibit a systematic change over the five cycles, with times ranging from 220-370 minutes for the delivery of over 5.5 wt. % hydrogen at 197° C. Thus, N-ethylcarbazole in a single reactor system can be used to reversibly store hydrogen using a temperature/pressure swing mode where hydrogenation (charging) is accomplished by raising the hydrogen pressure to above the equilibrium pressure for hydrogenation at the desired hydrogenation temperature and dehydrogenation (discharging) can be accomplished by lowering the pressure to below the equilibrium pressure for hydrogenation and increasing the temperature. Alternatively, the storage of hydrogen by the reversible hydrogenation of a pi-conjugated substrate can be accomplished using a pressure swing mode. In the pressure swing mode, at a temperature that is suitable for both hydrogenation and dehydrogenation, the temperature is held constant while the pressure is increased or decreased to effect the desired hydrogenation (charging) or dehydrogenation (discharging).

EXAMPLE 11 demonstrates that the reversible hydrogenation of N-ethylcarbazole can be used to store substantial amounts of hydrogen in the form of a hydrogenated liquid substrate and that the hydrogenated liquid substrate can be transported to a location where the hydrogen is recovered using a dehydrogenation reactor. A hydrogenation reactor system can be used to capture and store the hydrogen by the hydrogenation of a liquid-phase pi-conjugated substrate. The free-flowing liquid-phase hydrogenated substrate can be pumped or poured for distribution to holding tanks and storage vessels. The liquid can be easily transported using conventional methods for liquid transport and distribution (pipelines, railcars, tanker trucks). The hydrogen is generated at the point of use by a dehydrogenation reactor system that delivers hydrogen and recovers the dehydrogenated substrate for eventual transportation back to the hydrogenation reactor site. In the presence of a hydrogenation catalyst, N-ethylcarbazole was hydrogenated under 1000 psia hydrogen at 160° C. for 2.5 hours in a hydrogenation reactor. The hydrogenated N-ethylcarbazole is a colorless, free-flowing, low-volatility liquid that is easily handled. Analysis of the hydrogenated N-ethylcarbazole using GC/MS revealed the presence of three different conformers. These conformers are individual compounds with the same formula and bond connectivity, but different stereochemistry. They will have different physical properties, including a different ΔH of hydrogenation for each conformer. After filtration to remove the hydrogenation catalyst, the hydrogenated liquid was transported to a dehydrogenation reactor. In the presence of a dehydrogenation catalyst, hydrogenated N-ethylcarbazole was dehydrogenated under 15 psia hydrogen at temperatures between 150-197° C., yielding 5.55 wt. % hydrogen after 260 minutes at 197° C. (FIG. 14).

EXAMPLE 12 teaches that the dehydrogenation of hydrogenated N-ethylcarbazole can be carried out in a continuous flowing dehydrogenation reactor system. Continuous flow reactor systems may be well suited to applications where steady hydrogen flow rates are preferred. Flow systems can facilitate the collection of dehydrogenated substrate for transportation to a hydrogenation reactor. The rate of dehydrogenation and hydrogen flow from the reactor can be controlled by the temperature of the dehydrogenation reactor and the hydrogen pressure inside of the dehydrogenation reactor. The low volatility of N-ethylcarbazole and the various hydrogenated N-ethylcarbazole intermediates allows the separation of hydrogen from the dehydrogenated liquid substrate using a simple gas-liquid separator vessel. In a tubular reactor packed with beaded dehydrogenation catalyst, hydrogenated N-ethylcarbazole was dehydrogenated by passing the liquid through a bed of the dehydrogenation catalyst at temperatures ranging from 166-193° C. and hydrogen pressures ranging from 25 psia to 115 psia. The dehydrogenated liquid was easily separated from the hydrogen using a simple gas-liquid separator and sent to a recovery tank. The hydrogen flow rate was controlled by the temperature of the reactor system. In entry 7 of Table 14, the hydrogen flow rate was 36 sccm at a dehydrogenation reactor temperature of 166° C. With an identical catalyst loading and hydrogen pressure (30 psia), the hydrogen flow rate was 68 sccm at a dehydrogenation reactor temperature of 190° C. (Table 14, entry 8). The hydrogen flow rate was also controlled using the hydrogen pressure in the dehydrogenation reactor system. In entry 4 of Table 14, the hydrogen flow rate was 85 sccm at a dehydrogenation reactor hydrogen pressure of 28 psia. With an identical catalyst loading and reactor temperature (190° C.), the hydrogen flow rate was 40 sccm at a dehydrogenation reactor hydrogen pressure of 115 psia.

EXAMPLE 13 demonstrates that N-ethylcarbazole has a heat of hydrogenation that is substantially lower than the heat of hydrogenation for other aromatic substrates (e.g. benzene, naphthalene, pyridine). The comparatively low heat of hydrogenation for N-ethylcarbazole results in a lower temperature dehydrogenation than any hydrogen carrier in the prior art. In a reaction calorimeter, N-ethylcarbazole was hydrogenated under 1000 psia hydrogen at 150° C. for 20 hours. Baseline heat flows were carefully measured in order to accurately determine the amount of heat generated by the hydrogenation reaction. The heat of hydrogenation of (liquid) N-ethylcarbazole at 150° C. varied between 12.4 kcal/mol $H_2$ and 11.8 kcal/mol $H_2$ as the hydrogenation reaction was carried to completion. As far as we are aware, there are no aromatic compounds that have been reported to have a heat of hydrogenation, $|\Delta H°_{H2}|$, lower than the −14.96 kcal/mol for pyridine $H_2$ (see Table 1b). Our experimental finding of −11.8 to −12.4 kcal/mol $H_2$ compares very well with our calculated (from the gas phase, quantum mechanics) $\Delta H°_{H2}$ at 150° C. for N-ethylcarbazole −12.4 kcal/mol $H_2$), lending credence to the other computational heats of hydrogenation as shown in Tables 1a-1d.

EXAMPLE 14 teaches that a mixture of pi-conjugated substrates can be used to store substantial amounts of hydrogen under mild conditions of temperature and pressure. A higher capacity substrate (1,2-dimethylindole) that is a solid at ambient temperature and a slightly lower capacity substrate (1-ethyl-2-methylindole) that is a liquid at ambient temperature were blended in a 2:1 (mol/mol) ratio to form a mixture that is was a free-flowing liquid at ambient temperature (20° C.). In the presence of a hydrogenation catalyst, the 1,2-dimethylindole/1-ethyl-2-methylindole mixture was hydrogenated under 700 psia hydrogen at 170° C. for 3 hours with stirring (500 rpm) in a hydrogenation reactor. The hydrogenated 1,2-dimethylindole/1-ethyl-2-methylindole mixture is a colorless, free-flowing, low-volatility liquid that is easily handled. After filtration to remove the hydrogenation catalyst, the hydrogenated liquid was placed in a dehydrogenation reactor. In the presence of a dehydrogenation catalyst, the hydrogenated 1,2-dimethylindole/1-ethyl-2-methylindole mixture was dehydrogenated under 15 psia hydrogen at 175° C. for 13 hours, yielding 4.5 wt. % hydrogen. Additional heating for 3 hours at 185° C. yielded more hydrogen, giving a total amount of 5.03 wt. % hydrogen stored and recovered (99% of theoretical capacity).

EXAMPLE 15 demonstrates that the reversible hydrogenation of 1-ethyl-2-methylindole can be used to store substantial amounts of hydrogen under mild conditions of temperature and pressure and release hydrogen at very mild temperatures. The dehydrogenation of liquid pi-conjugated substrates at low temperatures yields several advantages over the high-temperature dehydrogenation processes taught in the prior art. These include higher energy efficiency, compatibility with hydrogen fuel cell and hydrogen internal combustion engine waste heat, and ease of separation of hydrogen from the dehydrogenated liquid substrates. In the presence of a hydrogenation catalyst, 1-ethyl-2-methylindole (boiling point 267° C. at 760 mm pressure) was hydrogenated under 1000 psia hydrogen at 160° C. for 2 hours in a hydrogenation reactor. The hydrogenated 1-ethyl-2-methylindole is a colorless, free-flowing, low-volatility liquid that is easily handled. After filtration to remove the hydrogenation catalyst, a portion of the hydrogenated liquid was placed in a dehydrogenation reactor. In the presence of a dehydrogenation catalyst, hydrogenated 1-ethyl-2-methylindole was dehydrogenated under 15 psia hydrogen at 180° C. for 17.5 hours, yielding ca. 4.6 wt. % hydrogen (FIG. 16). A second portion of the hydrogenated liquid was placed in a dehydrogenation reactor. In the presence of a dehydrogenation catalyst, hydrogenated 1-ethyl-2-methylindole was dehydrogenated under 15 psia hydrogen at 160° C. for 24 hours, yielding ca. 3.6 wt. % hydrogen (FIG. 17).

Comparative EXAMPLE 1 demonstrates that the reversible hydrogenation of pentacene, a five-ring EPAH containing only one aromatic sextet, is not an efficient process for the storage of hydrogen under mild conditions of temperature and pressure using solid pentacene and a solid admixed catalyst. The $\Delta H°$ for the hydrogenation of pentacene (−17.5 kcal/mol $H_2$) is substantially larger than the $\Delta H°$ for the hydrogenation of coronene (−13.8 kcal/mol $H_2$). Under 980 psia (67.6 bar) of hydrogen gas pressure at 150° C., a 5.5 wt. % increase of the gravimetric hydrogen capacity on a total sample weight basis (pentacene+catalyst) is observed over a period of 10 hours (FIG. 18). The difference in $\Delta H°$ of hydrogenation is manifested by an apparent increase in hydrogenation efficiency for pentacene (5.5 wt. % $H_2$ adsorbed in 10 hours) vs. coronene (3.2 wt. % $H_2$ adsorbed in 17 hours) under essentially identical process conditions. The temperature at which the hydrogenation is carried out is far below the melting point of pentacene (m.p.>300° C.). Thus it is likely that pentacene, a solid at the onset of hydrogenation, remains a solid during the hydrogenation and dehydrogenation reactions carried out at 150° C. The mixture of hydrogenated pentacene compounds are not dehydrogenated at an effective conversion, under 18 psia (1.25 bar) hydrogen gas pressure, at 150° C. After 70 hours under these conditions the sample desorbs only 0.15 wt. % hydrogen (FIG. 19, 2.7% of the sorbed hydrogen). This is compared to the dehydrogenation of coronene in EXAMPLE 3 where after 70 hours at these same conditions the hydrogenated coronene sample desorbs 1.0 wt. % hydrogen (FIG. 9, 31% of the initially sorbed hydrogen). The greater than order-of-magnitude (11.5x) decrease in percentage of desorbed hydrogen for pentacene compared to coronene under identical process conditions again illustrates the substantial difference of $\Delta H°$ for hydrogenation between these two polyaromatic hydrocarbon molecules and the importance of $\Delta H°$ of hydrogenation in a hydrogen storage system based upon reversible hydrogenation of polyaromatic hydrocarbon.

Comparative EXAMPLE 2 demonstrates that an aromatic hydrocarbon, which is taught in the art as a hydrogen carrier that can release hydrogen by a catalytic dehydrogenation, is not effective for reversible hydrogen storage under the milder and more useful conditions of temperature and hydrogen pressure described in the current invention. Decahydronaphthalene (decalin) was subjected to more rigorous dehydrogenation conditions as compared to hydrogenated pyrene (EXAMPLE 1) and essentially identical dehydrogenation conditions as hydrogenated coronene (EXAMPLE 2). The decalin sample was heated with catalyst to 150° C. under 15 psia (1 bar) hydrogen gas pressure. After 16 hours under these conditions there was no measurable conversion (<0.5%) of decalin to any dehydrogenated products. This dehydrogenation result compares unfavorably to those for liquid pyrene (EXAMPLE 9, 25% dehydrogenated at 150° C., 16 hours, 1 bar hydrogen pressure) and hydrogenated coronene (EXAMPLE 2, 91% dehydrogenated at 150° C., 16 hours, 1 bar hydrogen pressure) in Examples 1 and 2. Although pyrene can be either a solid or liquid during the dehydrogenation process conditions depending on conversion (see discussion of Examples 1 and 8), it is likely that coronene is solid during the both hydrogenation and dehydrogenation. Decalin is a liquid at 150° C.

The present invention is not to be limited in scope by the specific embodiments disclosed in the examples which are intended as illustrations of a few aspects of the invention and any embodiments that are functionally equivalent are within the scope of this invention. Indeed, various modifications of the invention in addition to those shown and described herein will become apparent to those skilled in the art and are intended to fall within the scope of the appended claims.

A number of references have been cited, the entire disclosures of which are incorporated herein by reference.

What is claimed is:

1. A process for the storage and subsequent release of hydrogen comprising:
   a) contacting hydrogen, in the presence of a hydrogenation catalyst under hydrogenation conditions, with an extended pi-conjugated substrate to effect storage of hydrogen by forming an at least partially hydrogenated extended pi-conjugated substrate; wherein the extended pi-conjugated substrate in step a) comprises at least one member selected from the group consisting of, extended pi-conjugated substrates with nitrogen heteroatoms, extended pi-conjugated substrates with heteroatoms other than nitrogen, pi-conjugated monocyclic substrates with multiple nitrogen heteroatoms, pi-conjugated substrates with at least one triple bonded group, a pitch, extended pi-conjugated substrates with greater than three rings, extended pi-conjugated substrates with at least two rings wherein one ring is a five membered ring, and any combination of two or more of the foregoing and
   b) contacting the at least partially hydrogenated extended pi-conjugated substrate under dehydrogenation conditions in the presence of an effective amount of a dehydrogenation catalyst to release hydrogen from the at least partially hydrogenated extended pi-conjugated substrate.

2. The process of claim 1, wherein the extended pi-conjugated substrate comprises at least one member selected from the group consisting of pyrene, perylene, coronene, ovalene, picene, rubicene, fluorene, indene, acenanaphthylene, pyranthrone; and any combination of two or more of the foregoing.

3. The process of claim 2 wherein the substrate comprises a fluorene.

4. The process of claim 1, wherein the extended pi-conjugated substrate comprises at least one extended pi-conjugated substrate with nitrogen heteroatoms selected from the group consisting of phenanthroline, quinoline, N-methylindole, 1,2-dimethylindole, 1-ethyl-2-methylindole, carbazole, N-methylcarbazole, N-ethylcarbazole, N-n-propylcarbazole, N-iso-propylcarbazole, acridine, indolo[2,3-b]carbazole, indolo[3,2-a]carbazole 1,4,5,8,9,12-hexaazatriphenylene, pyrazine[2,3-b]pyrazine, N,N'',N'-trimethyl-6,11-dihydro-5H-diindolo[2,3-a:2',3'-c]carbazole, 1,7-dihydrobenzo[1,2-b:5,4-b']dipyrrole, 4H-benzo[def]carbazole; and any combination of two or more of the foregoing.

5. The process of claim 1, wherein the extended pi-conjugated substrate comprises at least one extended pi-conjugated substrate with heteroatoms other than nitrogen selected from the group consisting of dibenzofuran, dibenzothiaphene, phosphindole, P-methoxyphosphindole, P-methylphosphindole, dimethylsilaindene, boraindole, borafluorene, methylboraindole; and any combination of two or more of the foregoing.

6. The process of claim 1, wherein the extended pi-conjugated substrate comprises at least one member selected from the group consisting of polypyrrole, polyindole, poly(methylcarbazole), polyaniline, poly(9-vinylcarbazole); and any combination of two or more of the foregoing.

7. The process of claim 1, wherein the extended pi-conjugated substrate comprises at least one member selected from the group consisting of N-lithiocarbazole, N-lithioindole, N-lithiodiphenylamine, N-sodiumcarbazole, N-potassiumcarbazole, the tetramethylammonium salt of carbazole; and any combination of two or more of the foregoing.

8. The process of claim 1, wherein the extended pi-conjugated substrate comprises at least one pi-conjugated monocyclic substrate with multiple nitrogen heteroatoms selected from the group consisting of pyrazine, N-methylimidazole; and any combination thereof.

9. The process of claim 1, wherein the extended pi-conjugated substrate comprises at least one pi-conjugated substrate with at least one triple bonded group selected from the group consisting of terephthalonitrile (1,4-dinitrilobenzene), benzonitrile, 1,3,5-trinitrilobenzene; and any combination of two or more of the foregoing.

10. The process of claim 1, wherein the extended pi-conjugated substrate comprises at least one pitch or pitch fraction selected from the group consisting of natural pitch, synthetic pitch, synthetic pitch containing molecules with nitrogen heteroatoms, and combinations thereof.

11. The process of claim 1, wherein step a) and step b) are conducted within a single vessel.

12. The process of claim 1 wherein the hydrogenation catalyst also functions as the dehydrogenation catalyst.

13. The process of claim 12, wherein the extended pi-conjugated substrate in step a) resides in the liquid state and step a) is conducted in a first vessel; and the at least partially hydrogenated extended pi-conjugated substrate of step b) has a melting point of below about minus 10° C. and step b) is conducted in a second vessel.

14. The process of claim 1, wherein the extended pi-conjugated substrate in step a) resides in the liquid state and step a) is conducted in a first vessel; and the at least partially hydrogenated extended pi-conjugated substrate in step b) resides in the liquid state and step b) is conducted in a second vessel.

15. The process of claim 1, wherein the at least partially hydrogenated extended pi-conjugated substrate of step b) has a melting point below about 100° C.

16. The process of claim 1, wherein the hydrogen released in step b) is at least 1% by weight of the weight of the at least partially hydrogenated extended pi-conjugated substrate.

17. The process of claim 1, wherein the hydrogen released in step b) is at least 5% by weight of the weight of the at least partially hydrogenated extended pi-conjugated substrate.

18. The process of claim 1, wherein the hydrogen released in step b) is at least 7% by weight of the weight of the at least partially hydrogenated extended pi-conjugated substrate.

19. The process of claim 1 further comprising
   c) removing the hydrogenation catalyst from the at least partially hydrogenated extended pi-conjugated substrate obtained from step a) prior to conducting step b).

20. The process of claim 1 wherein step b) is conducted at a temperature below about 300° C. and at a hydrogen partial pressure greater than approximately 0.1 bar.

21. The process of claim 1 wherein step b) is conducted at a temperature below about 250° C. and at a hydrogen partial pressure greater than approximately 0.1 bar.

22. The process of claim 1 wherein step b) is conducted at a temperature below about 200° C. and at a hydrogen partial pressure greater than approximately 0.1 bar.

23. The process of claim 1 wherein step b) is conducted at a temperature below about 150° C. and at a hydrogen partial pressure greater than approximately 0.1 bar.

24. The process of claim 1 wherein step b) is conducted at a temperature below about 250° C. and at a hydrogen partial pressure greater than approximately 1 bar.

25. The process of claim 1, wherein the modulus of the standard enthalpy change of hydrogenation of the extended pi-conjugated substrate in step a) is less than about 15.0 kcal/mol $H_2$.

26. The process of claim 25, wherein the modulus of the standard enthalpy change of hydrogenation is determined experimentally.

27. The process of claim 25, wherein the modulus of the standard enthalpy change of hydrogenation is calculated by the ab initio density functional theory method.

28. The process of claim 1 wherein the at least partially hydrogenated extended pi-conjugted substrate in step a) comprises a mixture of at least two different at least partially hydrogenated extended pi-conjugted substrates.

29. The process of claim 28, wherein the mixture of at least two different at least partially hydrogenated extended pi-conjugted substrates is a eutectic mixture.

30. The process of claim 29, wherein the eutectic mixture comprises 1-ethyl-2-methylindole and 1,2-dimethylindole.

31. The process of claim 1 wherein the extended pi-conjugated substrate in step a) has a normal freezing point above about 200° C. and is subjected to step a) while present in a mixture of at least two different extended pi-conjugated substrates with a freezing point of less than about 200° C.

32. The process of claim 31, wherein the eutectic mixture comprises a mixture of an extended pi-conjugated substrate with nitrogen heteroatoms, an extended pi-conjugated substrate with heteroatoms other than nitrogen, and any combination of thereof.

33. The process of claim 32, wherein the eutectic mixture comprises N-methylcarbazole, N-ethylcarbazole, N-propylcarbazole, N-isopropylcarbazole or any combination of two or more of the foregoing.

34. The process of claim 31, wherein the eutectic mixture is a liquid at −10° C.

35. The process of claim 1 wherein the at least partially hydrogenated extended pi-conjugated substrate from step a) has a freezing point of less than about 200° C.

36. The process of claim 1 wherein the at least partially hydrogenated extended pi-conjugated substrate from step a) has a freezing point of less than about 100° C.

37. The process of claim 1 wherein the at least partially hydrogenated extended pi-conjugated substrate from step a) has a freezing point of less than about −10° C.

38. The process of claim 1 wherein the extended pi-contugated substrate additionally comprises a ring substituent selected from the group consisting of an alkyl group, an alkoxy group, an ether group, and a polyether group.

39. The process of claim 1 wherein the extended pi-conjugated substrate in step a) is contained within a natural pitch.

40. The process of claim 1 wherein the hydrogenation catalyst in step
 a) comprises a metal selected from groups 4, 5, 6 and 8, 9, 10 of the Periodic Table according to the International Union of Pure and Applied Chemistry.

41. The process of claim 1 wherein the hydrogenation catalyst in step a) comprises a metal selected from the group consisting of titanium, zirconium, cobalt, niobium, tantalum, iron, molybdenum, tungsten, ruthenium, rhodium, iridium, nickel, palladium, and platinum.

42. The process of claim 1 wherein the dehydrogenation catalyst in step b) comprises a metal selected from groups 4, 5, 6 and 8, 9, 10 of the Periodic Table according to the International Union of Pure and Applied Chemistry.

43. The process of claim 1 wherein the dehydrogenation catalyst in step b) comprises a metal selected from the group consisting of titanium, zirconium, cobalt, niobium, tantalum, iron, molybdenum, tungsten, ruthenium, rhodium, iridium, nickel, palladium, and platinum.

44. The process of claim 1 wherein the dehydrogenation catalyst in step b) comprises an acidic support selected from the group consisting of silica-alumina, gamma-alumina, zeolites in the proton-exchanged form, sulfonated zirconia, solid perfluorinated polymeric sulfonic acids, aluminum trifluoride, aluminum chlorofluorides, zinc chloride, aluminum chloride, tin chloride, copper trifluoromethane sulfonate, scandium trichloride, hexafluoroacetylacetonate of complexes of the members of the Lanthanide series of elements according to the Periodic Table according to the International Union of Pure and Applied Chemistry.

45. The process of claim 1 wherein the extended pi-conjugated substrate in step a) comprises coronene and wherein step b) is conducted at a temperature of below about 250° C. and at a hydrogen partial pressure above about 0.1 bar.

46. The process of claim 1 wherein the extended pi-conjugated substrate in step a) comprises pyrene and wherein step b) is conducted at a temperature of below about 200° C. and at a hydrogen partial pressure above about 0.1 bar.

47. The process of claim 1 wherein the extended pi-conjugated substrate in step a) comprises carbazole and wherein step b) is conducted at a temperature of below about 250° C. and at a hydrogen partial pressure above about 0.1 bar.

48. The process of claim 1, wherein the at least partially hydrogenated extended pi-conjugated substrate comprises a mixture of conformers of the at least partially hydrogenated substrate.

49. The process of claim 1, wherein the extended pi-conjugated substrate is a liquid at the dehydrogenation conditions of step b).

50. The process of claim 1, wherein the at least partially hydrogenated extended pi-conjugated substrate is a liquid at the dehydrogenation conditions of step b).

51. The process of claim 1, wherein the extended pi-conjugated substrate and the at least partially hydrogenated extended pi-conjugated substrate are liquids at the dehydrogenation conditions of step b).

52. The process of claim 1, wherein the extended pi-conjugated substrate is a solid at the dehydrogenation conditions of step b).

53. The process of claim 1, wherein the at least partially hydrogenated extended pi-conjugated substrate is a solid at the dehydrogenation conditions of step b).

54. The process of claim 1, wherein substantially none of the extended pi-conjugated substrate sublimes during the dehydrogenation of step b).

55. The process of claim 1, wherein the modulus of the standard enthalpy change of hydrogenation is determined experimentally.

56. The process of claim 1, wherein the modulus of the standard enthalpy change of hydrogenation is calculated by the ab initio density functional theory method.

57. A process for the storage of hydrogen comprising contacting hydrogen with an extended pi-conjugated substrate in the presence of an effective amount of a hydrogenation catalyst under hydrogenation conditions to at least partially hydrogenate the extended pi-conjugated substrate wherein the substrate comprises at least one member selected from the group consisting of extended pi-conjugated substrates with at least one heteroatom, extended pi-coniugated substrates with greater than three rings and extended pi-coniugated substrates with at least two rings wherein one ring is a five membered ring.

58. A process for the storage of hydrogen comprising contacting hydrogen gas at a hydrogen partial pressure greater than about 6.7 bar and at a temperature of between about 50° C. and about 300° C. with a solid extended pi-conjugated substrate in the presence of an effective amount of a hydrogenation catalyst to at least partially hydrogenate the extended pi-conjugated substrate wherein the substrate comprises at least one member selected from the group consisting of extended pi-coniugated substrates with at least one heteroatom, extended pi-coniugated substrates with greater than three rings and extended pi-conjugated substrates with at least two rings wherein one ring is a five membered ring.

59. A process for the storage and subsequent release of hydrogen comprising:
   a) contacting hydrogen, in the presence of a hydrogenation catalyst under hydrogenation conditions, with an extended pi-conjugated substrate to effect storage of hydrogen by forming an at least partially hydrogenated extended pi-conjugated substrate wherein the substrate comprises at least one member selected from the group consisting of extended pi-conjugated substrates with at least one heteroatom, extended pi-conjugated substrates with greater than three rings, and extended pi-coniugated substrates with at least two rings wherein one ring is a five membered ring; and thereafter
   b) contacting the at least partially hydrogenated extended pi-conjugated substrate under dehydrogenation conditions in the presence of an effective amount of a dehydrogenation catalyst to release hydrogen from the at least partially hydrogenated extended pi-conjugted substrate; wherein
   the extended pi-conjugated substrate and the at least partially hydrogenated extended pi-conjugated substrate are liquids at the dehydrogenation conditions of step b).

60. A process for releasing hydrogen comprising:
   providing a substrate comprising at least one at least partially hydrogenated member selected from the group consisting of heteroatoms, extended pi-conjugated substrates with heteroatoms other than nitrogen, pi-conjugated monocyclic substrates with multiple nitrogen heteroatoms, pi-conjugated substrates with at least one triple bonded group, a pitch, extended pi-conjugated substrates with greater than three rings, extended pi-conjugated substrates with at least two rings wherein one ring is a five membered ring, and any combination of two or more of the foregoing;
   contacting the substrate with an effective amount of at least one catalyst under conditions sufficient to remove hydrogen from the substrate.

61. The process of claim 60 wherein the substrate comprises at least one member selected from the group consisting of N-ethylcarbazole, 1-Ethyl-2-methylindole and 1,2-Dimethylindole.

62. The process of claim 60 wherein the substrate comprises a fluorene.

* * * * *

UNITED STATES PATENT AND TRADEMARK OFFICE
CERTIFICATE OF CORRECTION

PATENT NO. : 7,429,372 B2  Page 1 of 1
APPLICATION NO. : 10/833484
DATED : September 30, 2008
INVENTOR(S) : Guido Peter Pez et al.

It is certified that error appears in the above-identified patent and that said Letters Patent is hereby corrected as shown below:

Column 70; Line 15 (Claim 60)

Insert the following after the word "of" before the word "heteroatoms"

--extended pi-conjugated substrates with nitrogen--

Signed and Sealed this

Twenty-third Day of December, 2008

JON W. DUDAS
*Director of the United States Patent and Trademark Office*